(12) United States Patent
Webster et al.

(10) Patent No.: US 11,859,099 B2
(45) Date of Patent: Jan. 2, 2024

(54) AMPHIPHILIC SILOXANE-POLYURETHANE FOULING-RELEASE COATINGS AND USES THEREOF

(71) Applicant: NDSU RESEARCH FOUNDATION, Fargo, ND (US)

(72) Inventors: Dean C. Webster, Fargo, ND (US); Alireza Rahimi, N. Royalton, OH (US)

(73) Assignee: NDSU RESEARCH FOUNDATION, Fargo, ND (US)

( * ) Notice: Subject to any disclaimer, the term of this patent is extended or adjusted under 35 U.S.C. 154(b) by 192 days.

(21) Appl. No.: 17/191,035

(22) Filed: Mar. 3, 2021

(65) Prior Publication Data

US 2021/0348021 A1     Nov. 11, 2021

Related U.S. Application Data

(63) Continuation-in-part of application No. 16/843,991, filed on Apr. 9, 2020, now abandoned, which is a (Continued)

(51) Int. Cl.
*C09D 175/08*     (2006.01)
*C08G 18/62*     (2006.01)
(Continued)

(52) U.S. Cl.
CPC ......... *C09D 175/08* (2013.01); *C08G 18/283* (2013.01); *C08G 18/289* (2013.01);
(Continued)

(58) Field of Classification Search
None
See application file for complete search history.

(56) References Cited

U.S. PATENT DOCUMENTS 3,905,929 A     9/1975   Noll
5,045,599 A     9/1991   Murase
(Continued)

FOREIGN PATENT DOCUMENTS

JP     2013151582 A     8/2013
WO     2015/056744 A1     4/2015

OTHER PUBLICATIONS

International Search Report and Written Opinion in International Application No. PCT/US2016/035176, dated Dec. 28, 2016.
(Continued)

*Primary Examiner* — Robert S Loewe
(74) *Attorney, Agent, or Firm* — RAPHAEL BELLUM PLLC

(57) ABSTRACT

The invention is directed to curable polyurethane coating compositions which may be used to form fouling release coatings, e.g., for use in protecting boat hulls. A curable coating composition of the invention comprises a) at least one amphiphilic additive; b) at least one polyisocyanate; c) at least one polyol; and d) optionally, at least one amphiphilic PEG-PDMS isocyanate prepolymer. Another curable coating composition of the invention comprises the at least one polyisocyanate, b), the at least one polyol, c), and the at least one amphiphilic PEG-PDMS isocyanate prepolymer, d). The invention further relates to methods for reducing or preventing biofouling of a surface exposed to an aqueous environment comprising the steps of coating the surface with the curable coating compositions of the invention to form a coated surface, and curing the coating composition on the coated surface.

32 Claims, 39 Drawing Sheets

Related U.S. Application Data continuation of application No. 15/576,399, filed as application No. PCT/US2016/035176 on Jun. 1, 2016, now Pat. No. 10,647,878.

(60) Provisional application No. 62/169,514, filed on Jun. 1, 2015.

(51) Int. Cl.

| | | |
|---|---|---|
| *C08G 18/72* | (2006.01) | |
| *C08G 18/75* | (2006.01) | |
| *C08G 18/79* | (2006.01) | |
| *C08G 18/80* | (2006.01) | |
| *C08G 18/28* | (2006.01) | |
| *C09D 175/04* | (2006.01) | |
| *C09D 5/16* | (2006.01) | |

(52) U.S. Cl.
CPC ....... *C08G 18/6229* (2013.01); *C08G 18/725* (2013.01); *C08G 18/755* (2013.01); *C08G 18/792* (2013.01); *C08G 18/8064* (2013.01); *C09D 5/1637* (2013.01); *C09D 175/04* (2013.01)

(56) References Cited

U.S. PATENT DOCUMENTS

| | | |
|---|---|---|
| 5,321,083 A | 6/1994 | Hanada et al. |
| 5,621,042 A | 4/1997 | Hanada et al. |
| 5,714,561 A | 2/1998 | Chin et al. |
| 10,647,878 B2 * | 5/2020 | Webster ............... C08G 18/283 |
| 2002/0127413 A1 | 9/2002 | Shores |
| 2003/0027917 A1 | 2/2003 | Namiki et al. |
| 2003/0149227 A1 | 8/2003 | Okazaki |
| 2004/0181008 A1 | 9/2004 | Hanazawa et al. |
| 2008/0139775 A1 | 6/2008 | Wu et al. |
| 2008/0153982 A1 | 6/2008 | Lai et al. |
| 2008/0194775 A1 | 8/2008 | Blum et al. |
| 2010/0062168 A1 | 3/2010 | Poppe et al. |
| 2010/0063238 A1 | 3/2010 | Zhang et al. |
| 2010/0167033 A1 | 7/2010 | Poppe et al. |
| 2010/0280148 A1 | 11/2010 | Webster et al. |
| 2011/0135905 A1 | 6/2011 | Wakita et al. |
| 2014/0221523 A1 | 8/2014 | Jan |
| 2014/0295089 A1 | 10/2014 | Li et al. |
| 2014/0371410 A1 | 12/2014 | Jan |

OTHER PUBLICATIONS

International Preliminary Report on Patentability in International Application No. PCT/US2016/035176, dated Dec. 14, 2017.

Pires et al., "A new tailor-maid polyisocyanate for two-pack waterborne polyurethane coatings", Surface Coatings International Part B; Coatings Transactions, vol. 85, 2002, 169-242 (Year 2002).

Data sheet for Monoterminal Silaplabe FM-0425, 1 page, 2019 (Year 2019).

* cited by examiner

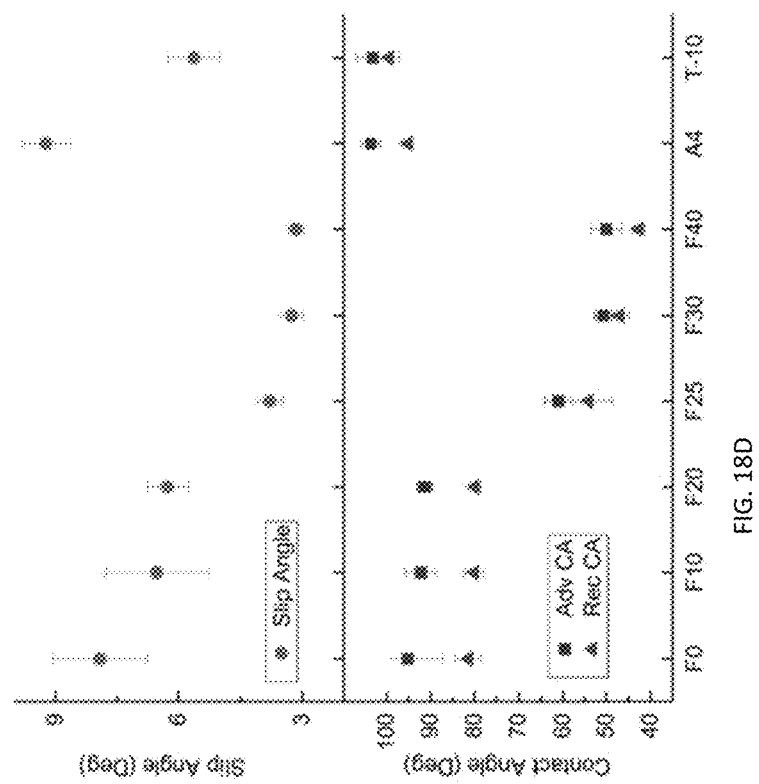
FIG. 18C
FIG. 18D
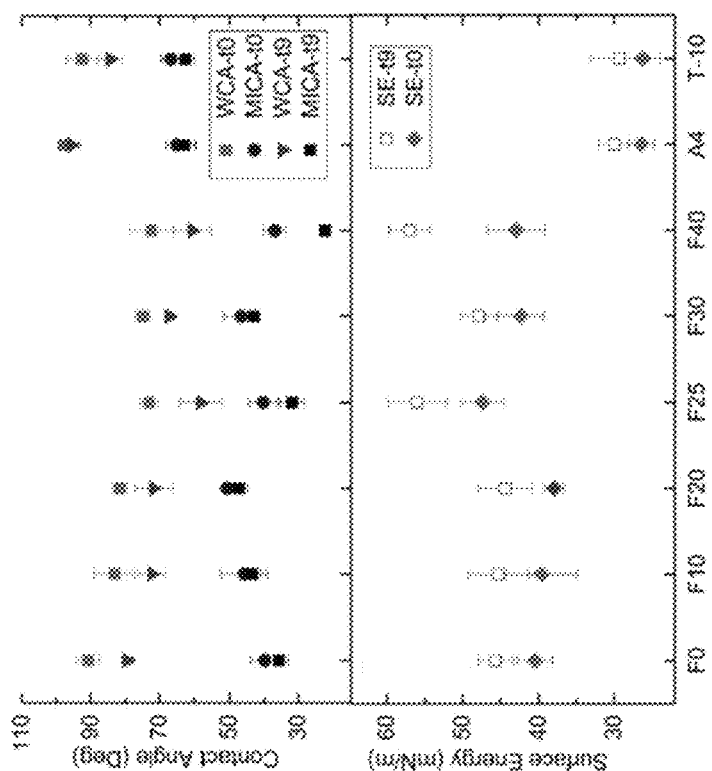
FIG. 18A
FIG. 18B

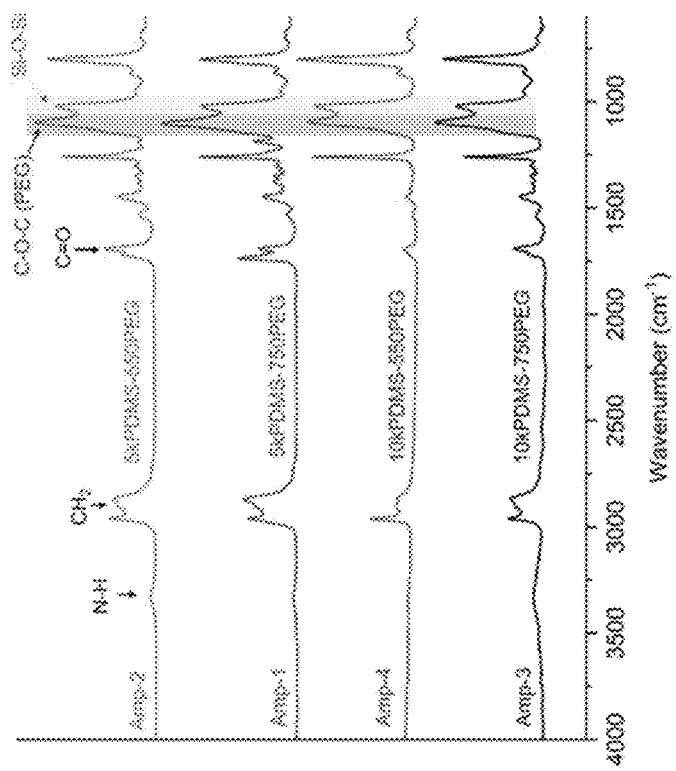
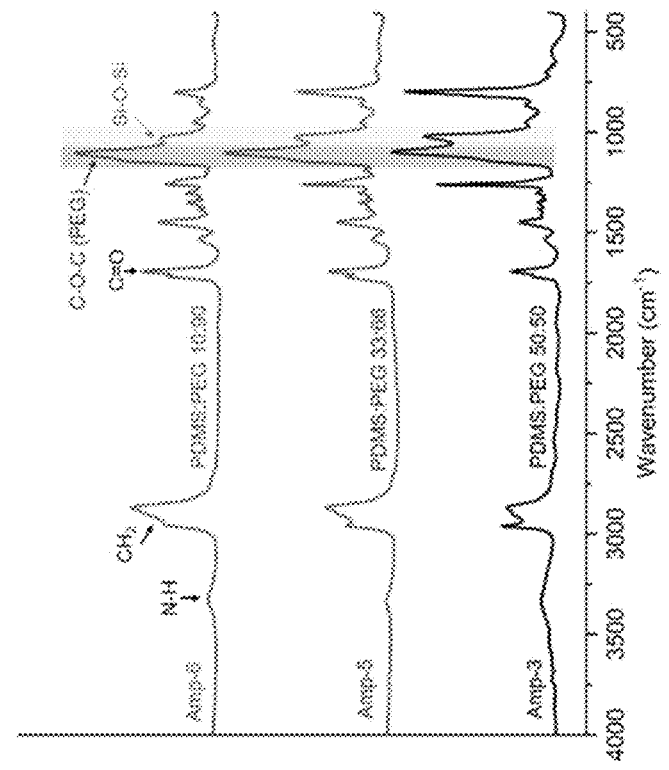
FIG. 27A
FIG. 27B

AMPHIPHILIC SILOXANE-POLYURETHANE FOULING-RELEASE COATINGS AND USES THEREOF

CROSS-REFERENCE TO RELATED APPLICATIONS

This application is a Continuation-in-Part of application Ser. No. 16/843,991, filed Apr. 9, 2020; which is a Continuation of U.S. application Ser. No. 15/576,399, filed Nov. 22, 2017, which is a § 371 application of PCT/US2016/035176, filed Jun. 1, 2016, which claims priority to U.S. Provisional Application No. 62/169,514, filed Jun. 1, 2015, each of which are incorporated herein by reference.

STATEMENT OF US GOVERNMENT SUPPORT

This invention was made with government support under N00014-12-1-0482 and N00014-16-1-3064 awarded by the Office of Naval Research (ONR). The US government has certain rights in the invention.

BACKGROUND OF THE INVENTION

Bio-fouling is the buildup of micro and macro organisms on all materials that are immersed in natural bodies of water. Yebra et al., *Prog. Org. Coat.* 2004, 50, 75-104. Contending with biofouling has been a challenging problem since the beginning of navigation. Hellio et al., Advances in marine antifouling coatings and technologies. Cambridge, UK: Woodhead Publishing Limited (2009) ("Hellio 2009"). Extensive and rapid buildup of fouling on the ship hull cause reduction in ship speed and maneuverability which in turn increases operating costs and environmental penalties. Magin et al., *Mater. Today* 2010, 13 (4), 36-44; Callow et al., *Biologist* 2002, 49 (1), 10-14. Additional negative impacts of biofouling are many, including, but not limited to, heightened economic costs, decreased drag, increased fuel consumption, and introduction of invasive species to new habitats. Magin et al., *Mater. Today* 2010, 13 (4), 36-44; Callow et al., *Biologist* 2002, 49 (1), 10-14. For example, the US Navy spends $1 billion per year to maintain its ships operational due to biofouling. Callow et al., *Biologist* 2002, 49 (1), 10-14.

Marine biofouling is a complex, multi-stage, process. Callow et al., *Nat. Commun.* 2011, 2 (1), 244. The process is non-linear, meaning biofouling can be initiated with either formation of a conditioning bacteria film or attachment of macrofoulants like barnacles or mussels. Lejars et al., *Chem. Rev.* 2012, 112 (8), 4347-4390; Callow et al., *Biologist* 2002, 49 (1), 10-14. The diversity of fouling organisms, their modes of adhesion, and surface affinities, further complicates this problem. Callow et al., *Nat. Commun.* 2011, 2 (1), 244; Lejars et al., *Chem. Rev.* 2012, 112 (8), 4347-4390; Yebra et al., *Prog. Org. Coat.* 2004, 50, 75-104. There are estimated to be more than 4000 marine organisms that can potentially biofoul a surface in seawater, using different modes of adhesion and preferring various type of surfaces for settlement. Lejars et al., *Chem. Rev.* 2012, 112 (8), 4347-4390; Beigbeder et al., *J. Nanosci. Nanotechnol.* 2010, 10 (5), 2972-2978; Beigbeder et al., *J. Adhes. Sci. Tech.* 2011, 25 (14), 1689-1700. As an example, some organisms prefer to settle on hydrophilic surfaces such as *U. linza*, mussels, and barnacles, while some like to settle on hydrophobic surfaces like *N. incerta*. Lejars et al., *Chem. Rev.* 2012, 112 (8), 4347-4390. While it is often considered that colonizing microorganisms (i.e., bacteria, diatoms) pre-condition a surface first for macro-biofoulants (i.e., barnacles), it has been found that the marine biofouling process is not linear since organisms may settle on a surface at any time regardless of any pre-conditioning. Lejars et al., *Chem. Rev.* 2012, 112 (8), 4347-4390; Genzer et al., *Biofouling* 2006, 22 (5), 339-360. Therefore, a consideration of these briefly mentioned factors explains why marine biofouling is a very complex problem to solve and tackle.

The complex and ambiguous nature of the biofouling problem has required the development of several protective systems throughout history. In the medieval age, copper and lead sheathing covering the ship hulls were used as the primary method of controlling biofouling. Hellio 2009. Advancement in polymer and resin technology in the 1960's led to the use of self-polishing copolymers with controlled release of biocides such as Tributyl tin (TBT). Yebra et al., *Prog. Org. Coat.* 2004, 50, 75-104; Hellio 2009. However, by the 1970s, deleterious effects of TBT towards aquatic life started to appear. The International Maritime Organization addressed the issues of TBT by placing restrictions that later established protocols for complete prohibition of tin based antifouling paints in 2003. Yebra et al., *Prog. Org. Coat.* 2004, 50, 75-104. Antifouling technologies using copper oxide as biocide had been used previously and is now the predominate biocide used in commercial antifouling coatings. Konstantinou et al., *Environ. Int.* 2004, 30 (2), 235-248. Due to concerns regarding the release of biocides into the environment, a considerable amount of research has been carried out towards using non-toxic anti-fouling (AF)/fouling release (FR) technologies that are environmentally friendly. Lejars et al., *Chem. Rev.* 2012, 112 (8), 4347-4390.

Current AF coating systems utilize a variety of biocides to contend with biofouling such as metal oxides, copper and zinc pyrithiones, various organic booster biocides, and Selektope®. While these systems have less toxicity than tributyl tin, still fight biofouling due to their toxicity. FR systems are another approach, known to be non-toxic and more environmentally friendly. While AF coatings function by leaching biocides to deter settlement of or kill marine organisms, FR coatings perform by weakening the adhesion of biofoulants on a surface that facilitates their release. Callow et al., *Nat. Commun.* 2011, 2 (1), 244; Lejars et al., *Chem. Rev.* 2012,112 (8), 4347-4390.

Traditional FR systems are composed of low-surface energy elastomeric materials, such as polydimethylsiloxane (PDMS) elastomers, which allow only the weak attachment of fouling organisms which are removed due to hydrodynamic forces. Lejars et al., *Chem. Rev.* 2012, 112 (8), 4347-4390; Wyszogrodzka et al., *Biomacromolecules* 2009, 10 (5), 1043-1054. However, unlike AF coatings with biocides, these silicone-based FR coatings have some drawbacks such as deterioration of FR properties over time, poor mechanical durability, and weak adhesion, resulting in the need for a tie-coat to improve adhesion. Yebra et al., *Prog. Org. Coat.* 2004, 50, 75-104; Lejars et al., *Chem. Rev.* 2012, 112 (8), 4347-4390. Siloxane polyurethane FR coatings developed by Webster and coworkers have been able to address the issues with durability by incorporating PDMS into a polyurethane matrix. U.S. Pat. Nos. 7,799,434; 7,989, 074. Self-stratification siloxane-polyurethane (SiPU) FR coatings provide the FR properties on par with commercial FR coatings and polyurethane bulk provides mechanical performance that is a magnitude higher than silicone elastomers. Ekin et al., *J. Comb. Chem.* 2006, 9 (1), 178-188; Bodkhe et al., *J. Coating. Tech. Res.* 2012, 9 (3), 235-249; Sommer et al., *Biofouling* 2010, 26 (8), 961-972. Unlike silicone elastomer-based FR coatings, siloxane polyurethane coating systems have excellent adhesion to primers which eliminates the need for a separate tie-coat. Bodkhe et al., *J. Coating. Tech. Res.* 2012, 9 (3), 235-249.

Adhesion of marine organisms to surfaces is a complex phenomenon. Yebra et al., *Prog. Org. Coat.* 2004, 50, 75-104; Hellio 2009. However, the primary method of adhesion involves spreading of an adhesive that consists of complex protein or glycoprotein. Iguerb et al., *Langmuir* 2008, 24 (21), 12272-12281. Therefore, materials modified with polyethylene glycol (PEG) are of great interest mainly due to their ability to resist protein adhesion. Wyszogrodzka et al., *Biomacromolecules* 2009, 10 (5), 1043-1054. Self-assembled mono layers (SAM) containing PEG are commonly used as protein resistant materials. Wyszogrodzka et al., *Biomacromolecules* 2009, 10 (5), 1043-1054; Szleifer, *Curr. Opin. Solid State Mater. Sci.* 1997, 2 (3), 337-344. However, SAMs are not practical for use as marine coatings. Prime et al., *JACS* 1993,115 (23), 10714-10721. Polyurethanes modified with PEG, on the other hand, have demonstrated their versatility in biomedical applications, and surface domination of PEG plays a key role in protein resistance.

In previous attempts to modify siloxane polyurethanes with PEG, amino propyl-terminated siloxane with pendent PEG chains provided amphiphilic coatings with improved algae removal compared to $1^{st}$ generation siloxane polyurethane coatings. Bodkhe, Amphiphilic siloxane-polyurethane coatings [Ph.D.]. Ann Arbor: North Dakota State University. 313 p. (2011). However, the synthesis of PDMS with pendent PEG chains involves multiple steps.

While SiPU and similar hydrophobic systems possess the desired FR performance against many organisms, there are many other biofoulants that prefer a hydrophobic system for settlement or better adherence. Yebra et al., *Prog. Org. Coat.* 2004, 50, 75-104; Selim et al., *Chemistry Select* 2019, 4 (12), 3395-3407. As a result, amphiphilic coatings composed of both hydrophilic and hydrophobic segments have been investigated to contend with the diversity of biofouling organisms. Lejars et al., *Chem. Rev.* 2012, 112 (8), 4347-4390; Iguerb et al., *Langmuir* 2008, 24 (21), 12272-12281; Rath et al., *J. Coating. Tech. Res.* 2018, 15 (1), 185-198; Yi et al., *Appl. Surf. Sci.* 2019, 480, 923-933; Zhang et al., *Coatings* 2018, 8 (5), 157-157; Galhenage et al., *J. Coating. Tech. Res.* 2017, 14 (2), 307-322.

One approach has been the incorporation of amphiphilic additives to improve the performance of FR coatings by modifying their surface. Reported surface-modifying additives include many types such as amphiphilic copolymers (Cai et al., *Prog. Org. Coat.* 2017, 102, 247-258; Pollack et al., *ACS Appl. Mater. Interfaces* 2014, 6 (21), 19265-19274; Noguer, *Experimental investigation of the behavior and fate of block copolymers in fouling-release coatings.* Technical University of Denmark (DTU): Kgs. Lyngb, Denmark, 2016; Murthy et al., *J. Polym. Sci. A Polym. Chem.* 2010, 48 (18), 4108-4119; Martinelli et al., *Biofouling* 2011, 27 (5), 529-541; Røn et al., *Adv. Mater. Interfaces* 2016, 3 (2), 1500472; Rufin et al., *Acta Biomater.* 2016, 41, 247-252), zwitterionic-based polymers (Shivapooja et al., *ACS Appl. Mater. Interfaces* 2015, 7 (46), 25586-25591; Liu et al., *Langmuir* 2013, 29 (9), 2897-2905; Wan et al., *ACS Appl. Mater. Interfaces* 2012, 4 (9), 4557-4565; Yeh et al., *Langmuir* 2014, 30 (38), 11386-11393), or hydrogel-like polymers (Ciriminna et al., *ACS Sustain. Chem. Eng.* 2015, 3 (4), 559-565). Furthermore, silicone oils have been used as additives to take advantage of both critical surface tension and leaching behavior. Galhenage et al., *ACS Appl. Mater. Interfaces* 2016, 8 (42), 29025-29036; Wei et al., *ACS Appl. Mater. Interfaces* 2016, 8 (50), 34810-34819; Kavanagh et al., *Biofouling* 2003, 19 (6), 381-390. Additionally, fillers such as sepiolite nanofibers, modified graphite, and carbon nanotubes and pigments, such as $TiO_2$ and ZnO, have shown enhanced FR performance, and are recognized as specialty additives. Selim et al., *Chemistry Select* 2019, 4 (12), 3395-3407; Beigbeder et al., *J. Nanosci. Nanotechnol.* 2010, 10 (5), 2972-2978; Beigbeder et al., *J. Adhes. Sci. Tech.* 2011, 25 (14), 1689-1700; Selim et al., *Mater. Des.* 2016, 101, 218-225; Arukalam et al., *J. Colloid Interface Sci.* 2016, 484, 220-228. Most of these additives are incorporated in the systems to tune the surface to be amphiphilic.

While the literature indicates that amphiphilicity contributes to improved FR performance, the extent of amphiphilicity that offers the needed performance is not clear. The answer to this question is complex as it depends on many factors such as type of coating system, targeted aquatic environment, and targeted organisms, to mention a few.

The amount of amphiphilicity that results in desirable FR performance, hereafter referred to as the critical amphiphilic concentration (CAC), is disclosed herein. A novel amphiphilic additive based on PDMS and PEG was synthesized and incorporated in increasing amounts in a conventional polyurethane (PU) coating system, assessing the point where the PU system demonstrated behavior of a FR PU system. Three aspects are disclosed: 1) synthesis and characterization of the amphiphilic additive (by Fourier transform infrared spectroscopy (FTIR) and isocyanate titration); 2) surface characterization of the PU coatings with different amounts of the amphiphilic additive (by contact angle measurements, ATR (attenuated total reflectance)-FTIR, X-ray photoelectron spectroscopy (XPS), and atomic force microscopy (AFM)) and mechanical evaluations (by coating-related tests); and 3) correlation of the FR performance of the systems to the amount of the introduced additive and a comparison of the results with internal controls and commercial coatings.

Amphiphilic additives (AmpAdd) that may be non-covalently incorporated into a marine coating system are also disclosed herein. While many amphiphilic copolymers have been explored as marine additives, their often-complex synthesis is a major challenge for implementation on a large scale. Thus, a procedure to prepare a series of easy-to-synthesize amphiphilic additives by combining PEG and PDMS chains on a commercially available polymeric backbone is disclosed herein. Several factors were varied including the molecular weights of PEG and PDMS, the hydrophobic-hydrophilic balance of engineered additives, and the incorporated amount of amphiphilic additives in the coating system. The AmpAdds were added to the amphiphilic PEG-siloxane-polyurethane (AmpSiPU) (Galhenage et al., *J. Coating. Tech. Res.* 2017, 14 (2), 307-322) system to assess how further amphiphilicity boosts FR performance. Also, a series of AmpAdds were introduced to polyurethane and hydrophobic SiPU systems to evaluate CAC and effect of attaining amphiphilic balance, respectively. The synthesis and characterization of AmpAdds and their effect on the surface and FR properties of the selected AmpSiPU system is disclosed.

SUMMARY OF THE INVENTION

The invention is directed to curable polyurethane coating compositions which may be used to form fouling release (FR) coatings, e.g., for use in protecting boat hulls. Generally, the coatings of the invention are termed "anti-fouling" for their ability to reduce or prevent adhesion of biological or organic matter, such as proteins, bacteria, and the like to the coated surfaces, for example, of boat hulls.

A curable coating composition of the invention comprises, consists essentially of, or consists of:
- a) at least one amphiphilic additive, comprising, consisting essentially of, or consisting of the reaction product of:
  - a1) at least one polyisocyanate with
  - a2) at least one monocarbinol-terminated poly(dimethylsiloxane) (PDMS) and/or
  - a3) at least one poly(ethylene glycol) methyl ether (mPEG);
- b) at least one polyisocyanate;
- c) at least one polyol; and
- d) optionally, at least one amphiphilic PEG-PDMS isocyanate prepolymer, comprising, consisting essentially of, or consisting of the reaction product of:
  - d1) at least one polyisocyanate,
  - d2) at least one monocarbinol-terminated PDMS, and
  - d3) at least one mPEG,
  wherein the at least one amphiphilic PEG-PDMS isocyanate prepolymer, d), if present, has an overall isocyanate to total hydroxyl equivalent ratio such that isocyanate is in excess.

Another curable coating composition of the invention comprises, consists essentially of, or consists of the at least one polyisocyanate, b), the at least one polyol, c), and the at least one amphiphilic PEG-PDMS isocyanate prepolymer, d), wherein the at least one amphiphilic PEG-PDMS isocyanate prepolymer, d), has an overall isocyanate to total hydroxyl equivalent ratio such that isocyanate is in excess.

The invention also relates to objects coated with the curable coating compositions.

The invention further relates to methods for reducing or preventing biofouling of a surface exposed to an aqueous environment comprising the steps of coating the surface with the curable coating compositions of the invention to form a coated surface, and curing the coating composition on the coated surface.

The invention also relates to a marine fouling-release coating comprising the curable coating compositions.

BRIEF DESCRIPTION OF THE FIGURES

FIGS. 18A-18D show the contact angle and surface energy data for coatings: (FIG. 18A) Water contact angles (WCA) and methylene iodide contact angles (MICA) as a function of time at 0 minutes (t0) and 9 minutes (t9); (FIG. 18B) Surface energy (SE) of coatings at 0 minute and 9 minutes, calculated by the Owens-Wendt method utilizing the average WCAs and MICAS for each coating; (FIG. 18C) Slip angle of coatings where a water droplet starts to roll off; (FIG. 18D) Advancing water contact angle (Adv CA) and receding water contact angle (Rec CA) data, measured by tilting the cradle at 0 minutes and the values were recorded at the slip angle when the droplet started to roll off. A4 and T-10 are the internal coatings for comparison.

(FIG. 20A) XPS depth profile data for carbon C1s atom; (FIG. 20B) XPS depth profile data for silicon Si2p atom.

(FIG. 24A) Biofilm growth (red bar) and release data—biofilm remaining after 10 psi waterjet (blue bar) and biofilm remaining after 16 psi waterjet (green bar). The X-axis is labeled to specify the formulations and overall coating categories including experimental, internal, and commercial. The light-green dotted line shows the trend of biomass remaining after 16 psi water jetting, highlighting the plateauing FR performance after CAC is attained. (FIG. 24B) Percent removal of U. linza biofilm at 16 psi from the surface of additively modified experimental coatings.

(FIG. 25A) Biofilm growth (red bar) and release data—biofilm remaining after 10 psi waterjet (blue bar) and biofilm remaining after 20 psi waterjet (green bar). The X-axis is labeled to specify the formulations and overall coating categories including experimental, internal, and commercial. The light-green dotted line shows the trend of biomass remaining after 16 psi water jetting, highlighting the plateauing FR performance after CAC is attained. (FIG. 25B) Percent removal of C. lytica biofilm at 20 psi from the surface of additively modified experimental coatings.

(FIG. 26A) Biofilm growth (red bar) and release data—biofilm remaining after 10 psi waterjet (blue bar) and biofilm remaining after 20 psi waterjet (green bar). The X-axis is labeled to specify the formulations and overall coating categories including experimental, internal, and commercial. The light-green dotted line shows the trend of biomass remaining after 16 psi water jetting, highlighting the plateauing FR performance after CAC is attained. (FIG. 26B) Percent removal of N. incerta biofilm at 20 psi from the surface of additively modified experimental coatings.

FIGS. 27A-27B show FTIR spectra for the amphiphilic additives. FIG. 27A reflects spectra for additives with different weight ratios of 750 $\overline{M}_n$ PEG and 10,000 PDMS $\overline{M}_n$. FIG. 27B reflects spectra for additives with varying MW of PEG and PDMS with constant weight ratios. Each spectrum is labeled to display details about each spectrum. The signals of interest for C—O—C and Si—O—Si are highlighted in red and green, respectively.

FIG. 28A reflects spectra for coatings modified with additives of different weight ratio of 750 $\overline{M}_n$ PEG and 10,000 PDMS $\overline{M}_n$. FIG. 28B reflects spectra for coatings modified with varying amounts of Amp-3 additive, ranging from 0 wt. % to 20 wt. %. Green and red highlights reflect the peaks of interest for siloxane and ether (from PEG), respectively. Each spectrum is labeled to reflect the formulation ID number and type.

(FIG. 29A) Water contact angles (WCA) and methylene iodide contact angles (MICA) as a function of time at 0 minutes and 9 minutes; (FIG. 29B) Surface energy (SE) of coatings at 0 minute and 9 minutes, calculated by Owens-Wendt method utilizing the average WCAs and MICAS for each coating; (FIG. 29C) Slip angle of coatings where a water droplet starts to roll off; (FIG. 29D) Advancing contact angle (Adv CA) and receding contact angle (Rec CA) data, measured by tilting method. A4 is the internal hydrophobic coating for comparison. The x-axis is labeled to reflect details about utilized additive and the overall content of PEG and PDMS in a formulation.

(FIG. 35A) XPS data for unmodified model PU coating; (FIG. 35B) XPS data for modified model PU coating containing 20 wt. % Amp-3 additive. This data supports self-stratification of the amphiphilic additives to the surface.

DESCRIPTION OF THE INVENTION

Figure 1:
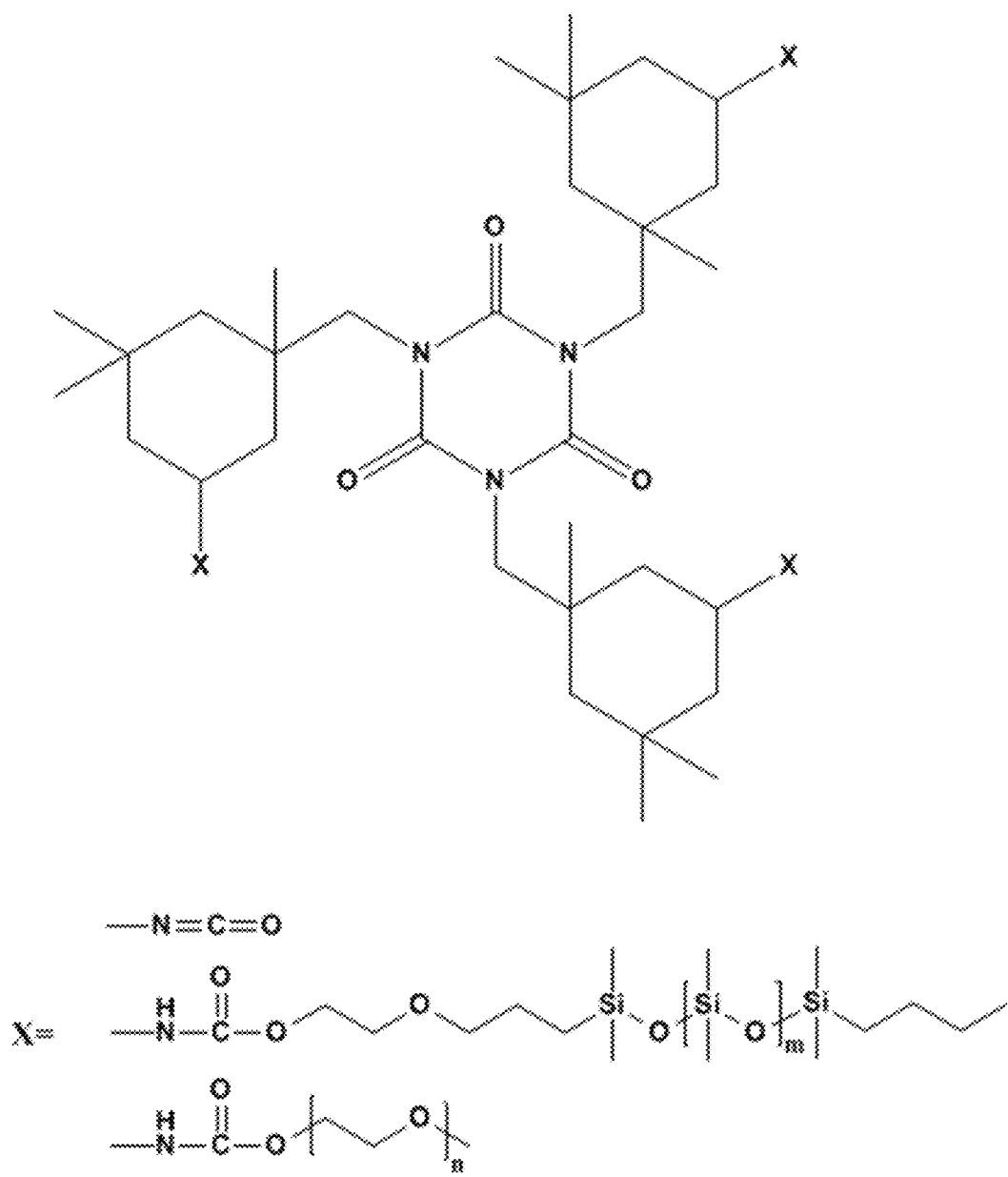
FIG. 1 depicts a general structure proposed for the prepolymers synthesized.

The invention is directed to curable polyurethane coating compositions, which may be used to form fouling release (FR) coatings, e.g., for use in protecting boat hulls. A curable coating composition of the invention comprises, consists essentially of, or consists of:
  a) at least one amphiphilic additive, comprising, consisting essentially of, or consisting of the reaction product of:
    a1) at least one polyisocyanate with
    a2) at least one monocarbinol-terminated poly(dimethylsiloxane) (PDMS) and/or
    a3) at least one poly(ethylene glycol) methyl ether (mPEG);
  b) at least one polyisocyanate;
  c) at least one polyol; and d) optionally, at least one amphiphilic PEG-PDMS isocyanate prepolymer, comprising, consisting essentially of, or consisting of the reaction product of:
   d1) at least one polyisocyanate,
   d2) at least one monocarbinol-terminated PDMS, and
   d3) at least one mPEG,
   wherein the at least one amphiphilic PEG-PDMS isocyanate prepolymer, d), if present, has an overall isocyanate to total hydroxyl equivalent ratio such that isocyanate is in excess.

Another curable coating composition of the invention comprises, consists essentially of, or consists of the at least one polyisocyanate, b), the at least one polyol, c), and the at least one amphiphilic PEG-PDMS isocyanate prepolymer, d), wherein the at least one amphiphilic PEG-PDMS isocyanate prepolymer, d), has an overall isocyanate to total hydroxyl equivalent ratio such that isocyanate is in excess.

Methods of inhibiting fouling on a surface exposed to aquatic conditions, such as a boat hull, comprising applying the curable coating compositions of the invention to at least a portion of said surface hull are also provided. The application also describes surfaces designed to be exposed to aqueous conditions (e.g., salt water conditions, such as seawater or brackish water, or fresh water conditions, such as found with materials in contact with lake or stream water), which are protected with a coating including the curable coating compositions of the invention.

The amphiphilic additive, a), for use in the curable coating compositions is made by reacting at least one polyisocyanate, a1), with at least one monocarbinol-terminated PDMS, a2), and/or at least one mPEG a3). To prepare the amphiphilic additive, the polyisocyanate, a1), and the monocarbinol-terminated PDMS, a2), plus (+) the mPEG, a3), are reacted in a 1:1 equivalent ratio of isocyanate group (NCO): hydroxyl group (OH).

Similarly, the amphiphilic PEG-PDMS isocyanate prepolymer, d), is made by reacting at least one polyisocyanate, d1), with at least one monocarbinol-terminated PDMS, d2), and/or at least one mPEG d3). However, in contrast to the amphiphilic additive, a), the amphiphilic PEG-PDMS isocyanate prepolymer, d), has an overall isocyanate (NCO) to total hydroxyl (OH) equivalent ratio such that isocyanate is in excess. For example, the isocyanate to total hydroxyl equivalent ratio in the at least one amphiphilic PEG-PDMS isocyanate prepolymer, d), may range from 1.5:1 to 1.1:1. By way of another example, in the at least one amphiphilic PEG-PDMS isocyanate prepolymer, d), the polyisocyanate, d1), and the monocarbinol-terminated PDMS, d2), plus (+) the mPEG, a3), are reacted in an isocyanate to hydroxyl ratio where the moles of hydroxyl reacted are less than the stoichiometric amount of the isocyanate present while maintaining 5-10 wt. % of PDMS and PEG content based on the overall coating formulation. For example, IPDI trimer may be reacted with monocarbinol-terminated PDMS and mPEG) in a 1.5:1 isocyanate to hydroxyl ratio while maintaining 5-10 wt. % of PDMS and PEG content based on the overall coating formulation.

FIG. 1 depicts a general structure proposed for both the amphiphilic additive and amphiphilic PEG-PDMS isocyanate prepolymer synthesized (collectively, referred to as "pre-polymer" in FIG. 1). In the structure depicted with an IPDI trimer as the exemplary polyisocyanate, X can be either an isocyanate group, PDMS chain linked through urethane or mPEG linked through urethane. The integer "m" connotes the repeating units in the PDMS and the integer "n" the repeating units in the mPEG.

The polyisocyanates, a1), b), and d1), are, independent of one another, selected from the group consisting of an aliphatic polyisocyanate, a cycloaliphatic polyisocyanate, an araliphatic polyisocyanate, an aromatic polyisocyanate, and mixtures thereof. For example, the polyisocyanate, a1), b), and d1), may be, independent of one another, selected from the group consisting of:

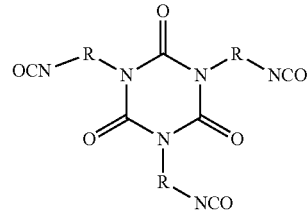

(I)

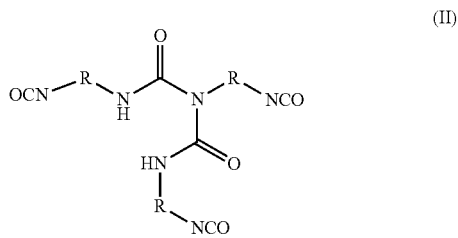

(II)

wherein R is independently an optionally substituted, divalent $C_1$-$C_{15}$ alkyl, an optionally substituted $C_3$-$C_{15}$ cycloalkyl, or a group selected from:

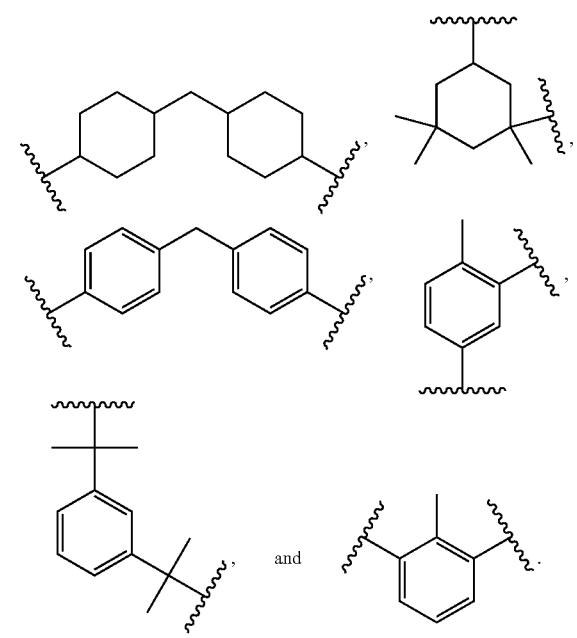

Preferably, R is a $C_2$-$C_{10}$ straight chain or branched alkyl.

Polyisocyanates based on methylene diphenyl diisocyanate ("MDI") and trimers thereof, hexamethylene diisocyanate ("HMDI") and trimers thereof, isophorone diisocyanate ("IPDI") and trimers thereof, and the like can be used.

Preferably, the polyisocyanate is an isophorone-based polyisocyanate. The polyisocyanate may be a polyisocyanate having at least three isocyanate groups such as an MDI trimer, an IPDI trimer (Desmodur Z4470 BA), and an HDI trimer (Desmodur N3300 A). Other polyisocyanates known in the art may also be used. Examples include Desmodur HL, Desmodur IL, triisocyanatononane, Desmodur RE, Desmodur RFE.

The monocarbinol-terminated PDMS, a2) and d2), may have, independent of one another, a molecular weight ranging from 400 $\overline{M}_n$ to 50,000 $\overline{M}_n$ (e.g., 5000 $\overline{M}_n$ to 10,000 $\overline{M}_n$). For example, the monocarbinol-terminated PDMS may have molecular weight of 1000, of 5000, or of 10,000 $\overline{M}_n$.

The monocarbinol-terminated PDMS, a2) and d2), may have, independent of one another, the following structure:

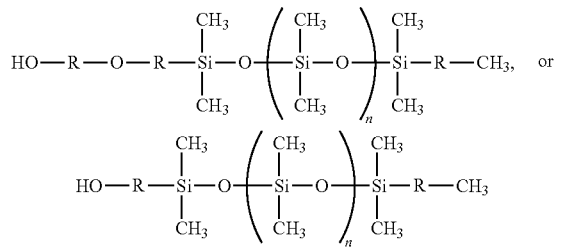

wherein R, independent of one another, is a $C_3$-$C_{12}$ straight chain alkyl or an alkylene ether; and wherein n ranges from 0 to about 270.

The mPEG, a3) and d3), may have, independent of one another, a molecular weight ranging from 350 $\overline{M}_n$ to 20,000 $\overline{M}_n$ (e.g., 500 $\overline{M}_n$ to 800 $\overline{M}_n$, 550 $\overline{M}_n$ to 750 $\overline{M}_n$). Preferably, the mPEG has a molecular weight of 550 or of 750 g/mole.

The polyisocyanate, a1), may be present in an amount ranging from about 0.01 to 50 wt. % (e.g., 0.1 to 40 wt. %, 1 to 35 wt. %, 5 to 30 wt. %, 15 to 25 wt. %), based on the solid content of the amphiphilic additive, a). The monocarbinol-terminated PDMS, a2), may be present in an amount ranging from about 0.01 to 50 wt. % (e.g., 5 to 45 wt. %, 10 to 30 wt. %, 15 to 25 wt. %), based on the solid content of the amphiphilic additive, a). The mPEG, a3), may be present in an amount ranging from about 0.01 to 75 wt. % (e.g., 0.1 to 70 wt. %, 1 to 68 wt. %, 20 to 65 wt. %, 30 to 60 wt. %, 40 to 50 wt. %), based on the solid content of the amphiphilic additive, a).

The mole % ratio of monocarbinol-terminated PDMS, a2): mPEG, a3), in the amphiphilic additive, a), may range from 0:100 to 100:0 (e.g., 10:90, 20:80, 30:70, 33:66, 40:60, 50:50, 60:40, 66:33, 70:30, 80:20, 90:10).

The amphiphilic additive, a), and the amphiphilic PEG-PDMS isocyanate prepolymer, d), may be, independent of one another, present in an amount ranging from about 0.1 to 40 wt. % (e.g., 1 to 35 wt. %, 5 to 30 wt. %, 10 to 25 wt. %, 15 to 20 wt. %), based on the solid content of the curable coating composition. The polyisocyanate, b), may be present in an amount ranging from about 10 to 40 wt. % (e.g., 15 to 35 wt. %, 20 to 30 wt. %), based on the solid content of the curable coating composition. The amount of polyisocyanate, b), added should maintain an overall isocyanate to total hydroxyl equivalents where the isocyanate is in a slight molar excess, for example an isocyanate to hydroxyl equivalent ratio of 1.2:1 or 1.1:1, for the final curable coating composition. The polyol, c), may be present in an amount ranging from about 20 to 60 wt. % (e.g., 25 to 55 wt. %, 30 to 50 wt. %, 35 to 45 wt. %). The curable coating composition may also contain a solvent which, if present, may be present in an amount from about 0.5 to 75 wt. % (e.g., 1 to 65 wt. %, 2 to 45 wt. %, 5 to 40 wt. %, 10 to 35 wt. %, 15 to 30 wt. %, 20 to 25 wt. %).

The amphiphilic additive, a), and/or the one amphiphilic PEG-PDMS isocyanate prepolymer, d), may be prepared by first dissolving the polyisocyanate in a suitable organic solvent or mixture of organic solvents. Suitable organic solvents include, but are not limited to, ethyl-3-ethoxypropionate (EEP), butyl acetate, t-butyl acetate, amyl acetate, acetone, methylethyl ketone, methyl amyl ketone, N,N-dimethyl formamide, N-methyl pyrollidinone, dimethyl sulfoxide, and the like. The monocarbinol-terminated PDMS and/or mPEG may be added to the solution together with a suitable catalyst, for example organometallic compounds or organic bases, and other such catalysts known in the art. Examples of organometallic compounds are dibutyl tin dilaurate, dibutyl tin diacetate (DBTDAc), bismuth carboxylate, and compounds of zirconium and aluminum such as K-Kat 4205, K-Kat-5218, and K-Kat-XC-6212. Examples of organic base catalysts are sold under the DABCO trade name by Air Products. DABCO is 1,4-diazabicyclo[2.2.2]octane. The reaction typically takes place at room temperature with stirring for several hours, for example, 4-12 hours.

The polyol, c), may be selected from the group consisting of polyester polyols, polyether polyols, polycarbonate polyols, acrylic polyols, and mixtures thereof. Preferably, the polyol, c), is an acrylic polyol. The polyol may include polyol having at least three hydroxyl groups. A mixture of polyols can also be used in formulating a polyurethane coating. Polyester polyols can include those made from the melt polycondensation of polyfunctional acids with polyfunctional alcohols or those made from the ring opening polymerization of cyclic monomers such as epsilon-caprolactone. Examples of suitable polyester polyols include, for example, poly(caprolactone) polyols, poly(hexamethylene adipate), and the like. Examples of suitable polyether polyols include, for example, poly(ethyleneglycol), poly(propylene glycol), poly(butylene glycol), poly(tetramethylene oxide), and the like. Acrylic polyols may be synthesized, typically by free radical polymerization, from a mixture of at least one hydroxy functional monomer plus one or more non-functional monomers. Suitable hydroxy-functional monomers include, for example, hydroxyethyl acrylate, hydroxyethyl methacrylate, hydroxypropyl acrylate, hydroxypropyl methacrylate, and the like. Examples of non-functional monomers include, for example, styrene, methyl methacrylate, methyl acrylate, butyl methacrylate, butyl acrylate, lauryl methacrylate, lauryl acrylate, 2-ethylhexyl acrylate, 2-ethyl hexyl methacrylate, and the like. The acrylic polyol may be synthesized in solution using a thermally-activated free radical initiator. The polyol can be synthesized in either a batch, semi-batch or continuous process. Examples of free radical initiators are benzoyl peroxide, t-amyl peroxy-2-ethylhexanoate, t-butyl hydroperoxide, di-t-butyl peroxide, azobisisobutyronitrile, azobisisovaleronitrile, and the like. The acrylic polyol may be made by free radical polymerization and then diluted in a solvent, such as toluene, xylene, methylisobutyl ketone, and the like. In one embodiment, the polyol may include a polycaprolactone polyol such as a polycaprolactone triol. One example of an acrylic polyol for use in a coating composition of the invention is an acrylic polyol composed of 80% butyl acrylate and 20% 2-hydroxy ethyl acrylate by weight.

Catalysts for the crosslinking of the curable coating compositions can be either organometallic complexes or organic bases, and other such catalysts known in the art. Examples of organometallic compounds are dibutyl tin dilaurate, dibutyl tin diacetate, bismuth carboxylate, and compounds of zirconium and aluminum such as K-Kat 4205, K-Kat-5218, and K-Kat-XC-6212. Examples of organic base catalysts are sold under the DABCO trade name by Air Products. DABCO is 1,4-diazabicyclo[2.2.2]octane. Suitable examples of isocyanate reaction catalysts include diethyl tin diacetate, dibutyltin diacetate, dibutyltin dilaurate, dibutyltin maleate, dilauryltin diacetate, dioctyltin diacetate, or a mixture thereof. In one embodiment the isocyanate reaction catalyst includes a tin catalyst. The curable coating compositions may also be formulated with or without solvents.

The curable coating compositions of the invention, as mentioned above, may be a solvent-free coating composition or may optionally contain a solvent such as, for example, acetone, THF, methyl ethyl ketone (MEK), xylene, acetone, acetylacetone, benzene, toluene, methyl amyl ketone (MAK), methyl isobutyl ketone, butyl acetate, t-butyl acetate, ethyl 3-ethoxypropionate (EEP), isopropanol, aromatic 100, aromatic 150, tetrahydrofuran, diethyl ether, butanol, butoxyethanol, etc. The curable coating compositions may be a solution in such a solvent or mixture of solvents.

The curable coating compositions may also include a pot life extender, such as, for example, alkane-2,4-dione (e.g., 2,4-pentadione), N,N-dialkyl acetoacetamide, alkyl acetoacetate, and the like. These, and the other common additives discussed below, may be included in amounts known in the art for their use.

The invention also relates to the use of the curable coating compositions of the invention which may be coated onto a substrate and cured using techniques known in the art. The substrate can be any common substrate such as paper, polyester films such as polyethylene and polypropylene, metals such as aluminum and steel, glass, urethane elastomers, primed (painted) substrates, and the like. The invention further relates to an article of manufacture or object (e.g., a boat hull) comprising the curable coating compositions of the invention.

The curable coating compositions of the invention may be cured at room temperature (ambient cure) or at elevated temperatures (thermal cure).

The invention also relates to a method for reducing or preventing biofouling of a surface exposed to an aqueous environment comprising the steps of: coating the surface with the curable coating compositions to form a coated surface, and curing the coating composition on the coated surface.

The invention also relates to a marine fouling-release coating comprising the curable coating compositions.

The curable coating compositions of the invention may further contain a pigment (organic or inorganic), if a coating having a particular color is desired, and/or additives and fillers known in the art. For example, the curable coating compositions of the invention may further contain coating additives. Examples of such coating additives include, but are not limited to, one or more leveling, rheology, and flow control agents such as silicones, fluorocarbons, or cellulosics; extenders; reactive coalescing aids such as those described in U.S. Pat. No. 5,349,026, incorporated herein by reference; plasticizers; flatting agents; pigment wetting and dispersing agents and surfactants; ultraviolet (UV) absorbers; UV light stabilizers; tinting pigments; colorants; defoaming and antifoaming agents; anti-settling, anti-sag and bodying agents; anti-skinning agents; anti-flooding and anti-floating agents; biocides, fungicides, and mildewcides; corrosion inhibitors; thickening agents; or coalescing agents. Specific examples of such additives can be found in Raw Materials Index, published by the National Paint & Coatings Association, 1500 Rhode Island Avenue, N.W., Washington, D.C. 20005. Further examples of such additives may be found in U.S. Pat. No. 5,371,148, incorporated herein by reference.

Examples of flatting agents include, but are not limited to, synthetic silica, available from the Davison Chemical Division of W. R. Grace & Company as SYLOID®; polypropylene, available from Hercules Inc., as HERCOFLAT®; synthetic silicate, available from J. M. Huber Corporation, as ZEOLEX®.

Examples of viscosity, suspension, and flow control agents include, but are not limited to, polyaminoamide phosphate, high molecular weight carboxylic acid salts of polyamine amides, and alkylene amine salts of an unsaturated fatty acid, all available from BYK Chemie U.S.A. as ANTI TERRA®. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

EXAMPLES

Example 1

As described below, polydimethyl siloxane and polyethylene glycol modified Isophorone diisocyanate (IPDI) pre-polymers were synthesized. Later, the pre-polymers were used to prepare siloxane polyurethane FR coatings according to the invention. IPDI trimer (Desmodur Z4470 BA) was diluted with EEP and reacted with polyethylene glycol methyl ether (m-PEG) and monocarbinol-terminated polydimethyl siloxane (PDMS). Three siloxane molecular weight were used (1000, 5000, and 10000 g/mole). Two molecular weight variations (550, 750 g/mole) were used for m-PEG.

1.1 Materials

Monocarbinol-terminated polydimethyl siloxane (PDMS) with three molecular weights (MCR-C12:1000, MCR-C18:5000, MCR-C22:10000 g/mole) were purchased from Gelest Inc. Isophorone diisocyanate (IPDI) polyisocyanate Desmodur Z4470 BA was generously provided by Bayer MaterialScience. Acetylacetone, methyl amyl ketone (MAK), ethyl-3-ethoxypropionate (EEP), polyethylene glycol methyl ether (m-PEG 550 and 750 g/mole), and dibutyltin diacetate (DBTDAc) were purchased from Sigma Aldrich. An acrylic polyol composed of 80% butyl acrylate and 20% 2-hydroxylethyl acrylate was synthesized via conventional free radical polymerization and diluted in 50% toluene. Aminopropyl-terminated polydimethyl siloxane (APT-PDMS) with molecular weight 20000 g/mole that was synthesized through ring opening equilibration reaction was used for internal control.

Intersleek 700 (IS 700), Intersleek 900 (IS 900), Intersleek 1100 SR (IS 1100SR) commercial FR coatings and Intergard 264 marine primer were provided by International Paint. Hempasil X3 commercial FR coating was provided by Hempel. Silicone elastomer, Silastic® T2 (T2) was provided by Dow Corning. Aluminum panels (4×8 in., 0.6 mm thick, type A, alloy 3003 H14) purchased from Q-lab were sand blasted and primed with Intergard 264 using air-assisted spray application. Microtiter plates were modified using circular disks (1 inch diameter) of primed aluminum.

1.2 Pre-Polymer Formulation

Table 1 contains formulation for IPDI-10%-1kPDMS-550PEG pre-polymer modified with PDMS (MW=1000) and m-PEG (MW=750). IPDI trimer Desmodur Z4470 BA, which contains 70% solids, was used as the isocyanate. First isocyanate (3.4299 g) and EEP (1.6000 g) was weighed into a 40 mL glass vial with magnetic stir bar. The content was thoroughly mixed using the vortex for 5 mins. Next, PDMS (1.6000 g), PEG (1.6000 g), and catalyst solution (0.3200 g) were added. The content was thoroughly mixed using the vortex followed by overnight mixing using magnetic stirring. The isocyanate to total hydroxyl equivalence ratio was maintained at 3:2 for all pre-polymers. FIG. 1 depicts a general structure proposed for the pre-polymers synthesized. In the structure, X can be either an isocyanate group, PDMS chain linked through urethane or m-PEG linked through urethane. The integer "m" connotes the repeating units in the PDMS and the integer "n" the repeating units in the m-PEG.

ATR™ accessory using a hemispherical Ge crystal was used to obtain ATR-FTIR spectrum of coatings.

Figure 2:
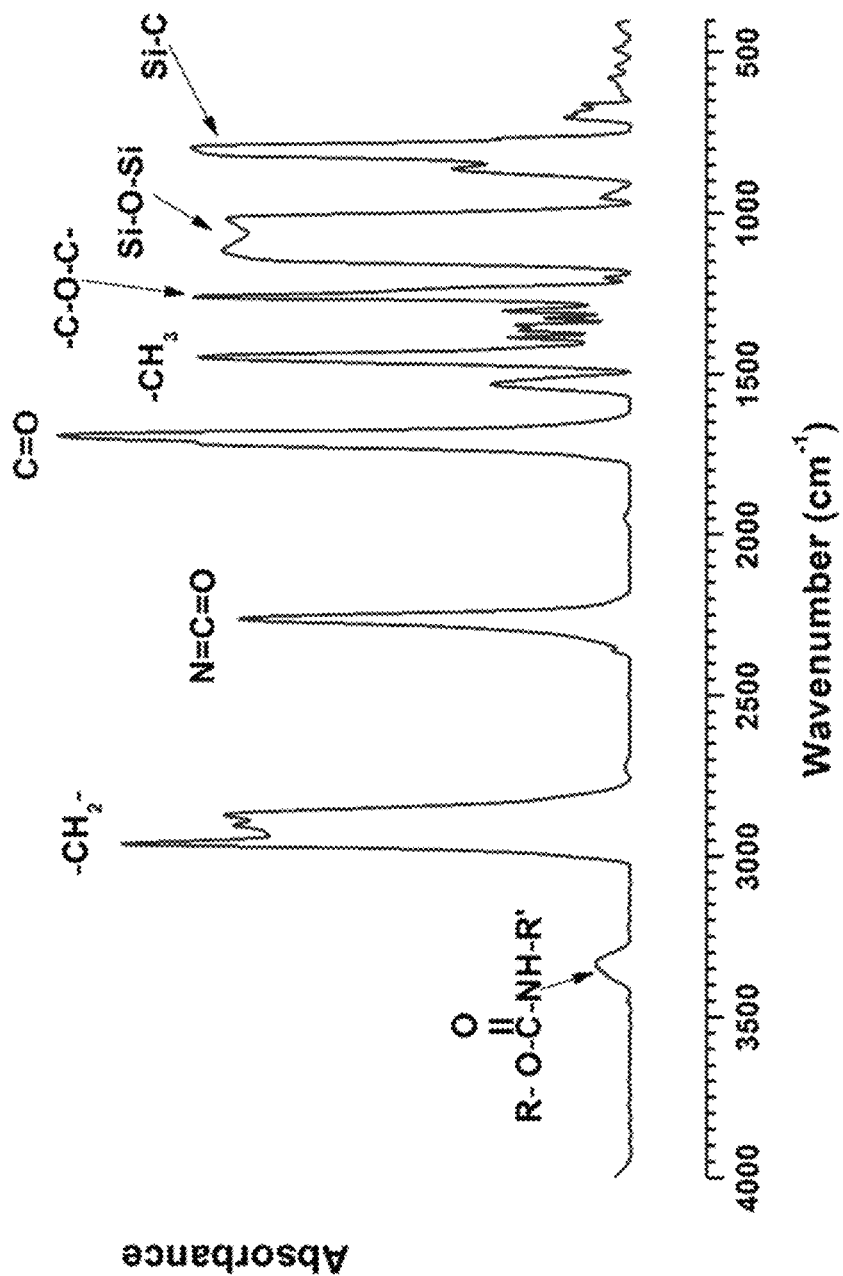
FIG. 2 depicts the FTIR of the liquid pre-polymer IPDI-10%-5kPDMS-550PEG.

FIG. 2 shows the FTIR of the liquid pre-polymer IPDI-10%-5kPDMS-550PEG. The peak at approximately 2200 $cm^{-1}$ indicates the presence of residual, unreacted isocyanate which is used for crosslinking with the acrylic polyol later. The peak at 3300-3400 $cm^{-1}$ due to N—H stretching shows successful reaction of isocyanate with OH-PDMS and m-PEG. This could also be supported by the presence of carbamate (C=O) peak at 1690 $cm^{-1}$. The ether stretching (—C—O—C—) due to ethylene glycol is also present in the FTIR spectrum at 1210 $cm^{-1}$. Presence of siloxane (—Si—O—Si—) stretching can be seen at 1000-1100 $cm^{-1}$.

Figure 3:
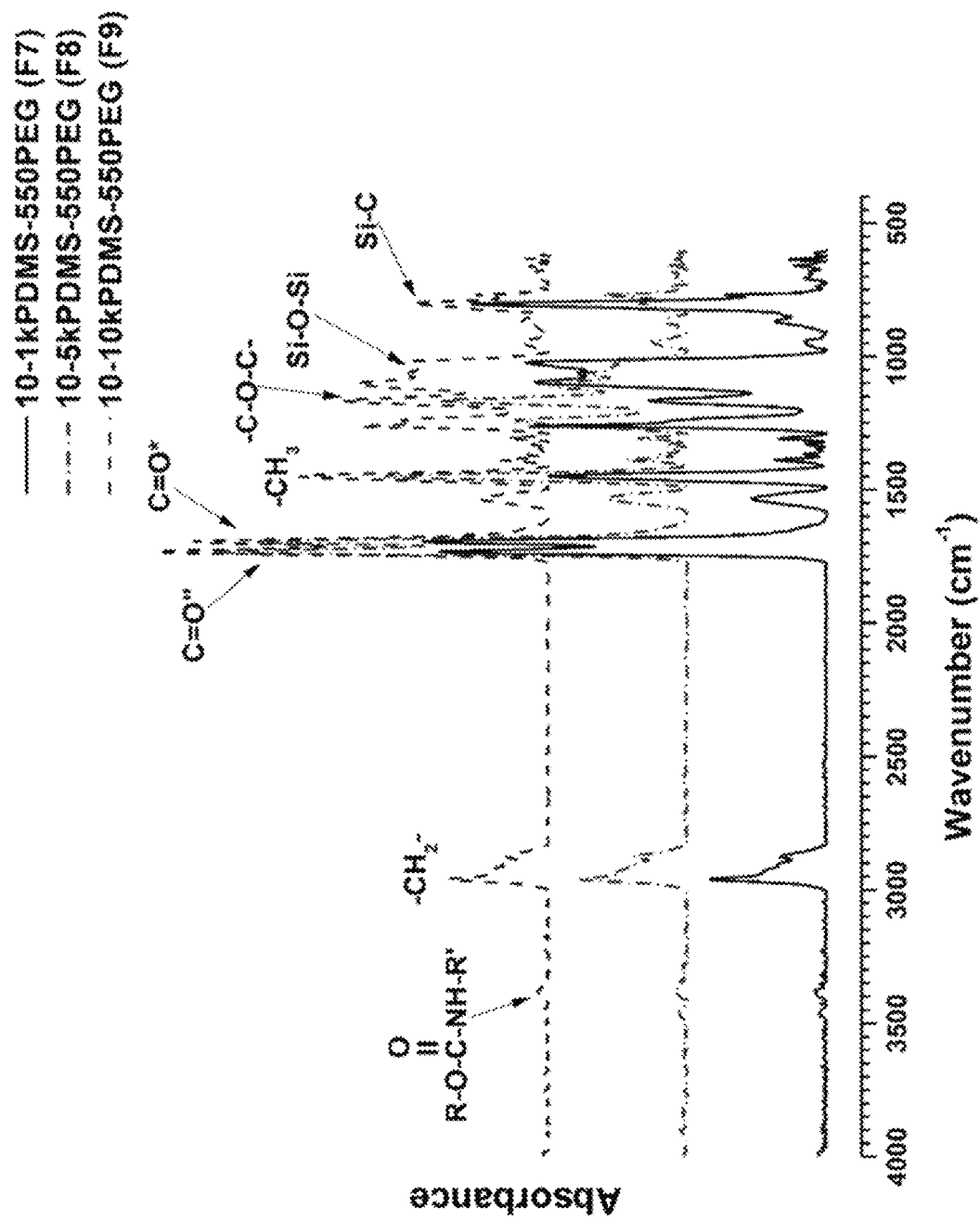
FIG. 3 depicts the normalized ATR-FTIR for coatings 7, 8, and 9 (described below).

ATR-FTIR provided information about chemical functional groups present on the top surface of solid materials. Typical penetration depth of ATR-FTIR varies from 0.5 to 2 μm depending on the angle of incidence, wavelength of light, and the refractive indices of ATR crystal and the material of interest. FIG. 3 shows the normalized ATR-FTIR for IPDI-10%-PDMS-550PEG pre-polymer containing coating formulations 7, 8, and 9 (Table 5) after water

TABLE 1

Composition of the IPDI-PDMS-PEG-prepolymer Part 1

IPDI-5%-1KPDMS-550PEG-prepolymer

| Ingredients | Mw (g/mol) | Amount (g) | Wt. % | Eq. Wt (g/eq) | F1 Eq | % Solids | Amount Added (g) |
|---|---|---|---|---|---|---|---|
| Isocyanate (Desmodur Z 4470 BA) | | 2.4010 | 15.0060 | 355 | 6.76E−03 | 70 | 3.4299 |
| EEP | — | — | — | — | — | — | 1.6000 |
| Monocarbinol-terminated PDMS | 1000 | 1.6000 | 10.0000 | 1000 | 1.60E−03 | 100 | 1.6000 |
| Hydroxyl-terminated PEG-750 | 550 | 1.6000 | 10.0000 | 550 | 2.91E−03 | 100 | 1.6000 |
| DBTDAc | — | 0.0032 | 0.0200 | — | — | 1 | 0.3200 |

Table 2 describes exemplary pre-polymer compositions made according to the invention. $X_2/X_1$ ranged from (0.0347-0.2857) and $X_3/X_1$ ranged from (0.6318-0.3810), respectively.

Immersion. These coatings have 10% PDMS and PEG content (based on the total solids) with m-PEG 550 being used in all three. However, the PDMS molecular weight was varied from 1000, 5000, to 10000. FTIR spectrum shows the

TABLE 2

Pre-polymer Compositions

| Pre-polymer | Wt. of IPDI trimer (g) | NCO Eq. ($X_1$) | MW of PDMS | Wt. of PDMS (g) | OH Eq. from PDMS ($X_2$) | MW of m-PEG | Wt. of m-PEG (g) | OH Eq. from m-PEG ($X_3$) | EEP (g) |
|---|---|---|---|---|---|---|---|---|---|
| IPDI-5-1kPDMS-550PEG | 1.7152 | 3.38E−03 | 1000 | 0.8000 | 8.00E−04 | 550 | 0.8000 | 1.45E−03 | 1.6000 |
| IPDI-5-5kPDMS-550PEG | 1.2283 | 2.42E−03 | 5000 | 0.8000 | 1.60E−04 | 550 | 0.8000 | 1.45E−03 | 1.6000 |
| IPDI-5-10kPDMS-550PEG | 1.1675 | 2.30E−03 | 10000 | 0.8000 | 8.00E−05 | 550 | 0.8000 | 1.45E−03 | 1.6000 |
| IPDI-5-1kPDMS-750PEG | 1.4199 | 2.80E−03 | 1000 | 0.8000 | 8.00E−04 | 750 | 0.8000 | 1.07E−03 | 1.6000 |
| IPDI-5-5kPDMS-750PEG | 0.9330 | 1.84E−03 | 5000 | 0.8000 | 1.60E−04 | 750 | 0.8000 | 1.07E−03 | 1.6000 |
| IPDI-5-10kPDMS-750PEG | 0.8722 | 1.72E−03 | 10000 | 0.8000 | 8.00E−05 | 750 | 0.8000 | 1.07E−03 | 1.6000 |
| IPDI-10-1kPDMS-550PEG | 3.4299 | 6.76E−03 | 1000 | 1.6000 | 1.60E−03 | 550 | 1.6000 | 2.91E−03 | 1.6000 |
| IPDI-10-5kPDMS-550PEG | 2.4567 | 4.84E−03 | 5000 | 1.6000 | 3.20E−04 | 550 | 1.6000 | 2.91E−03 | 1.6000 |
| IPDI-10-10kPDMS-550PEG | 2.3351 | 4.60E−03 | 10000 | 1.6000 | 1.60E−04 | 550 | 1.6000 | 2.91E−03 | 1.6000 |
| IPDI-10-1kPDMS-750PEG | 2.8400 | 5.60E−03 | 1000 | 1.6000 | 1.60E−03 | 750 | 1.6000 | 2.13E−03 | 1.6000 |
| IPDI-10-5kPDMS-750PEG | 1.8663 | 3.68E−03 | 5000 | 1.6000 | 3.20E−04 | 750 | 1.6000 | 2.13E−03 | 1.6000 |
| IPDI-10-10kPDMS-750PEG | 1.7446 | 3.44E−03 | 10000 | 1.6000 | 1.60E−04 | 750 | 1.6000 | 2.13E−03 | 1.6000 |

1.3 Characterization

Fourier Transformed Infrared (FTIR) spectroscopy was used to characterize the pre-polymers prepared. The liquid pre-polymer was spread on a potassium bromide (KBr) plate as a thin film prior to obtaining the spectrum. Attenuated Total Reflectance Fourier Transformed Infrared spectroscopy (ATR-FTIR) was utilized to characterize the coating surfaces after water aging. Bruker Vertex 70 with Harrick's presence of —C—O—C— (1180 $cm^{-1}$) and —Si—O—Si— (1020-1100 $cm^{-1}$) functionalities, suggesting the presence of both PEG and PDMS. However, the intensity of —Si—O—Si— (1020-1100 $cm^{-1}$) and Si—$CH_3$ (790 $cm^{-1}$) peaks are slightly lower in coatings 8 and 9 compared to coating 7. Simultaneously, the peaks corresponding to PEG are slightly lower in intensity for coating 7 compared to the other two coatings. Therefore, coating 7 may have higher concentration of siloxane closer to the surface compared to other two coatings. The spectrum shows presence of two types of carbonyl groups C=O (1750 cm$^{-1}$) and C=O (1690 cm$^{-1}$). The C=O" corresponds to the carbonyl on acrylic polyol and the C=O* corresponds to the carbamate group. The peak for R—O—C(O)—NH—R' is weak but visible at (3350-3450 cm$^{-1}$), suggesting very lower concentration closer to the coating surface.

1.4 Coating Formulation

After prepolymer formulation, additional isocyanate (5.0039 g) was added along with acrylic polyol (13.7926 g, BA: HEA 80:20 in 50% toluene) and pot life extender acetylacetone (0.3200 g). The overall isocyanate to total hydroxyl equivalence was maintained at 1.1:1 for the final formulation. The content was thoroughly mixed using the vortex followed by magnetic stirring for 1 hour. Table 3 describes a composition of the coating formulations of the invention.

Figure 4:
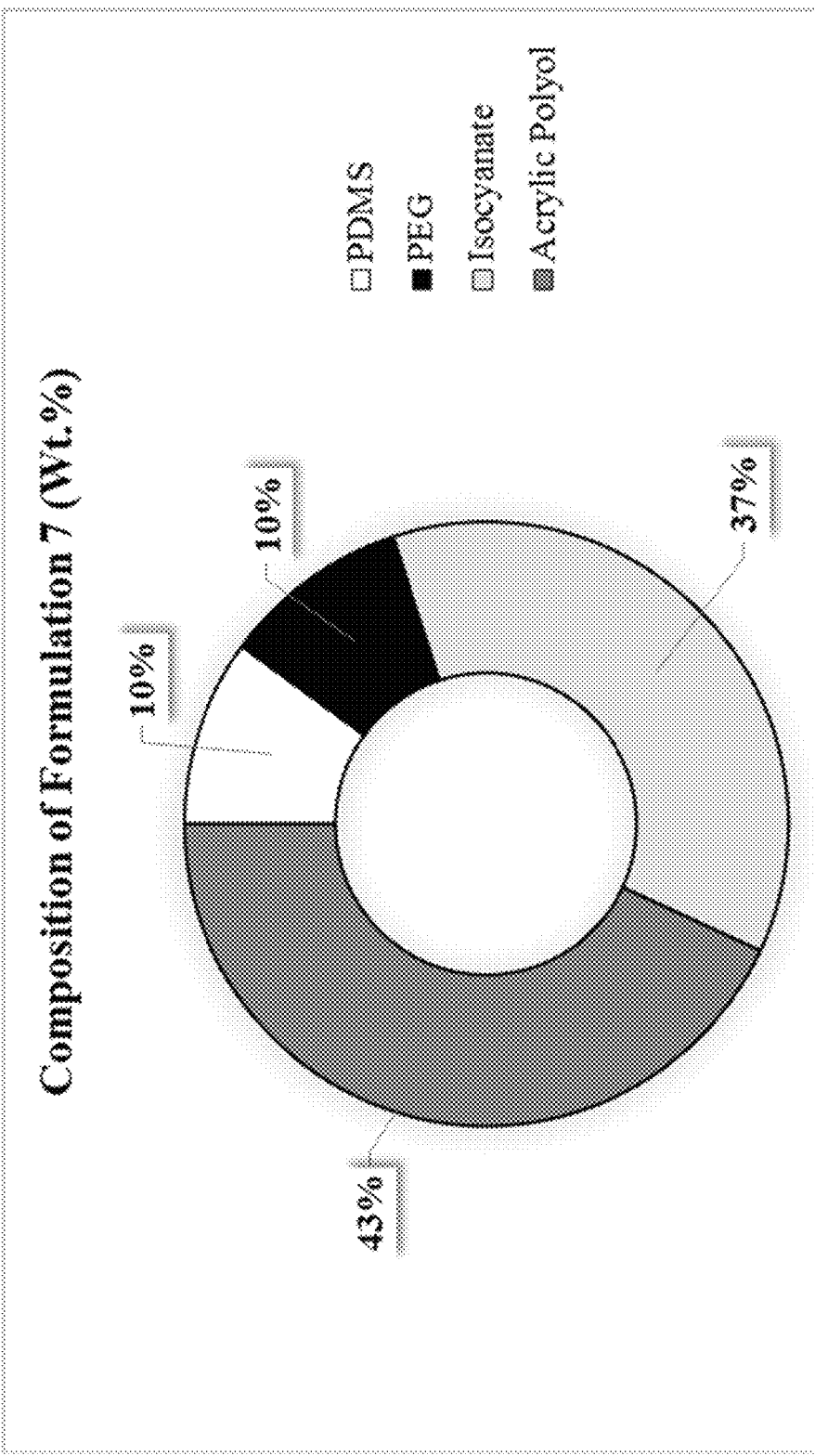
FIG. 4 shows the composition of basic ingredients in formulation 7 (described below) based on weight percent.

All other consequent formulations were also prepared following a similar procedure. PDMS and PEG levels of 5% and 10% were used based on the overall coating formulation. FIG. 4 shows the composition of basic ingredients based on solids of the main ingredients in formulation 7 (described above) based on weight percent. Additional solvent, catalyst (solution), and pot life extender were also included.

1.5 Control Coatings

All commercially available coatings were prepared following the technical data sheets provided by the suppliers. A brief description of the procedure followed to prepare siloxane polyurethane FR coatings is described here. The non-reactive components, such as, APT-PDMS (20% by wt.), acrylic polyol, and pot life extender, were combined in a glass container and allowed to mix overnight. On the next day, isocyanate (Desmodur 4470BA) and catalyst (0.05% by wt. from a 1% MAK solution) were added. The formulation

TABLE 3

Composition of Coating Formulation (Part 2)

IPDI-10-1KPDMS-550PEG-coating formulation part 2

| Ingredients | Mw (g/mol) | Amount (g) | Wt. % | Eq. Wt (g/eq) | Eq | % Solids | Amount Added (g) |
|---|---|---|---|---|---|---|---|
| Isocyanate (Desmodur Z 4470 BA) | | 3.5027 | 21.8920 | 355 | 9.87E−03 | 70 | 5.0039 |
| Acrylic Polyol | | 6.8963 | 43.1020 | 650 | 1.06E−02 | 50 | 13.7926 |
| Acetylacetone | | 0.3200 | 2.0000 | — | — | 100 | 0.3200 |

Formulation was deposited into microtiter plates and drawdowns were prepared on primed aluminum panels. For depositions, 250 μL of formulation were dispensed using an automatic pipette to each well. Drawdowns were made using a wire-wound drawdown bar with a wet film thickness of 80 μm on 8"×4" primed aluminum panels. Both microtiter plates and coated panels were allowed to cure under ambient conditions for 24 hrs. The following day, all the coatings were cured at 80° C. for 45 min.

Table 4 describes exemplary coating compositions made according to the invention.

was allowed to mix for about an hour. The isocyanate to other functional group (hydroxyl and amine) ratio was kept at 1.1:1. Drawdowns were made using a wire wound drawdown bar with 80 μm dry film thickness on 8"×4" aluminum panels previously primed with Intergard 264 primer. Formulation was deposited into microtiter plates, 250 μL of formulation were dispensed using an automatic pipette to each well. The coatings were allowed to cure for 24 hours under ambient conditions inside a dust free cabinet, followed by force curing in the oven at 80° C. for 45 minutes. Table 5 describes the list of control coatings.

TABLE 4

Coating Compositions

| Formulation # | Type of pre-polymer used | Type of PDMS | Overall Wt. % PDMS | Type of PEG | Overall Wt. % PEG |
|---|---|---|---|---|---|
| 1 | IPDI-5-1kPDMS-550PEG | PDMS-1k | 5 | m-PEG-550 | 5 |
| 2 | IPDI-5-5kPDMS-550PEG | PDMS-5k | 5 | m-PEG-550 | 5 |
| 3 | IPDI-5-10kPDMS-550PEG | PDMS-10k | 5 | m-PEG-550 | 5 |
| 4 | IPDI-5-1kPDMS-750PEG | PDMS-1k | 5 | m-PEG-750 | 5 |
| 5 | IPDI-5-5kPDMS-750PEG | PDMS-5k | 5 | m-PEG-750 | 5 |
| 6 | IPDI-5-10kPDMS-750PEG | PDMS-10k | 5 | m-PEG-750 | 5 |
| 7 | IPDI-10-1kPDMS-550PEG | PDMS-1k | 10 | m-PEG-550 | 10 |
| 8 | IPDI-10-5kPDMS-550PEG | PDMS-5k | 10 | m-PEG-550 | 10 |
| 9 | IPDI-10-10kPDMS-550PEG | PDMS-10k | 10 | m-PEG-550 | 10 |
| 10 | IPDI-10-1kPDMS-750PEG | PDMS-1k | 10 | m-PEG-750 | 10 |
| 11 | IPDI-10-5kPDMS-750PEG | PDMS-5k | 10 | m-PEG-750 | 10 |
| 12 | IPDI-10-10kPDMS-750PEG | PDMS-10k | 10 | m-PEG-750 | 10 |

TABLE 5

List of Control Coatings

| Coating | Control Name | Description |
|---|---|---|
| 13 | A4-20% | Internal Siloxane-PU FR Control |
| 14 | Hempasil X3 | Silicone Hydrogel based Commercial FR Control |
| 15 | NDSU-PU | Pure Polyurethane |
| 16 | Dow T2 | Silicone Elastomer |
| 17 | IS 700 | Intersleek Commercial FR Control |
| 18 | IS 900 | Intersleek Commercial FR Control |
| 19 | IS 1100SR | Intersleek Commercial FR (Slime Release) Control |

1.6 Water Aging and Biological Assay Tests

All the coatings were subjected to a pre-leaching process for 28 days. Coated plates and panels were placed in a water tank that was automatically emptied and refilled every hour. Following the pre-leaching process, a leachate toxicity study was conducted to ensure non-toxicity of the coatings. All the experimental coatings displayed non-toxicity. Next, bacteria (*C. lytica*), algae (*N. incerta*), barnacle (*A. amphitrite*), and mussel (*G. demissa*) assays were conducted. Detailed description of the assay tests use can be found in Casse et al., *Biofouling* 2007, 23 (3/4), 267-276; Stafslien et al., *Biofouling* 2007, 23 (1), 37-44; and Webster et al., *Biofouling* 2007, 23 (3/4), 179-192, which are incorporated herein by reference.

Figure 5:
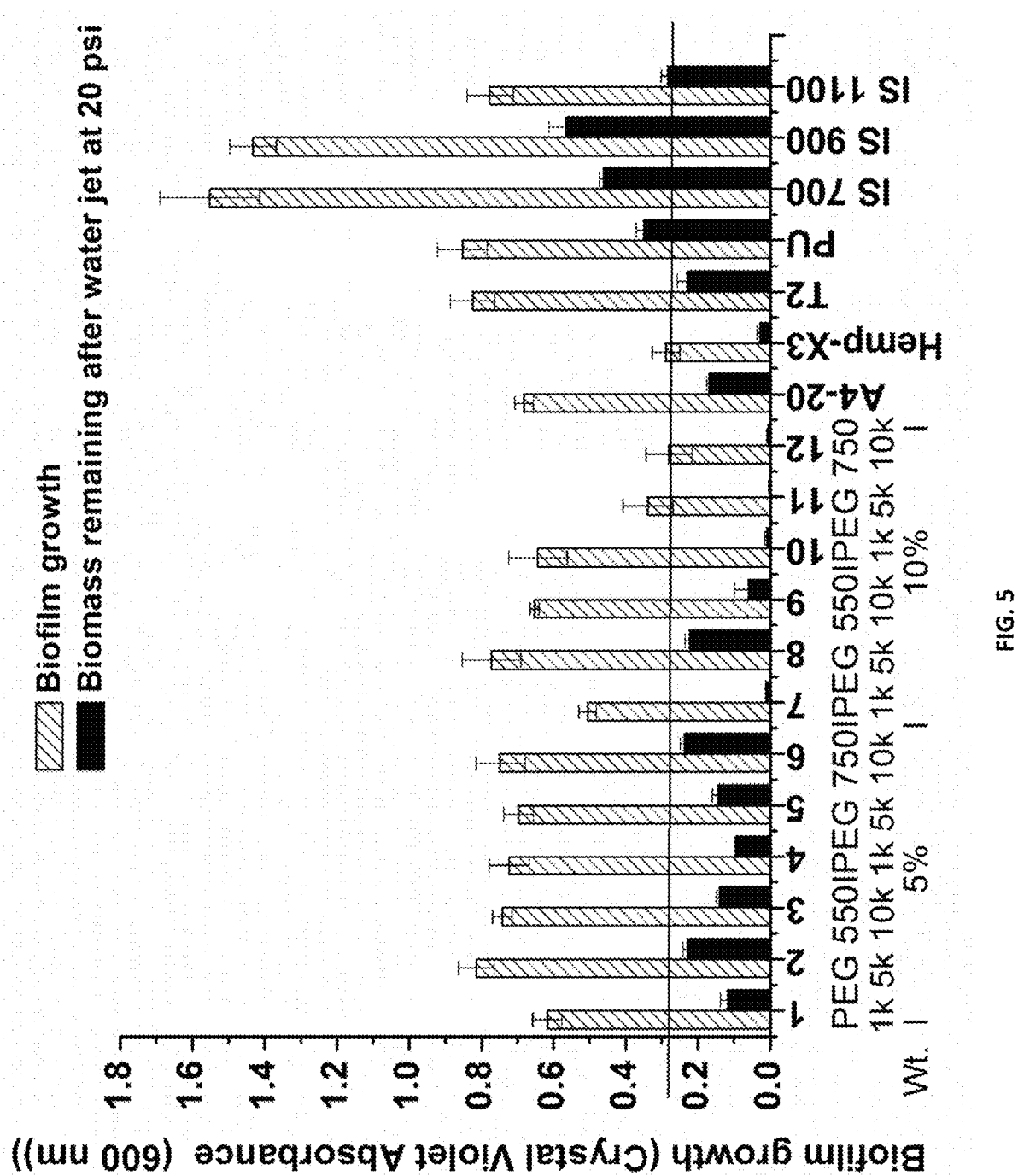
FIG. 5 shows the bacterial biofilm (*Cellulophaga lytica*) growth and retention after water-jet treatment at 20 Psi pressure.
Figure 6:
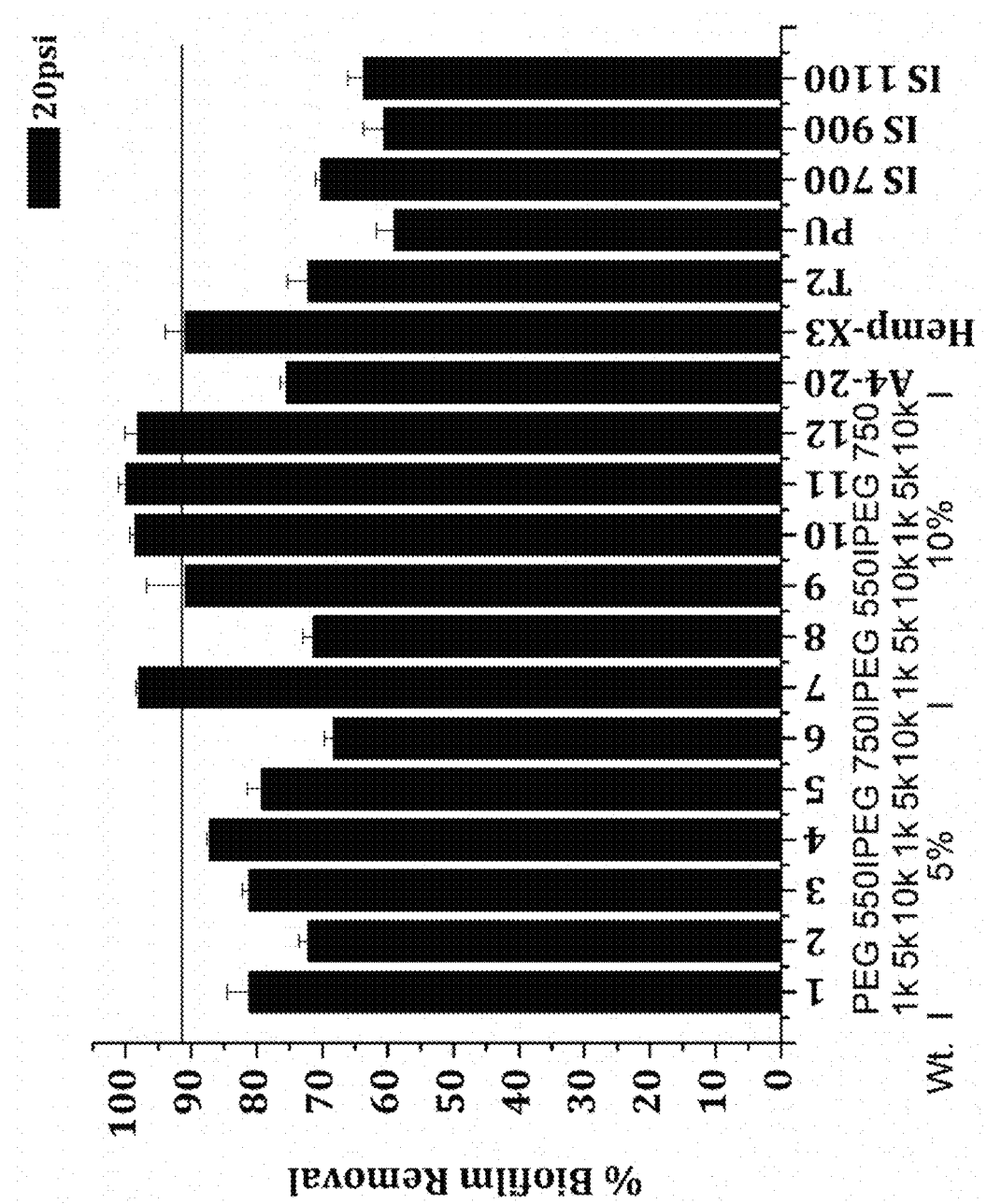
FIG. 6 shows the percent removal of bacterial biofilm (*Cellulophaga lytica*) after water-jet treatment at 20 Psi pressure.

FR performance towards marine bacterium *Cellulophaga lytica* for experimental and control coatings were evaluated by a retention and retraction assay followed by water-jet treatment to evaluate adhesion (FIGS. 5 and 6). FIG. 5 shows the bacterial biofilm (*Cellulophaga lytica*) growth and retention after water-jet treatment at 20 Psi pressure. FIG. 6 shows the percent removal of bacterial biofilm (*Cellulophaga lytica*) after water-jet treatment at 20 Psi pressure.

Absorbance of crystal violet at 600 nm wavelength is directly proportional to the biomass present. Bacterial biofilm growth and retention for coatings with IPDI-10-1kPDMS-750PEG, IPDI-10-5kPDMS-750PEG, and IPDI-10-10kPDMS-750PEG pre-polymers showed comparable results to Hempasil X3 commercial FR coating. These compositions show almost complete removal of biofilms after water-jet. Also, the coatings 7 and 9 displayed >90% biofilm removal upon treatment of water-jet at 20 psi pressure. In general, coatings 7, 9, 10, 11, and 12 were on par with commercial FR coatings from International Paint in terms of bacterial biofilm removal. Overall, the several IPDI-PEG-PDMS pre-polymer modified coatings demonstrated significantly improved FR performance towards *Cellulophaga lytica* compared to A4-20% 1$^{st}$ generation siloxane polyurethane formulation. Results from bacterial biofilm assay suggests that *Cellulophaga lytica* have lower affinity towards IPDI-PEG-PDMS pre-polymer modified siloxane polyurethane coatings.

Figure 7:
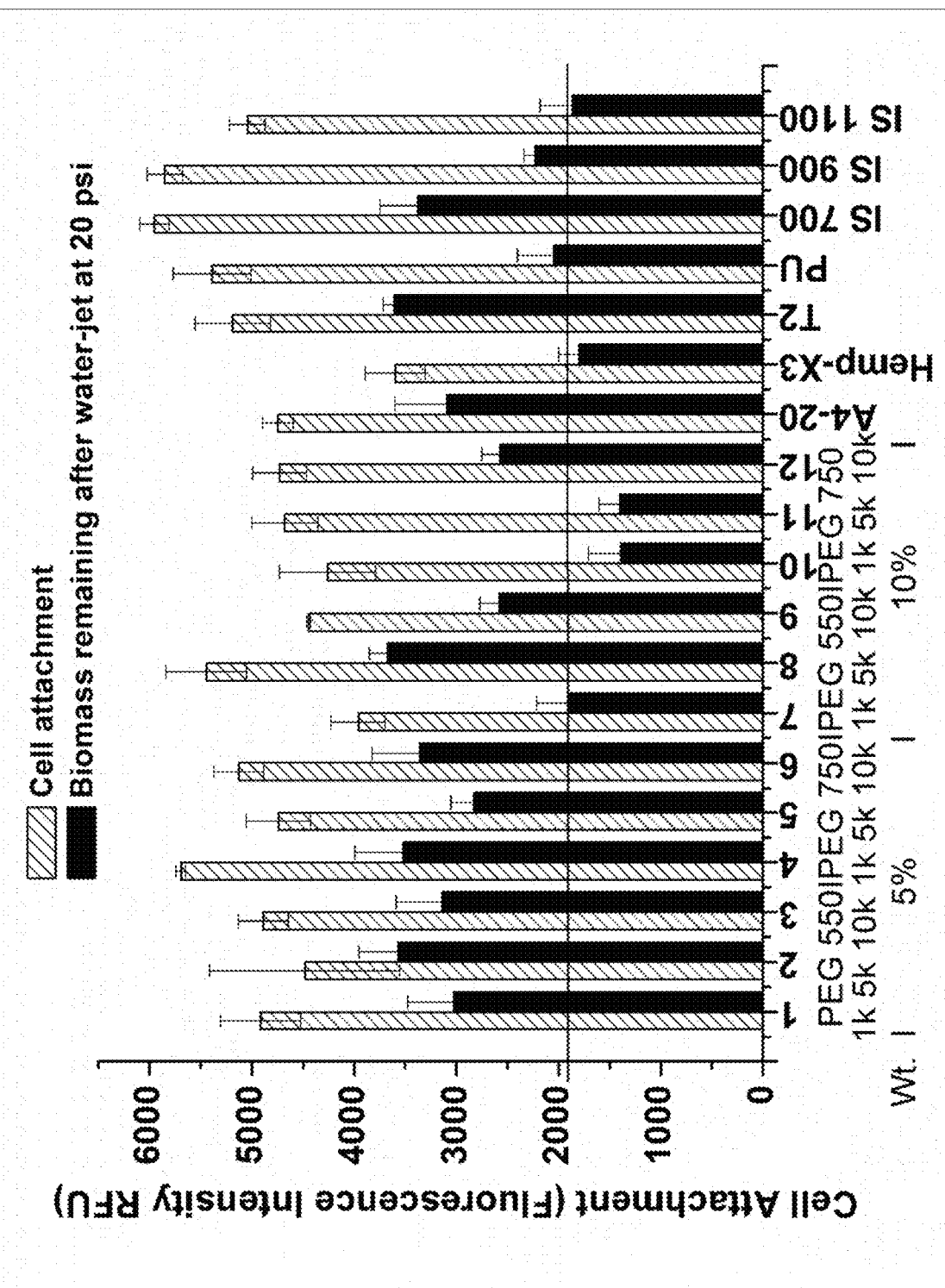
FIG. 7 shows the microalgae (*Navicula incerta*) attachment and retention after water-jet treatment at 20 Psi pressure.
Figure 8:
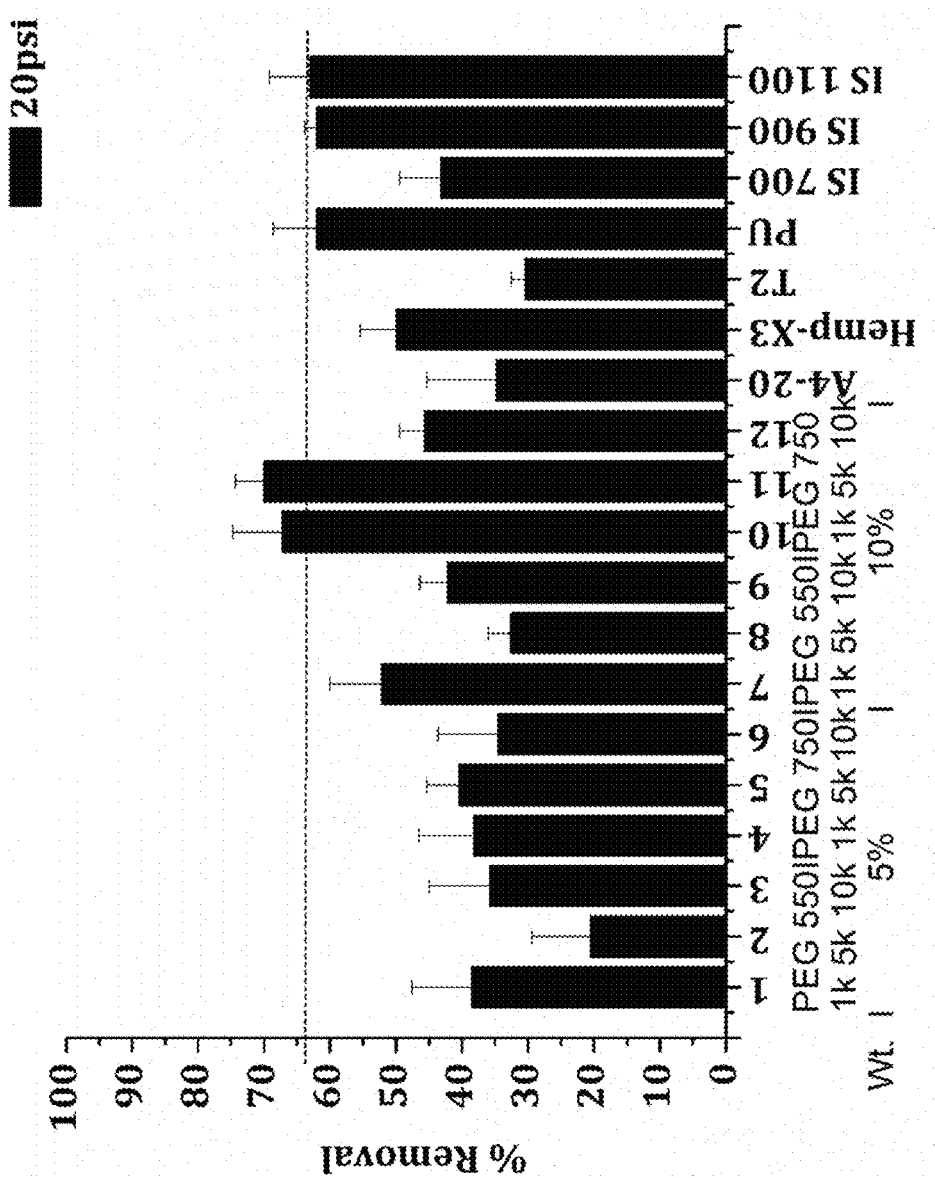
FIG. 8 shows the percent removal of microalgae (*Navicula incerta*) after water-jet treatment at 20 Psi pressure.

FR performance towards slime forming diatoms *Navicula incerta* were evaluated using a similar assay (FIGS. 7 and 8). FIG. 7 shows the microalgae (*Navicula incerta*) attachment and retention after water-jet treatment at 20 Psi pressure. FIG. 8 shows the percent removal of microalgae (*Navicula incerta*) after water-jet treatment at 20 Psi pressure.

The amount of biomass was determined using the chlorophyll extraction. Coating compositions 7, 10, and 11 showed the lowest retention of diatoms after 20 psi water-jet treatment, which is similar to the performance of Intersleek 1100 SR, Intersleek 900, Polyurethane, and Hempasil X3. Coatings with IPDI-10-1kPDMS-750PEG and IPDI-10-5kPDMS-750PEG pre-polymers showed significant improvement in diatom removal compared to A4-20 siloxane polyurethane formulation. Thus suggesting that micro algae *Navicula incerta* have lower adhesion towards pre-polymers with longer PEG chains. In general, it has been a challenge to find a coating composition that provides good FR performance towards both *Cellulophaga lytica* and *Navicula incerta*, mainly due to their opposite preference for surface wettability. *Cellulophaga lytica* preferentially adheres to hydrophilic surfaces whereas *Navicula incerta* preferentially adheres to hydrophobic surfaces. Bodkhe et al., *Prog. Org. Coat.* 2012, 75 (1-2), 38-48. Coating formulations 10 and 11 appeared to address that issue since both showed the best FR performance towards bacteria and diatoms.

Figure 9:
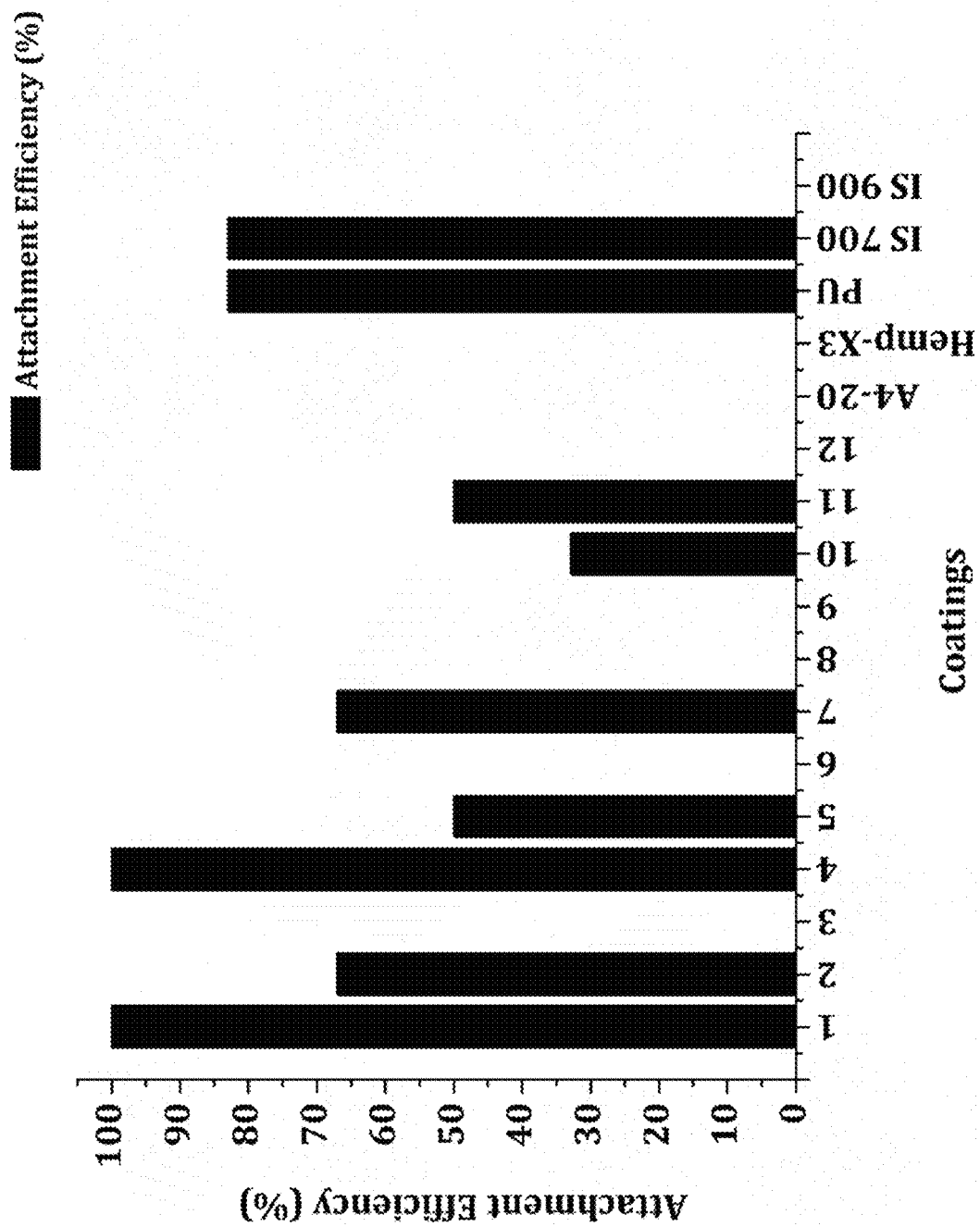
FIG. 9 shows the attachment efficiency of mussels (*Geukensia demissa*) based on 6 mussel attachment attempts.
Figure 10:
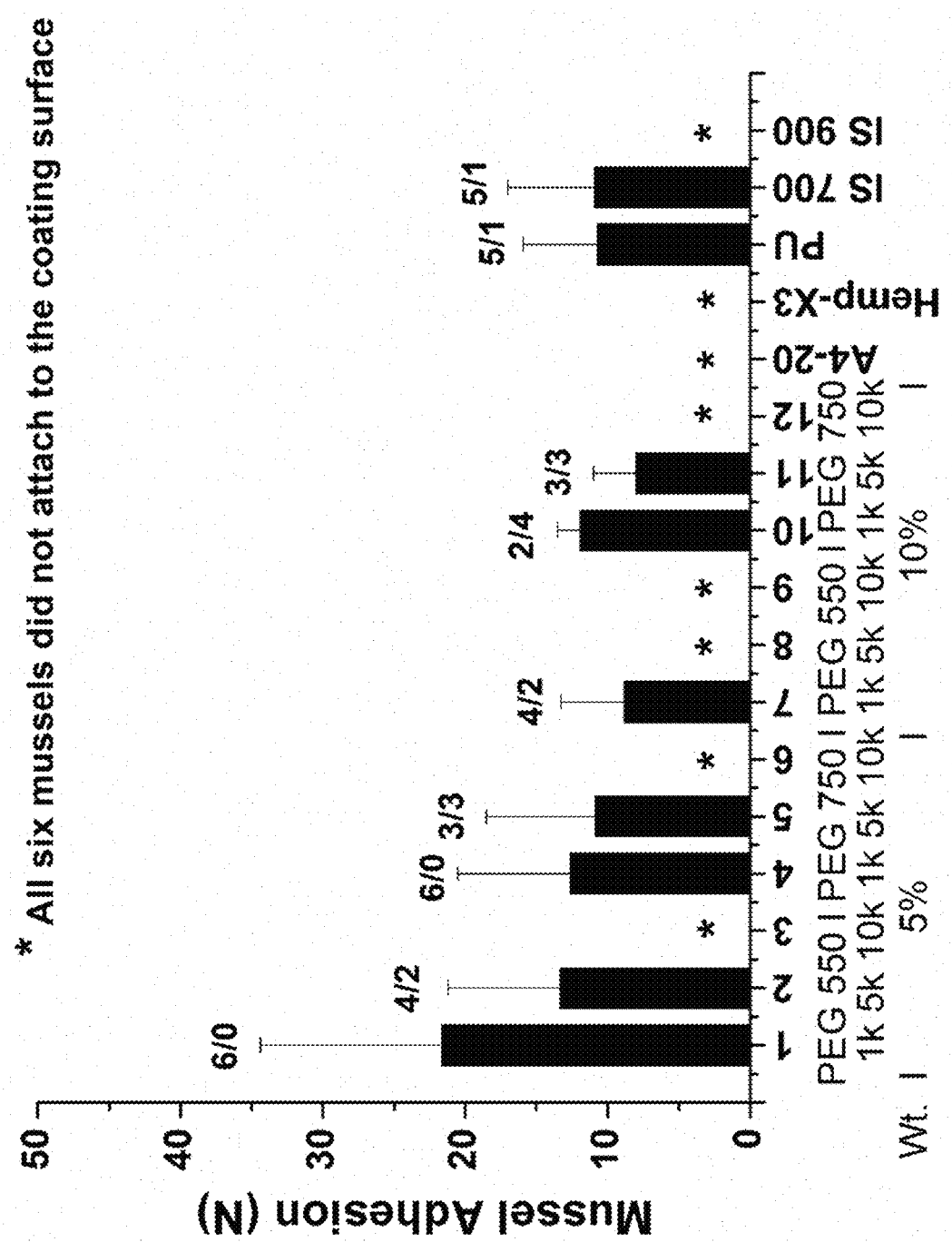
FIG. 10 shows the mussel adhesion (*Geukensia demissa*) based on attached mussels.

Several experimental coatings with IPDI-PEG-PDMS pre-polymer coatings showed no mussel attachment, suggesting that mussels did not prefer to settle on these coatings (FIGS. 9 and 10). FIG. 9 shows the attachment efficiency of mussels (*Geukensia demissa*) based on 6 mussel attachment attempts. FIG. 10 shows the mussel adhesion (*Geukensia demissa*) based on attached mussels, 6 mussel attachment attempts. Similarly, Intersleek 900, Hempasil X3, and A4-20 control showed no mussel attachment. However, the coating compositions that demonstrated excellent FR performance towards bacteria and diatoms showed some mussel attachment, although they were easily removed with approximately 10 N force. Out of the coatings that displayed some mussel attachments, coatings 10 and 11 showed the lowest number of mussel attachment and lower force for removal, suggesting good overall FR performance towards all three organisms.

Figure 11:
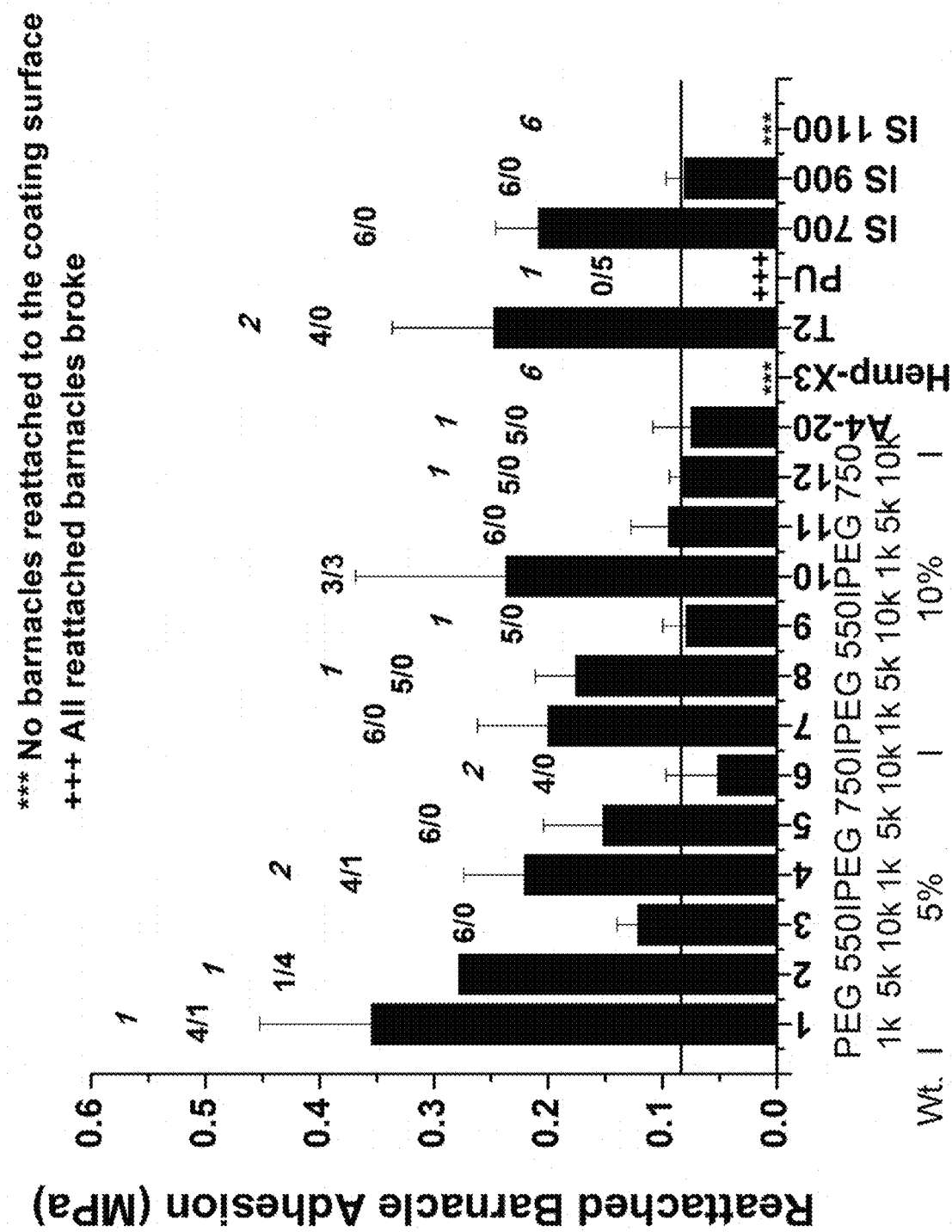
FIG. 11 shows reattached barnacle (*Amphibalanus amphitrite*) adhesion strength. Six barnacles were used for each reattachment study, out of which italicized numbers represent the non-attached barnacles. The ratio represents the number of released barnacles versus the number of broken/damaged barnacles during push off measurements. Each bar represents the average adhesion strength based on the number of successfully pushed barnacles.

Barnacle adhesion strength towards coatings was evaluated using a two week reattachment assay followed by a push off test. Adhesion strength (or critical removal stress) was quantified by shear force for removal divided by barnacle basal plate area. The effects of PDMS MW was clearly seen by the barnacle adhesion strength for AmSiPU coatings (FIG. 11). Coatings containing pre-polymers modified with shorter PDMS chains showed high barnacle adhesion strength. The opposite behavior was observed for coatings modified with longer PDMS chains (10000). Also the coatings with higher PDMS MW had no broken barnacles, which is further evidence that PDMS MW had a significant effect on easy release of barnacles attached to surfaces. Several experimental coatings showed non-attached barnacles and lower adhesion strengths that were comparable to Intersleek® 900 performance. Coatings 3, 6, 9, 11, and 12 displayed the best performance allowing removal of all reattached barnacles with lower adhesion strengths. On these coatings, several barnacles were unable to re-attach; further indicator of good FR performance. Coatings consisting of pre-polymer with 10% concentration of PDMS and PEG provided the better FR performance towards barnacles compared to those with 5%. Surface wettability and surface charge play an important role in barnacle settlement. It is often observed that PDMS based materials show low critical removal stress of barnacles (*A. amphitrite*) which is attributed to their low surface energy. However AmSiPU coatings with both hydrophilic PEG and hydrophobic PDMS displayed lower barnacle adhesion strengths. This assay demonstrates the important role of PDMS being an essential component in amphiphilic FR system. Compared to previous attempts of amphiphilic siloxane-PU coatings, IPDI-PDMS-PEG pre-polymer modified coatings were able to maintain good FR towards barnacles while improving performance towards microfoulers. The control coating polyurethane (no PDMS), showed the worst performance towards barnacles on which all reattached barnacles broke. Hempasil® X3 and Intersleek 1100SR showed the best performance by not allowing any barnacle to reattach during the two weeks of immersion in artificial sea water. FIG. 11 shows reattached barnacle (*Amphibalanus amphitrite*) adhesion strength. Six barnacles were used for each reattachment study, out of which italicized numbers represent the non-attached barnacles. The ratio represents the number of released barnacles versus the number of broken/damaged barnacles during push off measurements. Each bar represents the average adhesion strength based on the number of successfully pushed barnacles.

1.7 Conclusion

Isophorone diisocyanate-Polyethylene glycol-Polydimethyl siloxane (IPDI-PEG-PDMS) pre-polymers of the invention were synthesized by reacting IPDI trimer with monocarbinol-terminated polydimethyl siloxane and m-PEG. Later, these pre-polymers were incorporated in to siloxane polyurethane coatings. ATR-FTIR suggests that both siloxane and PEG are pre-dominant on the surface after water aging. Several coatings showed excellent FR performance towards bacteria (*Cellulophaga lytica*) having >90% removal. Coatings 10 and 11 with 10-1kPDMS-750PEG and IPDI-10-5kPDMS-750PEG pre-polymers displayed significantly better FR performance towards microalgae (*Navicula incerta*) surpassing $1^{st}$ generation siloxane polyurethane formulation and on par with newest Intersleek FR coatings. Interestingly, coatings that had average FR performance towards bacteria showed no mussel attachments. Although coating 10 and 11 displayed few mussel (*Geukensia demissa*) attachments, they were easily removed with smaller force. Overall, the IPDI-PEG-PDMS pre-polymers of the invention improve FR performance of non-toxic siloxane polyurethane marine coatings.

Example 2

2.1 Materials

Polyisocyanates Desmodur Z4470 BA and Desmodur N3300 A were provided by Covestro LLC. An acrylic polyol composed of 80% butyl acrylate and 20% 2-hydroxyethyl acrylate was synthesized via conventional free radical polymerization and diluted up to 50% with toluene. Polyester diol CAPA™ 2054 was provided by Perstorp. Monocarbinol terminated polydimethyl siloxane (PDMS) in two molecular weights (MCR-C18:5000, MCR-C22:10000 g/mole) was purchased from Gelest Inc. Amino-propyl terminated polydimethyl siloxane (APT-PDMS) with a molecular weight of 20000 g/mole was synthesized at NDSU through a ring opening equilibration reaction. Ethyl-3-ethoxypropionate (EEP), methyl amyl ketone, acetylacetone, dibutyltin diacetate, polyethylene glycol methyl ether (PEG 750), and butyl acetate were purchased from Sigma Aldrich.

2.2 Synthesis

Commercially available IPDI trimer (Desmodur Z4470 BA) and HDI trimer (Desmodur N3300 A) were modified using PDMS and PEG to design pre-polymers with many different compositions. A general procedure for pre-polymer IPDI-10PEG-10PDMS5k-5PDMS10k (Formulation 3) modified by PDMS (MW=5000 and 10000) and PEG (MW=750) will be described here (The amount of PDMS 5000 and PEG are each 10% by wt. and PDMS 10000 is 5% by weight based on the total weight of the polyurethane). First PEG (1.6000 g) was dissolved in EEP (1.6000 g) in a 20 mL vial using mixing by vortex for 5 minutes. Next, a magnetic stir bar and PDMS 5000 (1.6000 g) and PDMS 10000 (0.8000 g) were added and vortexed for an additional 2 minutes. Isocyanate (1.9271 g) and DBTDAc catalyst solution (1% by wt. in MAK) (0.3200 g) were then added to the vial. Contents of the vial were then mixed using a vortex mixer for 5 minutes followed by stirring for 24 hours using a magnetic stir plate. Throughout the pre-polymers, the total isocyanate to hydroxyl equivalents ratio was sustained at 3:2. Details of other formulations can be found in Table 6.

2.3 Coating Formulation and Curing

Coating formulation for the pre-polymer described is included here. Acrylic polyol (13.1606 g) and acetyl acetone pot life extender (0.3200 g) were added into the vial containing the pre-polymer. The vial was then mixed via vortex for 2 minutes followed by additional isocyanate (5.8152 g) and DBTDAc (0.1600 g). The overall isocyanate to hydroxyl ratio was maintained at 1.1:1 for final formulation. The contents were then thoroughly mixed using a vortex mixer and followed by magnetic stirring for 1 hour. Formulations were then deposited into multi-well plates and drawdowns were done on primed aluminum panels. The coating formulations (250 μL) were deposited using an automatic repeat pipette for each well. Drawdowns were made using a wire drawdown bar leaving a wet film thickness at 80 μm on 8"×4" primed aluminum panels. Coatings were cured at ambient conditions for 24 hours then oven cured for 45 minutes at 80° C. All other formulations were prepared following similar procedure as outlined above. For this study, PDMS levels of 5%, 10%, and 15% along with PEG levels of 10% and 15% based on coating formulation were considered. Table 6 shows the 11 experimental coatings evaluated in this study.

TABLE 6

Pre-polymer compositions considering formulation variables.

| | | Pre-polymer composition | | | | | Polyurethane bulk composition | |
|---|---|---|---|---|---|---|---|---|
| | Name Label | Type of NCO | Type of PEG | Amount of PEG | Type of PDMS | Amount of PDMS | Type of Polyol | Type of NCO |
| 1 | IPDI-10PEG-10PDMS5k | IPDI | PEG 750 | 10% | PDMS 5k | 10% | AP | IPDI |
| 2 | IPDI-15PEG-15PDMS5k | IPDI | PEG 750 | 15% | PDMS 5k | 15% | AP | IPDI |
| 3 | IPDI-10PEG-10PDMS5k-5PDMS10k | IPDI | PEG 750 | 10% | PDMS 5k PDMS 10k | 10% 5% | AP | IPDI |
| 4 | IPDI-15PEG-10PDMS5k-5PDMS10k | IPDI | PEG 750 | 15% | PDMS 5k PDMS 10k | 10% 5% | AP | IPDI |
| 5 | IPDI-15PEG-15PDMS5k | IPDI | PEG 750 | 15% | PDMS 5k | 15% | PCLP | IPDI |
| 6 | HDI-15PEG-15PDMS5k | HDI | PEG 750 | 15% | PDMS 5k | 15% | AP | IPDI |

TABLE 6-continued

Pre-polymer compositions considering formulation variables.

|  |  | Pre-polymer composition | | | | Polyurethane bulk composition | |
|---|---|---|---|---|---|---|---|
| Name | Label | Type of NCO | Type of PEG | Amount of PEG | Type of PDMS | Amount of PDMS | Type of Polyol | Type of NCO |
| 7 | HDI-15PEG-10PDMS5k-5PDMS10k | HDI | PEG 750 | 15% | PDMS 5k PDMS 10k | 10% 5% | AP | IPDI |
| 8 | HDI-15PEG-15PDMS5k | HDI | PEG 750 | 15% | PDMS 5k | 15% | AP | HDI |
| 9 | HDI-10PEG-10PDMS5k-5PDMS10k | HDI | PEG 750 | 10% | PDMS 5k PDMS 10k | 10% 5% | AP | HDI |
| 10 | HDI-15PEG-10PDMS5k-5PDMS10k | HDI | PEG 750 | 15% | PDMS 5k PDMS 10k | 10% 5% | AP | HDI |
| 11 | IPDI-15PEG-10PDMS5k-5PDMS10k | IPDI | PEG 750 | 15% | PDMS 5k PDMS 10k | 10% 5% | AP | HDI |
| 12 | A4-20 | | | | Control | | | |
| 13 | Hempasil X3 | | | | Control | | | |
| 14 | Dow T2 | | | | Control | | | |
| 15 | PU | | | | Control | | | |
| 16 | IS900 | | | | Control | | | |
| 17 | IS1100SR | | | | Control | | | |

Table 7 shows the isocyanate values for several pre-polymers. Isocyanate values for these prepolymers were similar to the theoretical values indicating the successful synthesis.

TABLE 7

Percent isocyanate for chosen pre-polymers

| Pre-polymer Formulation | Theoretical % NCO | Experimental % NCO |
|---|---|---|
| IPDI-10PEG750-10PDMS5k | 2.20 | 2.10 ± 0.447 |
| IPDI-15PEG750-15PDMS5k | 2.18 | 2.21 ± 0.215 |
| IPDI-15PEG750-10PDMS5k-5PDMS10k | 2.12 | 1.81 ± 0.180 |
| HDI-15PEG750-15PDMS5k | 2.48 | 2.23 ± 0.188 |
| HDI-15PEG750-10PDMS5k-5PDMS10k | 2.67 | 2.03 ± 0.204 |

Figure 12:
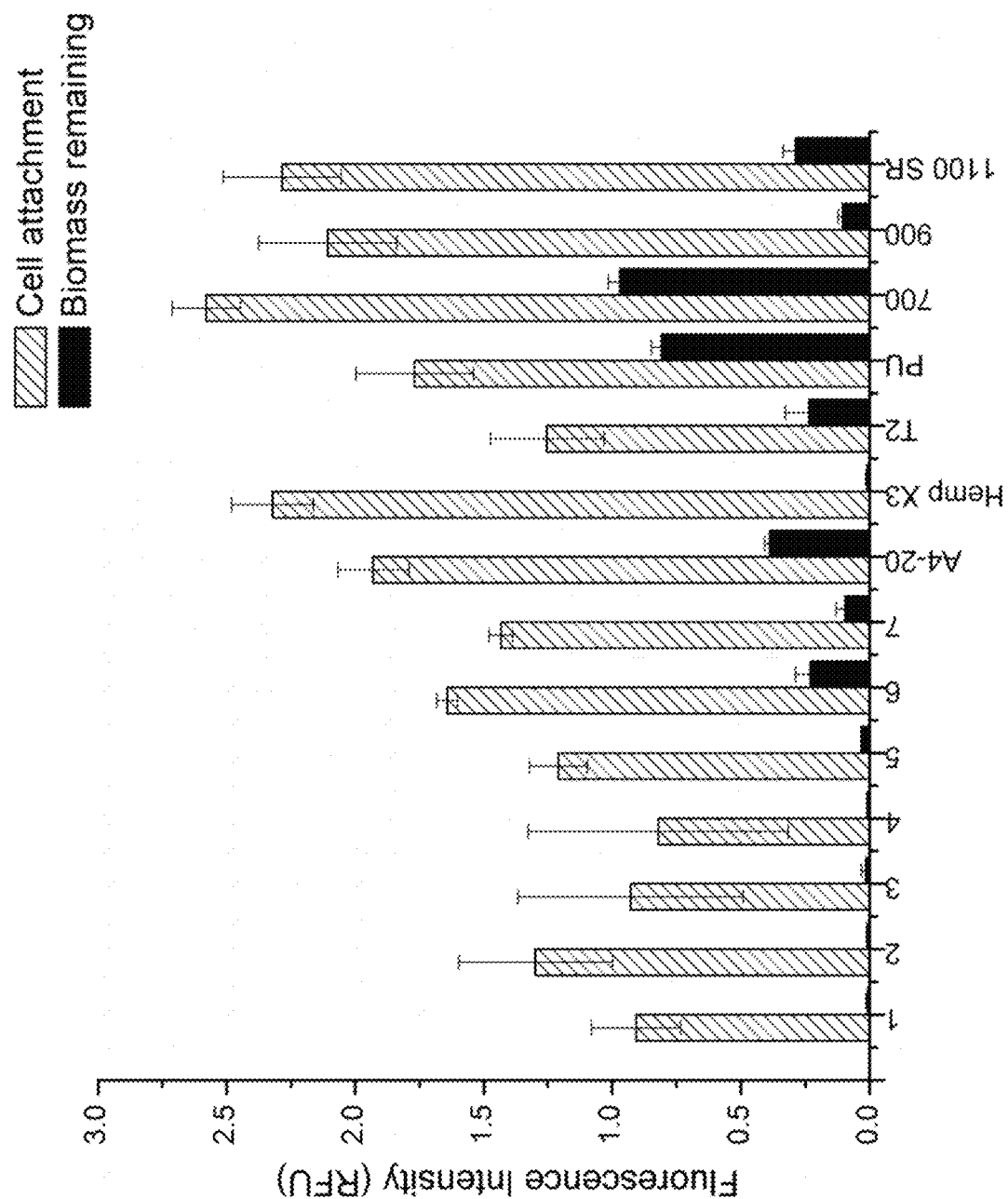
FIG. 12 shows bacterial biofilm (*Cellulophaga lytica*) growth and retention after water-jet treatment at 20 psi. Each bar demonstrates the average from 3 replicate measurements with standard deviation.
Figure 13:
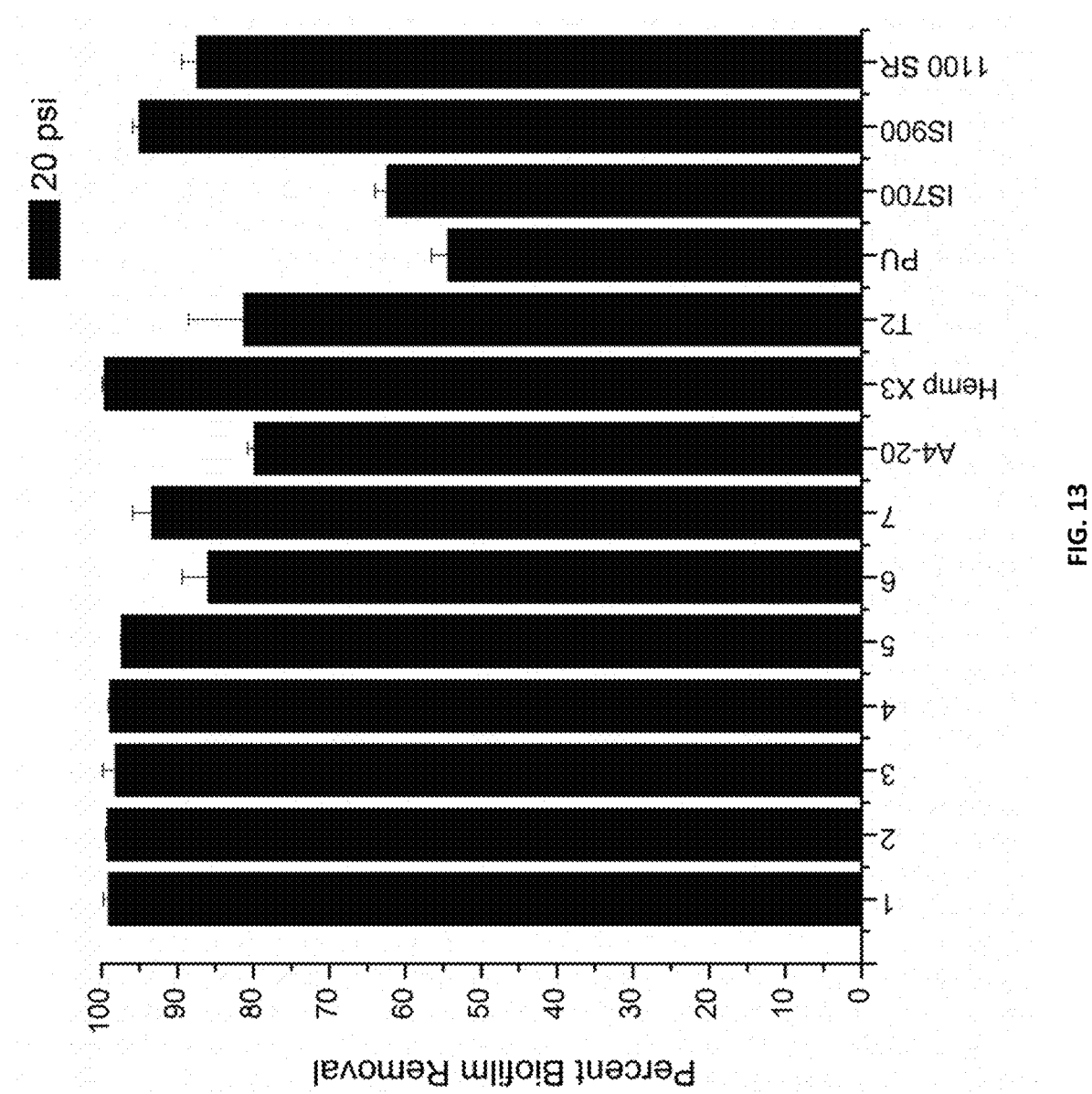
FIG. 13 shows bacterial biofilm (*Cellulophaga lytica*) removal after water-jet treatment at 20 psi. Each bar represents the average percent removal of the biofilm over six measurements with standard deviation.

FIG. 12 shows the *C. lytica* cell attachment and biomass remaining after water jet treatment. AmSiPU coatings displayed low cell attachment compared to commercial standards. Also coatings 1-5 showed excellent FR properties towards *C. lytica* biofilm. FIG. 13 features the percent removal of bacterial biofilm using the amount of cell attachment and biomass remaining. Coatings 1-5 showed ≈100% bacterial biofilm removal on par with Hempasil® X3 and exceeded the Intersleek® standards. All the AmSiPU coatings showed better FR properties compared to A4-20 internal control. Overall compositional changes in polyisocyanate pre-polymers and in polyurethane bulk did not seems to have significant effect on FR properties of AmSiPU coatings towards *C. lytica*.

Figure 14:
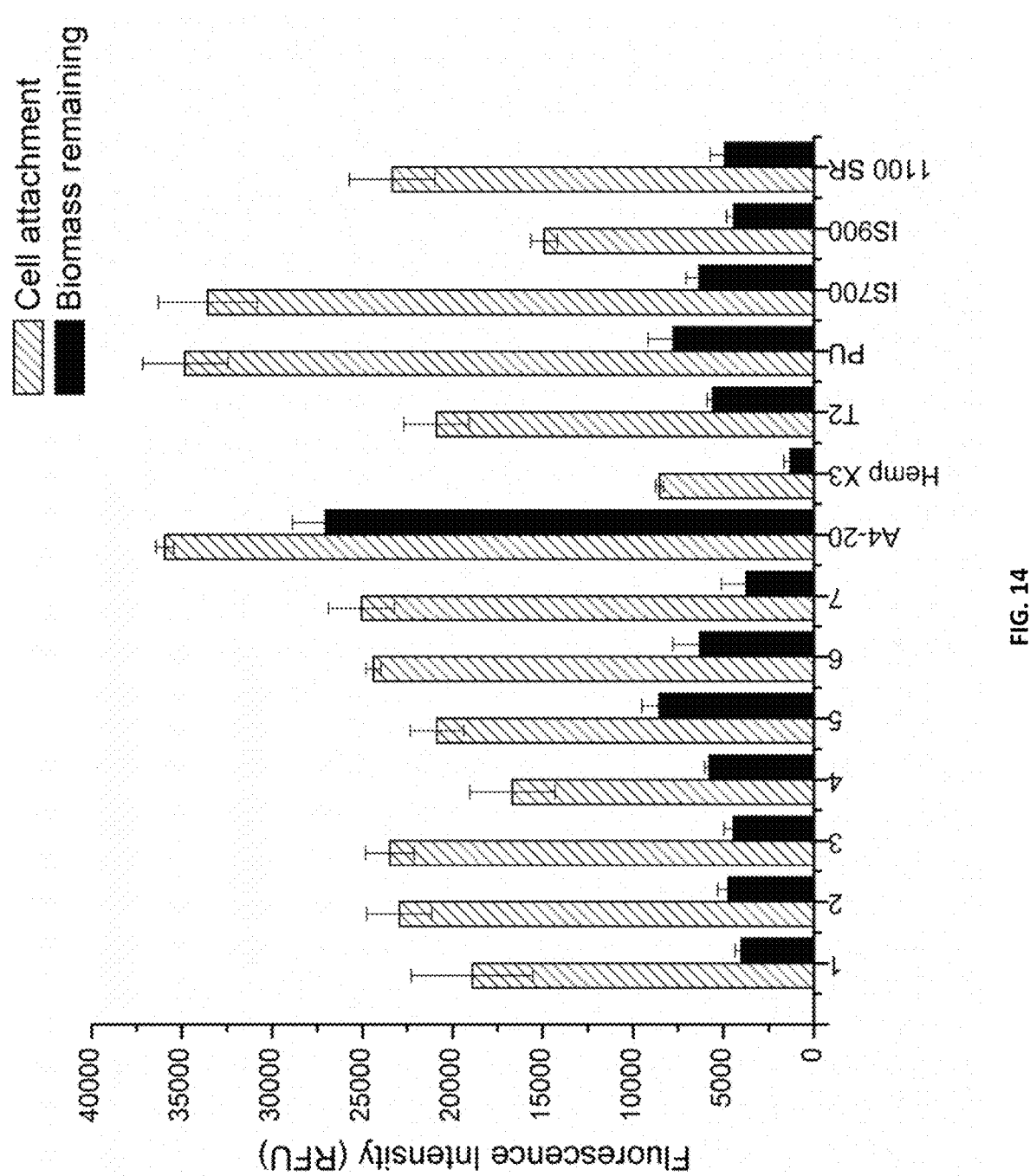
FIG. 14 shows diatom attachment and retention after water-jet treatment at 20 psi. Each bar represents the average of 3 replicate measurements along with standard deviation.
Figure 15:
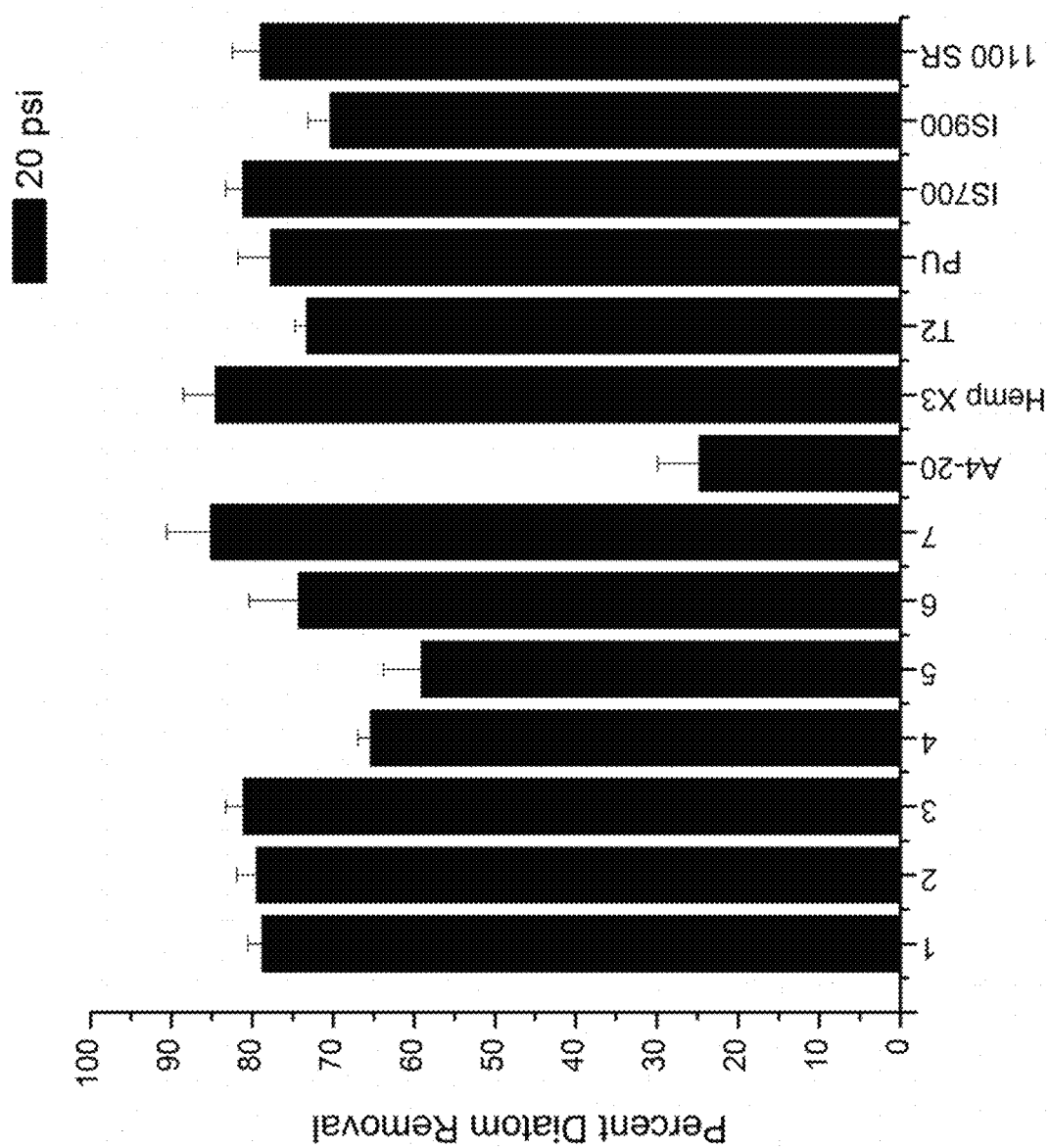
FIG. 15 shows diatom removal after water-jet treatment at 20 psi. Each bar represents the average percent removal over six measurements as well as standard deviation.

FIG. 14 shows the diatom (*N. incerta*) cell attachment and biomass remaining after water jet treatment at 20 psi. Initial *N. incerta* cell attachment of AmSiPU coatings were comparable to T2 silicone elastomer and Intersleek® 1100SR standard. However Hempasil® X3 demonstrated the lowest amount of *N. incerta* cell attachment and biomass left after cleaning. Following water jet treatment, many AmSiPU coatings had low biomass remaining which was comparable to standards Intersleek® 700, 900, and 1100SR. FIG. 15 shows the percent removal of diatom. All AmSiPU coatings show significant improvement in *N. incerta* FR properties compared to the internal control A4-20. Coatings 1, 2, 3, 6 and 7 show ≈80% removal of diatom, comparable to commercial standards Hempasil® X3, and all Intersleek standards. Slight decrease in diatom removal for coatings 4 and 5 may be attributed to slight variation in composition.

Examples 3 and 4

3.1 Materials

Isophorone diisocyanate (IPDI) polyisocyanate Desmodur Z4470 BA was provided by Covestro LLC. Monocarbinol-terminated polydimethylsiloxane (PDMS) of molecular weight 5,000 $\overline{M}_n$ and 10,000 $\overline{M}_n$ (MCR-C22) was purchased from Gelest, Inc. Poly(ethylene glycol) methyl ether (550 $\overline{M}_n$ and 750 $\overline{M}_n$) (mPEG), ethyl-3-ethoxy propionate, methyl ethyl ketone (MEK), acetylacetone, methyl amyl ketone (MAK), and dibutyltin diacetate (DBTDAc) were purchased from Sigma Aldrich. Toluene and isopropanol were purchased from VWR. Following a detailed description elsewhere, an acrylic polyol made of 80% butyl acrylate and 20% 2-hydroxyethyl acrylate was prepared via conventional free radical polymerization and diluted to 50% in toluene. Bodkhe et al., *J. Coating. Tech. Res.* 2012, 9 (3), 235-249. Aminopropyl terminated polydimethylsiloxane (APT-PDMS) with molecular weight (MW) of 20,000 $\overline{M}_n$ was also synthesized through a ring-opening equilibration reaction. Both synthesized polymers were prepared following guidelines from elsewhere. Bodkhe et al., *J. Coating. Tech. Res.* 2012, 9 (3), 235-249. Amphiphilic prepolymer based on PEG 750 $\overline{M}_n$ and PDMS 10,000 $\overline{M}_n$ for the AmpSiPU coating system were also prepared following procedure elsewhere, called R0 in this study. Galhenage et al., *J. Coating. Tech. Res.* 2017, 14 (2), 307-322.

AkzoNobel International Paint provided the commercial FR standards Intersleek® 700 (IS 700), Intersleek® 900 (IS 900), and Intersleek® 1100SR (IS 1100). Silicone elastomer, Silastic® T2 (T2), and control thermoplastic polystyrene (PS) was provided by Dow Corning. Hydrophobic A4-20 coating (A4-20), a siloxane-polyurethane system, was prepared as an internal control following the procedures described elsewhere. Bodkhe et al., *J. Coating. Tech. Res.* 2012, 9 (3), 235-249. Amphiphilic T-10 coating, internal coating control, was prepared following the procedure elsewhere for a formulation that contained 10 wt. % PEG 750

$\overline{M}_n$ and PDMS 10,000 $\overline{M}_n$. Galhenage et al., *J. Coating. Tech. Res.* 2017, 14 (2), 307-322. Also, a pure polyurethane formulation without APT-PDMS was also prepared to be included as a control. Aluminum panels (4"×8" in., 0.64 mm thick, type A, alloy 3003 H14) and steel panels (3"×6" in., 0.51 mm thick, type QD) were purchased from Q-lab and were sandblasted and primed with Intergard 264 (International Paint) using air-assisted spray application. Multi-well microtiter plates were modified using circular disks (1-inch diameter) of primed aluminum. Stafslien et al., *Biofouling* 2007, 23 (1), 45-54.

3.2 Methods of Characterization 3.2.1 Isocyanate Titrations

Isocyanate titration was used to monitor the reaction progress and confirm the complete conversion of the isocyanate groups after the synthesis of the additive. An additive sample (0.3-0.5 g) was weighed in an Erlenmeyer flask and diluted with isopropanol. Then, 25 mL of 0.1 N dibutyl amine solution and an additional 25 mL of isopropanol were added to the flask and the mixture was stirred for 15 minutes. Several drops (3-5 drops) of bromophenol blue indicator were added to the flask. The content of the flask was titrated using a standardized 0.1 N hydrochloric acid until the endpoint blue to yellow was observed. A blank prepared with only 25 mL of dibutyl amine solution was also titrated following the same procedure. The recorded amount of hydrochloric acid for both titrations was used to calculate the amount of isocyanate remaining.

3.2.2 Percent Solids Determination

The non-volatile content of the additive was determined following ASTM D2369. Briefly, a weighed empty aluminum pan was filled with additive sample (1-2 g). Isopropyl alcohol was used to cover the sample. The pan was placed in an oven at 120° C. for 1 hour. After removal from the oven, the pan was weighed again to determine the percent solids. Three replicates were recorded.

3.2.3 Fourier Transform Infrared Spectroscopy

Fourier transform infrared (FTIR) spectroscopy was used to characterize the additive, using a Thermo Scientific Nicolet 8700 FTIR. The additive was applied as a thin layer on a potassium bromide (KBr) plate to collect the spectrum.

3.2.4 Surface Characterization

A Kruss® DSA 100 (Drop Shape Analyzer) was utilized to measure the surface wettability and surface energy of the coatings. Three replicate water and diiodomethane contact angles were measured for each sample. For each replicate, the static contact angle was measured over 9 minutes. Surface energy for each surface was calculated using the Owens-Wendt method. Owens et al., *J. Appl. Polym. Sci.* 1969, 13 (8), 1741-1747. Slip angle, advancing and receding water contact angles for surface were evaluated using a tilting stage where a 25-4 water droplet was viewed on a coating surface (tilted at 10°/min) and values were recorded at the degree that the droplet started to roll off. The measured angles and surface energies were calculated using Kruss® Advance software.

Attenuated total reflectance Fourier transform infrared spectroscopy (ATR-FTIR) was used to characterize the surfaces of the coatings. A Bruker Vertex 70 with Harrick's ATR™ accessory using a hemispherical Ge crystal was utilized to collect ATR-FTIR spectra for a coating.

X-Ray Photoelectron spectroscopy (XPS) was carried out using a Thermo Scientific™ K-Alpha™ system to determine the elemental composition of the coatings. The instrument is equipped with a monochromatic Al $K_\alpha$ (1486.68 eV) X-ray source and $Ar^+$ ion source (up to 4000 eV). Depth profiling of a coating was evaluated using argon ion with 30 etch cycles. For each etch cycle, the ion beam was set to 1,000 eV Monatomic Mode with low current and 30 s etch time. After each etching cycle, five replicate survey spectra were collected, at low resolution, with a constant analyzer pass energy of 200 eV, for a total of 20 ms. For each run, photoemission lines for C1s, N1s, O1s, and Si2p were observed. Spectra were collected at an angle normal to the surface (90° of a 400-μm area. The chamber pressure was maintained below $1.5 \times 10^{-7}$ torr and samples were analyzed at ambient temperature. Atomic concentrations were quantified by the instrument's software as a representation of the atomic intensities as a percentage of the total intensity of all elements. Two internal PU systems without (pure PU) and with AmpAdd-1 additive (modified PU) were examined to verify the self-stratification of AmpAdd additives into the surface of coatings.

Atomic force microscopy (AFM) was utilized to study the surface topography of the coatings. A Dimension 3100 microscope with Nanoscope controller scanned the surface of experimental coatings, collecting images on a sample area of 100 μm×100 μm in the tapping mode. The experiment was run in air, under ambient conditions, using a silicon probe with a spring constant of 0.1-0.6 N/m and resonant frequency of 15-39 kHz. For each surface, three replicates at varying spots were collected to ensure consistency and accuracy of the data.

3.2.5 Water Aging

All the prepared coatings were pre-leached for 28 days in running tap water. The water tanks were equipped to automatically fill and empty every 4 hours. Water aging of the coatings is carried out to meet two objectives: 1) to leach out any impurities that may interfere with FR assessments; and 2) to determine if there are any surface rearrangements of the coatings or whether the additives leach out to a significant degree. All biological laboratory assays were carried out after the pre-leaching water aging process was completed.

3.2.6 Biological Laboratory Assays

Growth and Release of Macroalgae (*Ulva linza*)

A set of multiwall plates was sent to Newcastle University, following water-immersion for 28 days, to evaluate FR performance of coatings against *U. linza*. The detailed description about the assessment can be found elsewhere. Cassé et al., *Biofouling* 2007, 23 (2), 121-130. Briefly, after leachate collection, all multi-well plates were equilibrated in 0.22 μm filtered artificial seawater (Tropic Marin®) for 2 hours. To each well, a 1-mL suspension of *U. linza* spores was added, adjusted to $3.3 \times 10^5$ spores/mL (0.05 OD at absorbance 660 nm) in enriched seawater medium. Starr et al., *Phycol.* 1987, 23 (suppl.), 1-47. Spores that settled on the discs were grown for 7 days inside an illuminated incubator at 18° C. with a 16:8 light: dark cycle (photon flux density 45 $\mu mol \cdot m^{-2} \cdot s^{-1}$). There was no washing to remove unsettled spores after settlement. After 7 days, the biomass generated prior to water jetting was assessed from a single row of wells (6) from each plate. Two other rows of wells were exposed to water jet pressures of 67 kPa (9.7 psi) and 110 kPa (16 psi) for 10 seconds per well. *U. linza* biofilm biomass was determined before and after water jetting by extracting chlorophyll with 1 mL DMSO to each water-pressured well followed by measuring the fluorescence at 360 nm excitation and 670 nm emission. Fluorescence from the extracted chlorophyll is directly proportional to the biomass present on each coating surface. Mieszkin et al., *Biofouling* 2012, 28 (9), 953-968. The removal of *U. linza* at each pressure was compared with the unsprayed wells that were used to determine initial biomass.

Bacterial (*Cellulophaga lytica*) Biofilm Adhesion

FR properties towards bacteria were evaluated using retention and adhesion assays described previously. Stafslien et al., *Biofouling* 2007, 23 (1), 45-54; Stafslien et al., *Rev. Sci. Instrum.* 2007, 78 (7), 072204. Briefly, a solution of the marine bacterium *Cellulophaga lytica* at $10^7$ cells/mL concentration in artificial seawater (ASW) containing 0.5 g/L peptone and 0.1 g/L yeast extract was deposited into 24-well plates (1 mL/well). The plates were then incubated statically at 28° C. for 24 hours. The ASW growth medium was then removed and the coatings were subjected to water-jet treatments. On each plate, the first column of coatings was not treated and showed the initial amount of bacterial biofilm growth. The second and third columns were subjected to water-jetting at 10 psi and 20 psi, respectively, for 5 seconds. Following water-jet treatments, the coating surfaces were stained with 0.5 mL of a crystal violet solution (0.3 wt. % in deionized water) for 15 minutes and then rinsed three times with deionized water. After 1 hour of drying at ambient laboratory conditions, the crystal violet dye was extracted from the coating surfaces by adding 0.5 mL of 33% acetic acid solution for 15 minutes. The resulting eluates were transferred to a 96-well plate (0.15 mL/coating replicate) and subjected to absorbance measurements at 600 nm wavelength using a multi-well plate spectrophotometer. The absorbance values were directly proportional to the amount of bacterial biofilm present on coating surfaces before and after water-jetting treatments. Percent removal of bacterial biofilm was quantified by comparing the mean absorbance values of the non-jetted and water-jetted coating surfaces. Selim et al., *Mater. Des.* 2016, 101, 218-225.

Growth and Release of Microalgae (*Navicula incerta*)

The laboratory biological assay with the diatom (*Navicula incerta*) was conducted following a similar procedure to that described previously. Callow et al., *Nat. Commun.* 2011, 2 (1), 244-244; Cassé et al., *Biofouling* 2007, 23 (2), 121-130; Casse et al., *Biofouling* 2007, 23 (4), 267-276. Briefly, a suspension with $4 \times 10^5$ cells/mL of *N. incerta* (adjusted to 0.03 OD at absorbance 660 nm) in Guillard's F/2 medium was deposited into each well (1 mL per well) and cell attachment was stimulated by static incubation for 2 hours under ambient conditions in the dark. Coating surfaces were then subjected to water-jet treatments. Stafslien et al., *Rev. Sci. Instrum.* 2007, 78 (7), 072204. First column of wells was not water-jetted so that initial cell attachment could be determined and the next two-columns of wells were water-jetted at 10 psi and 20 psi, respectively, for 10 seconds. Microalgae biomass was quantified by extracting chlorophyll using 0.5 mL of DMSO and measuring fluorescence of the transferred extracts at an excitation wavelength of 360 nm and emission wavelength at 670 nm. The relative fluorescence (RFU) measured from the extracts was considered to be directly proportional to the biomass remaining on the coating surfaces after water-jetting. Percent removal of attached microalgae was determined using relative fluorescence of non-jetted and water-jetted wells.

Adult Barnacle (*Amphibalanus amphitrite*) Adhesion

Adult barnacle reattachment test was carried out to assess FR of coatings against macrofoulants. Stafslien et al., *J. Coating. Tech. Res.* 2012, 9 (6), 651-665; Rittschof et al., *Biofouling* 2008, 24 (1), 1-9. Coatings prepared on 4"×8" panels after water aging were utilized for this laboratory assay. Barnacles were dislodged from silicone substrates sent from Duke University and immobilized on experimental coatings (6 barnacles per coating) using a custom-designed immobilization template. The immobilized barnacles were allowed to reattach and grow for 2 weeks while immersed in an ASW aquarium tank system with daily feedings of brine shrimp *Artemia nauplii* (Florida Aqua Farms). After the 2-week attachment period, the number of non-attached barnacles was recorded, and the attached barnacles were pushed off (in shear) using a hand-held force gauge mounted onto a semi-automated stage. Once the barnacles were dislodged, their basal plate areas were determined from scanned images using Sigma Scan Pro 5.0 software program. Barnacle adhesion strength (MPa) was calculated by taking the ratio of peak force of removal to the basal plate area for each reattached barnacle. To ensure consistency, barnacles of similar sizes were tested. The average barnacle adhesion strength for each coating was reported as a function of the number of barnacles released with a measurable force and that exhibited no visible damage to the basis or shell plates.

3.2.7 Coating Property Evaluation

Stability, adhesion, strength, and flexibility are desirable properties for organic coatings. A double-rub test, according to ASTM D 5402, evaluated the resistance of coatings against solvents. A hammer (0.75 kg) with three-fold cheesecloth wrapped around its head was soaked in MEK or 3.5 wt. % NaCl water solution and rubbed against the coating. The head of hammer was rewet after each 25 double rubs. The number of double rubs was noted when marks were observed on the surface of coatings.

Impact test, according to ASTM D 2794, was used to assess strength of coatings using a Gardner impact tester. The maximum drop height was 43 inches with a weight of 4 pounds. Coated steel panels were placed in the testing location, and the load at varying heights was dropped on the coating. The results were recorded in inch-pounds (in-lb). Crazing and/or loss of adhesion from the substrate were observed as a failure point. Coatings that did not fail were reported as having an impact strength of >172 in-lb. The test was run in both forward (front) and reverse modes. The weight was dropped on top of the coating film in forward impact mode, while the weight was dropped on the back of the coated substrate in the reverse mode.

A crosshatch adhesion test, according to ASTM D 3359, assessed the adhesion of the coatings to the substrate by applying and removing pressure-sensitive tape over cuts made in the film. The results were reported on a scale of 0 B to 5 B, where 0 B indicates complete removal of the coating and 5 B indicates no removal of the coatings from the substrate as a result of this test.

The conical mandrel test, according to ASTM D 522, was used to determine the flexibility of the coatings on the substrate. In principle, ideal flexible coatings should not have any cracks when undergoing the bending test. The results of flexibility were reported as the length of a formed crack in cm on the coating after the bending test.

3.2.8 Statistical Analysis

Statistical analysis were performed in SAS software, version 9.4. The GLM procedure with Tukey's method were utilized to determine the difference mean for each treatment group under a completely randomized experimental design. The assessed response for this analysis were the biomass remaining of marine organisms of interest.

3.3 Example 3

3.3.1 Design of Experiment

An amphiphilic additive based on 10,000 $\overline{M}_n$ PDMS and 750 $\overline{M}_n$ PEG was synthesized and incorporated in a polyurethane coating system. These molecular weights offer desirable FR performance according to the literature. Galhenage et al., *J. Coating. Tech. Res.* 2017, 14 (2), 307-322; Bodkhe et al., *Prog. Org. Coat.* 2012, 75 (1-2), 38-48. Here, only one variable factor was examined: the amount of the amphiphilic additive in the PU coating system. The additive was added in varying amounts, ranging from 10 wt. % up to 40 wt. % (the highest amount that could be added before the PU film lost its integrity in response to mechanical coating tests). Thus, a total of six formulations were prepared as outlined in Table 8. The table outlines the amount of additive in each system and content of PEG and PDMS in the solids content of the final coating system.

TABLE 8

Coating Compositions

| Formulation | Additive Amount (wt. %) | PDMS Wt. % | PEG Wt. % |
|---|---|---|---|
| F0 | 0 (Pure PU unmodified system) | 0 | 0 |
| F10 | 10 | 4 | 4 |
| F20 | 20 | 8 | 8 |
| F25 | 25 | 10 | 10 |
| F30 | 30 | 12 | 12 |
| F40 | 40 | 17 | 17 |
| F50* | 50 | 21 | 21 |

*F50 was not included in surface and biological assay characterizations as it lacked the desired mechanical integrity.

3.3.2 Control and Standard Coatings

Commercial standards were prepared following the respective manufacturers' guidelines. Internal control hydrophobic SiPU (A4) was prepared following the procedure outlined in the literature. Bodkhe et al., *J. Coating. Tech. Res.* 2012, 9 (3), 235-249. T-10 coating, internal amphiphilic control, containing a covalently incorporated 10,000 $\overline{M}_n$ PDMS and 750 $\overline{M}_n$ PEG prepolymer was also prepared following a previously reported method. Galhenage et al., *J. Coating. Tech. Res.* 2017, 14 (2), 307-322. Similar to the experimental coatings, the control and standards were also prepared on 4"×8" primed aluminum panels and multi-well plates. Table 9 contains detailed descriptions of the control and standard coatings used for this study.

TABLE 9

List of Control and standard reference Coatings*

| Control Name | Control ID | Description |
|---|---|---|
| SiPU A4-20 | A4 | Internal SiPU FR Control |
| Amphiphilic SiPU | T-10 | Internal Amphiphilic SiPU Control |
| Commercial Polyurethane | PU | Pure Polyurethane Standard |
| Dow ® T2 | T2 | Silicone Elastomer Standard |
| Intersleek ® 700 | IS 700 | Intersleek ® Commercial FR Standard |
| Intersleek ® 900 | IS 900 | Intersleek ® Commercial FR Standard |
| Intersleek ® 1100SR | IS 1100 | Intersleek ® Commercial FR Standard |

*Commercial PS was used as an interna standard to check that *U. linza* was behaving within expectations.

3.3.3 Synthesis of Amphiphilic Additive

The amphiphilic additive was synthesized by reacting mono-hydroxy-terminated PEG and PDMS with the polyisocyanate IPDI trimer Desmodur Z4470 (Scheme 1). The molar ratio of NCO groups to the combined OH groups of PEG and PDMS was 1:1. The functional isocyanate groups were fully converted to urethane linkages by attachment of PEG and PDMS chains. PEG and PDMS were added in equal weight ratios to meet the required one molar ratio.

Specifically, to synthesize the amphiphilic additive (AmpAdd), PEG 750 $\overline{M}_n$ (1.00 g) was mixed with toluene (3.00 g) in a 25-mL flask. PDMS 10,000 $\overline{M}_n$ (1.00 g) was added to the flask and mixed robustly with vortex for 2 minutes. IPDI trimer resin (0.56 g) and DBTDAc catalyst solution (1% by wt. in MAK) (0.128 g) were then added to the flask. The reaction was run at 80° C. for 2 hours. As another method, the reaction could also be completed at ambient conditions for 24 hours. A reflux condenser was used when heat was applied. The flask was equipped with a magnetic stirrer, nitrogen inlet, and temperature controller. In theory, the synthesized prepolymer contained 41.37 wt. % PEG and 41.37 wt. % PDMS.

Scheme 1. Synthesis of amphiphilic additive based on IPDI trimer containing PDMS 10,000 $\overline{M}_n$ and PEG 750 $\overline{M}_n$.

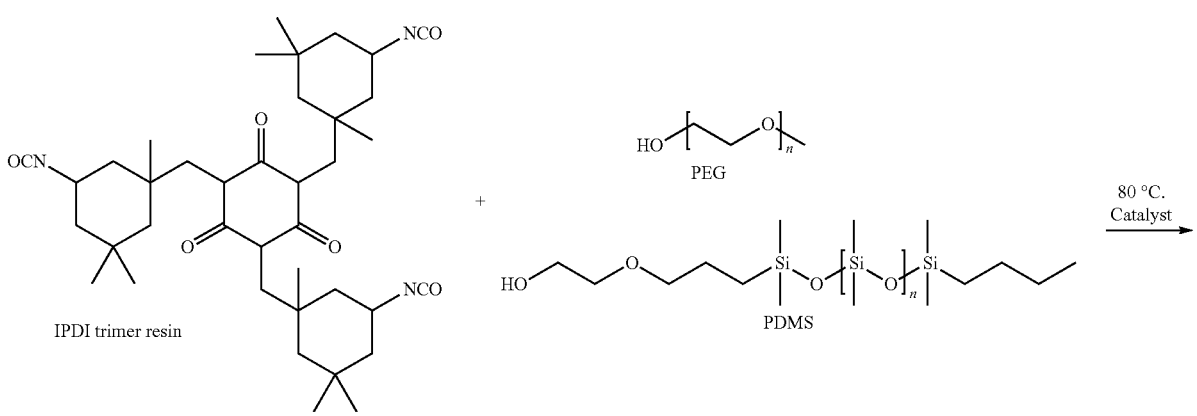

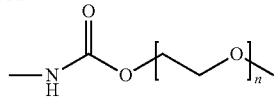

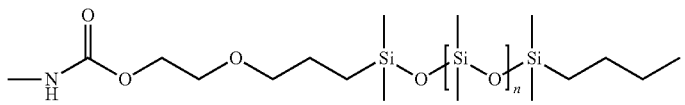

3.3.4 Synthesis of the Curable Coating Compositions and Their Curing

All coating formulations were prepared similarly, except the amount of added additive varied. To prepare the unmodified polyurethane F0 formulation, acrylic polyol (8.00 g; 50% solid) and acetylacetone (0.62 g) (potlife extender) were added in a vial and stirred under ambient conditions for 24 hours. IPDI isocyanate trimer Desmodur Z4470 BA resin (2.96 g) and DBTDAc catalyst solution (0.25 g) were added to the vial, and the mixture was stirred for another hour before application to the substrate.

To prepare an additive-modified polyurethane formulation, for example F25, acrylic polyol (8.00 g; 50% solid), acetylacetone (0.62 g) (potlife extender), and the 10kPDMS-750PEG additive (4.18 g; 60% solid) were added to a vial and stirred under ambient conditions for 24 hours. IPDI isocyanate trimer Desmodur Z4470 BA resin (2.96 g) and DBTDAs catalyst solution (0.25 g) were added to the vial, and the mixture was stirred for another hour before application to the substrate.

Coating formulations were applied on primed 8"×4" aluminum and 6"×3" steel panels using a wire-round drawdown bar with a film thickness of 80 μm. All coatings were allowed to cure under ambient conditions for 24 hours, followed by oven curing at 80° C. for 45 minutes. Coatings were cut out in circular shapes and glued to 24-well plates for biological assays test.

3.3.5 Results and Discussion

Amphiphilic coatings have been recognized as a promising path to address biofouling issues. While several amphiphilic systems having been extensively investigated, there is a lack of knowledge about these systems that ranges from the mechanism of performance to design parameters. To this effect, it was determined whether there is a threshold concentration of amphiphilic moieties where a system attains desirable FR performance and then additional amounts of such moieties do not further improve the performance. The AmpAdd additive based on 10,000 $\overline{M}_n$ PDMS and 750 $\overline{M}_n$ was added at increasing amounts to a polyurethane coating system (developed internally with IPDI isocyanate trimer and acrylic polyol) and the relationship between the concentration of the AmpAdd and FR performance was established accordingly.

Figure 16:
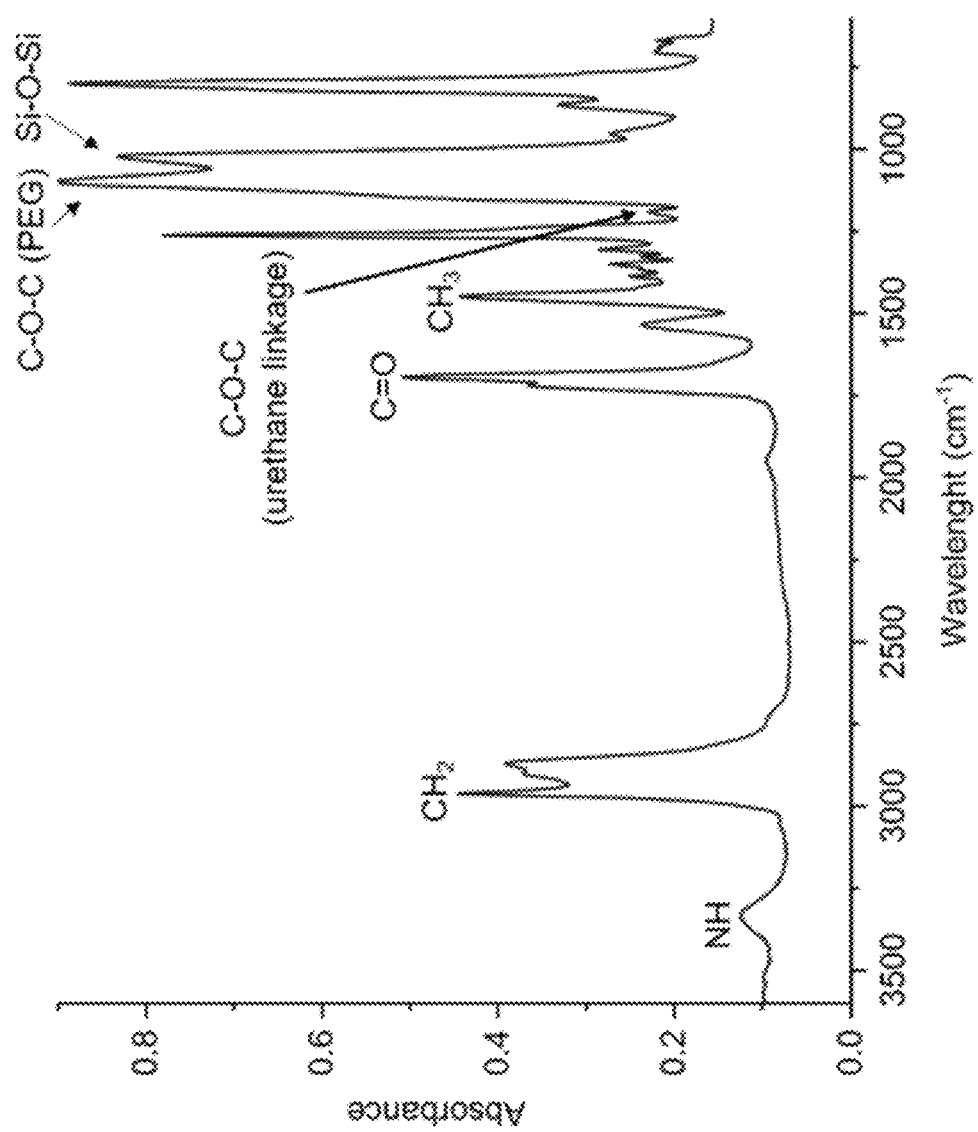
FIG. 16 shows an FTIR spectrum for the amphiphilic additive (AmpAdd) based on IPDI trimer containing PDMS 10,000 $\overline{M}_n$ and PEG 750 $\overline{M}_n$.

The amphiphilic additive, AmpAdd, was prepared by reacting mono-hydroxyl-terminated PEG (750 $\overline{M}_n$) and PDMS (10,000 $\overline{M}_n$) with an IPDI isocyanate trimer resin. The complete conversion of the isocyanate groups to urethane linkage was confirmed with FTIR and isocyanate titrations. An FTIR spectrum of the AmpAdd (FIG. 16) shows the absence of the isocyanate peak at 2250 cm$^{-1}$ and stretching for secondary amine of the formed urethane linkage at 3350 cm$^{-1}$. Additionally, the appearance of overlapping peaks for PDMS (Si—O—Si) at 1030 cm$^{-1}$ and PEG (C—O—C) at 1105 cm$^{-1}$ confirmed the attachment of amphiphilic chains on the additive. Furthermore, isocyanate titrations validated the complete conversion of the isocyanate groups since the titrations indicated the absence of isocyanate.

Figure 17:
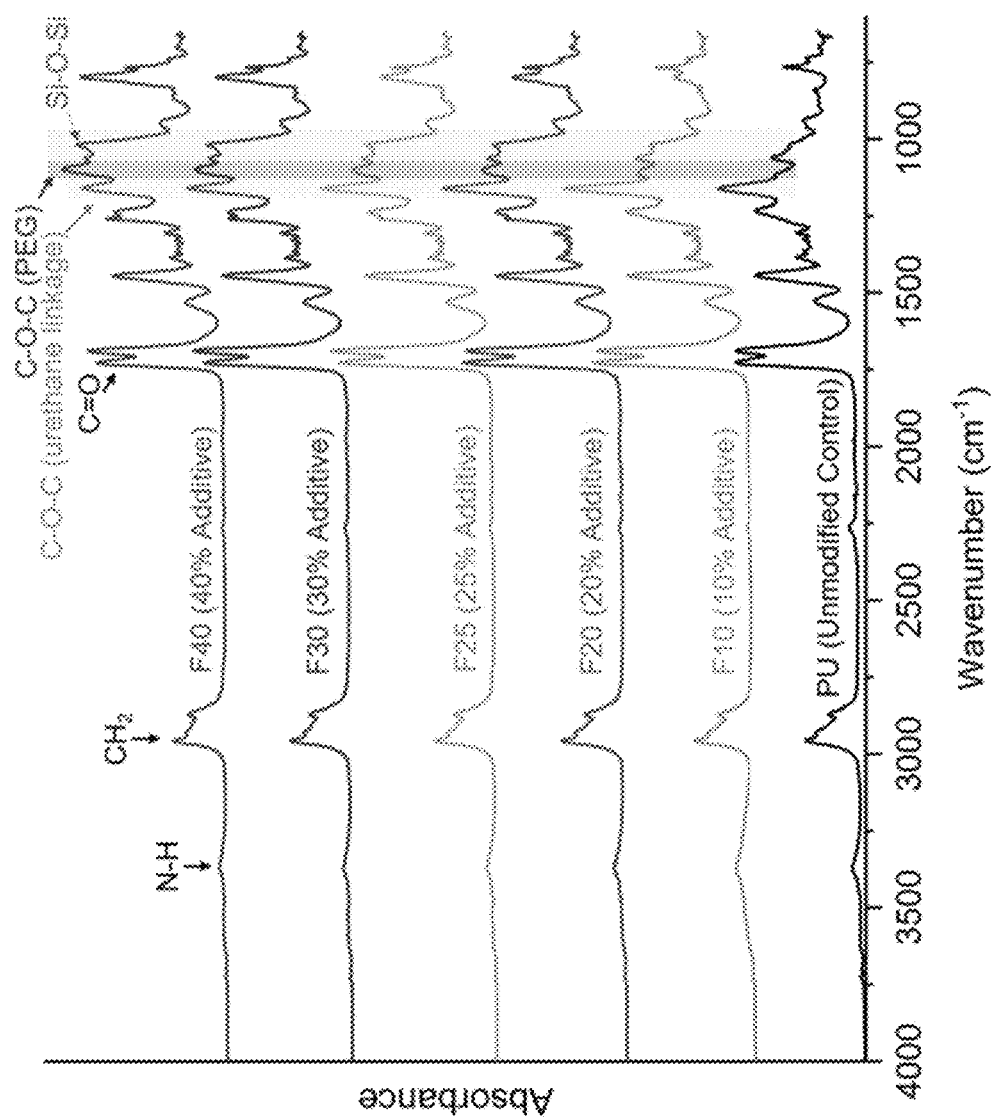
FIG. 17 shows the ATR-FTIR of the surface of unmodified and modified polyurethane coatings. The spectrum of each coating is labeled to reflect its ID number and amount of added AmpAdd additive, ranging from 0 wt. % to 40 wt. %.

A series of coatings was then made where the AmpAdd was incorporated into a polyurethane coating at a range of concentrations as indicated in Table 8. Surface characterization of the coatings was completed with ATR-FTIR, contact angle measurements, XPS, and AFM. ATR-FTIR was used to assess the presence of the chemical moieties on the surfaces of the coatings. Although the spectra for all the modified PU coatings were generally similar, the only differences observed were changes to the intensities of peaks associated with PEG at 1030 cm$^{-1}$ and PDMS at 1105 cm$^{-1}$ (FIG. 17—red and green highlights, respectively) with respect to the C—O—C peak of the urethane linkage (FIG. 17—yellow highlight). Also, an overlapped broad stretching peak for hydroxyl group (due to urethane linkage from the AmpAdd and crosslinking reaction) is present at ca. 3350 cm$^{-1}$. These data indicate that both PDMS and PEG are present at the PU surfaces containing the AmpAdd and are thus amphiphilic, while the unmodified PU lacks this property. Overall, as more amphiphilic additive was present in a system, the intensities for PEG and PDMS peaks increased accordingly, signaling a direct correlation between the availability of amphiphilic moieties on the surfaces with the amount of additive.

Figure 19:
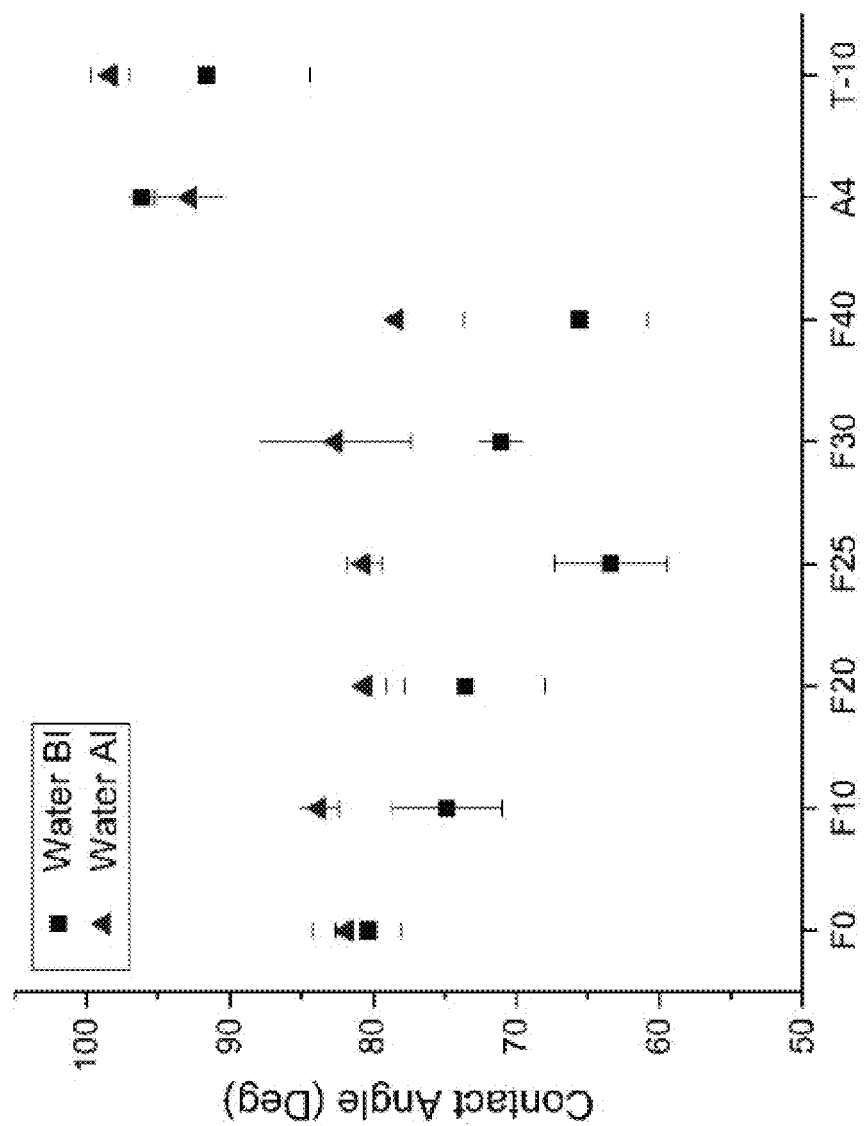
FIG. 19 shows the water contact angle data for coatings before immersion (BI) and after immersion (AI) in water for 28 days.

Contact angle measurements were utilized as another method to characterize the surfaces. The contact angle data were collected as static measurements over time and dynamic measurements using a tilting stage. The additives resulted in a dynamic surface, meaning the contact angles for both water and diiodomethane decreased as a function of time (FIG. 18A). This dynamic nature is attributed to the amphiphilicity of the surfaces where the hydrophilic domains cause the water droplet to spread as they swell. The observed dynamic behavior for the additively modified PU coatings was similar to the T-10 amphiphilic control coating, while the hydrophobic A4 system did not possess such a feature (due to lack of hydrophilic domains). The change in values was more prominent for water contact angles (WCA) than diiodomethane contact angles (MICA). However, the extent of changes in contact angle values was similar regardless of the amount of additive. Additionally, as the amount of AmpAdd was increased for the modified PU coatings, the initial water contact angle decreased until a plateau was observed for coatings with 25 wt. % or a higher amount of the additive (formulations F25, F30, F40). This trend is attributed to the increasing amount of hydrophilic moieties on the surface due to AmpAdd. When the concentration of these moieties on the surface became saturated, additional amounts of AmpAdd did not further impact the surface, displaying a leveling trend. Also, the contact angles of modified PU coatings were generally lower than that of the control coatings, which can be related to the addition of AmpAdd. Surface energy for the experimental and control coatings was calculated using WCA and MICA values (FIG. 18B). The surface energy values for modified PU coatings were between 40-45 mN/m initially and increased as a function of time, showing a dynamic nature similar to contact angle values. Mostly, the greatest change was observed for coatings with higher amounts of AmpAdd (coatings F25 and F40). The surface energy values for the modified coatings were different from the control coatings at 25-30 mN/m. The slip angle (water droplet roll-off angle) for the studied coatings showed a declining trend as the amount of the AmpAdd increased for the systems (FIG. 18C). Similar to the WCA values, the slip angle becomes relatively constant once it reaches a 25 wt. % concentration of AmpAdd. In comparison, the hydrophobic A4 showed a considerably higher slip angle while the amphiphilic T-10 displayed a value within the range of the assessed coatings. Furthermore, the tilting experiment provided advancing contact angle (Adv CA) and receding contact angle (Rec CA) values, and a trend similar to slip angle was observed (FIG. 18D). The hysteresis (difference between Adv CA and Rec CA) was higher for coatings F10 and F20 than coatings with higher amounts of AmpAdd in their composition (coatings F25, F30, F40). The lower the hysteresis, the smoother a surface is, and typically this increases the ease of "roll off" from its surface. Relating these results to the control coatings, the A4 system showed a hysteresis similar to the systems with lower amounts of AmpAdd (i.e., F20) and the T-10 showed a similar value to the higher AmpAdd-containing systems (i.e., F30). Contact angle measurements for the coatings after 28 days of water aging increased, which was relatable to the T-10 control system (FIG. 19). This change was attributed to rearrangement of the surface as hydrophilic and hydrophobic domains interacted with water and to the probability that some amount of AmpAdd may have leached out.

Figure 20A:
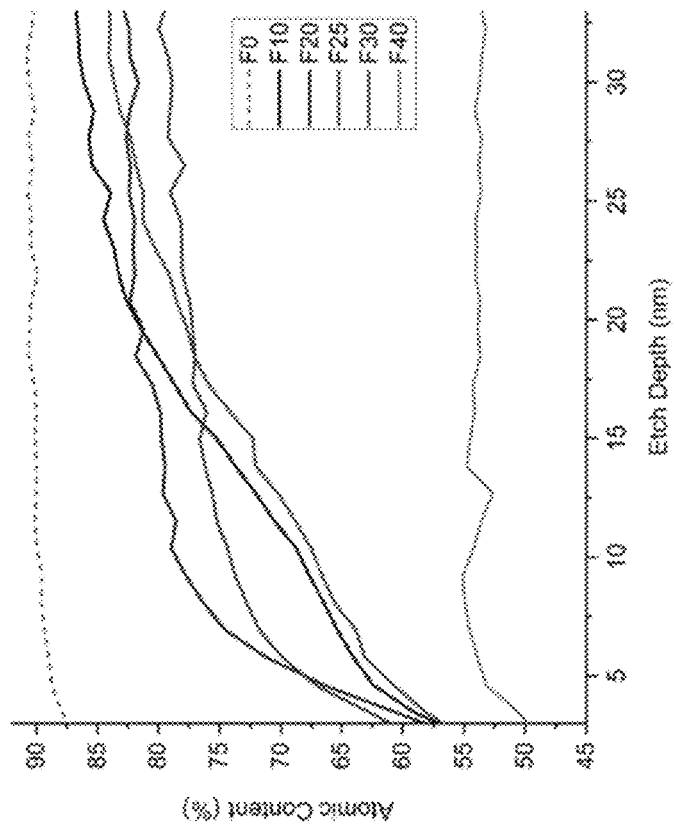
FIGS. 20A-20B show the XPS data for unmodified and modified PU coatings.
Figure 20B:
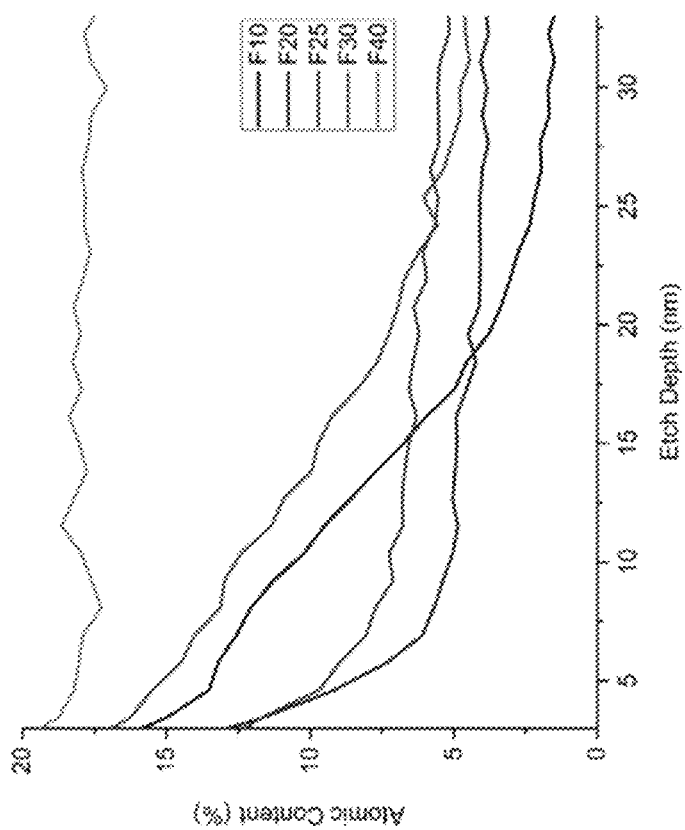

XPS was utilized to quantify the elemental compositions of materials on the surface and as a function of depth of the coatings. As expected, the results showed that the AmpAdd additive self-stratified onto the surface, so that there was a higher concentration of Si than C on the surface, while this trend was reversed throughout the bulk of a coating (FIG. 20). The XPS depth profiling analysis suggests that the concentration of the amphiphilic moieties on the surface was directly related to the amount of incorporated AmpAdd. The initial Si concentration was higher (C concentration was lower) as the amount of AmpAdd was increased (except for F10). The data indicated that the concentration of Si rapidly declined as a function of thickness for the F10 coating and plateaued at ~2%. A less drastic decreasing trend was also noticed for coatings F20, F25, and F30, and all these systems eventually leveled at a Si concentration around 5-6%. However, the decreasing trend was not observed for coating F40, indicating the concentration of Si atoms was almost uniform until the assessed thickness of 36 nm (FIG. 20B). The XPS data for the C atom showed an increasing trend for coatings F10, F20, F25, and F30 (FIG. 20A), in accord with the decreasing Si atom trend for each system. The increasing C atom trend was not observed for coating F40, which correlated with the unchanging Si atom concentration of this formulation. As expected, the unmodified PU system showed a uniform concentration of the C atom throughout the coating while there was no Si in its composition. The XPS data confirms that the amount of AmpAdd has a direct effect on the composition of the system both at the surface and in the bulk of the coating.

Figure 21:
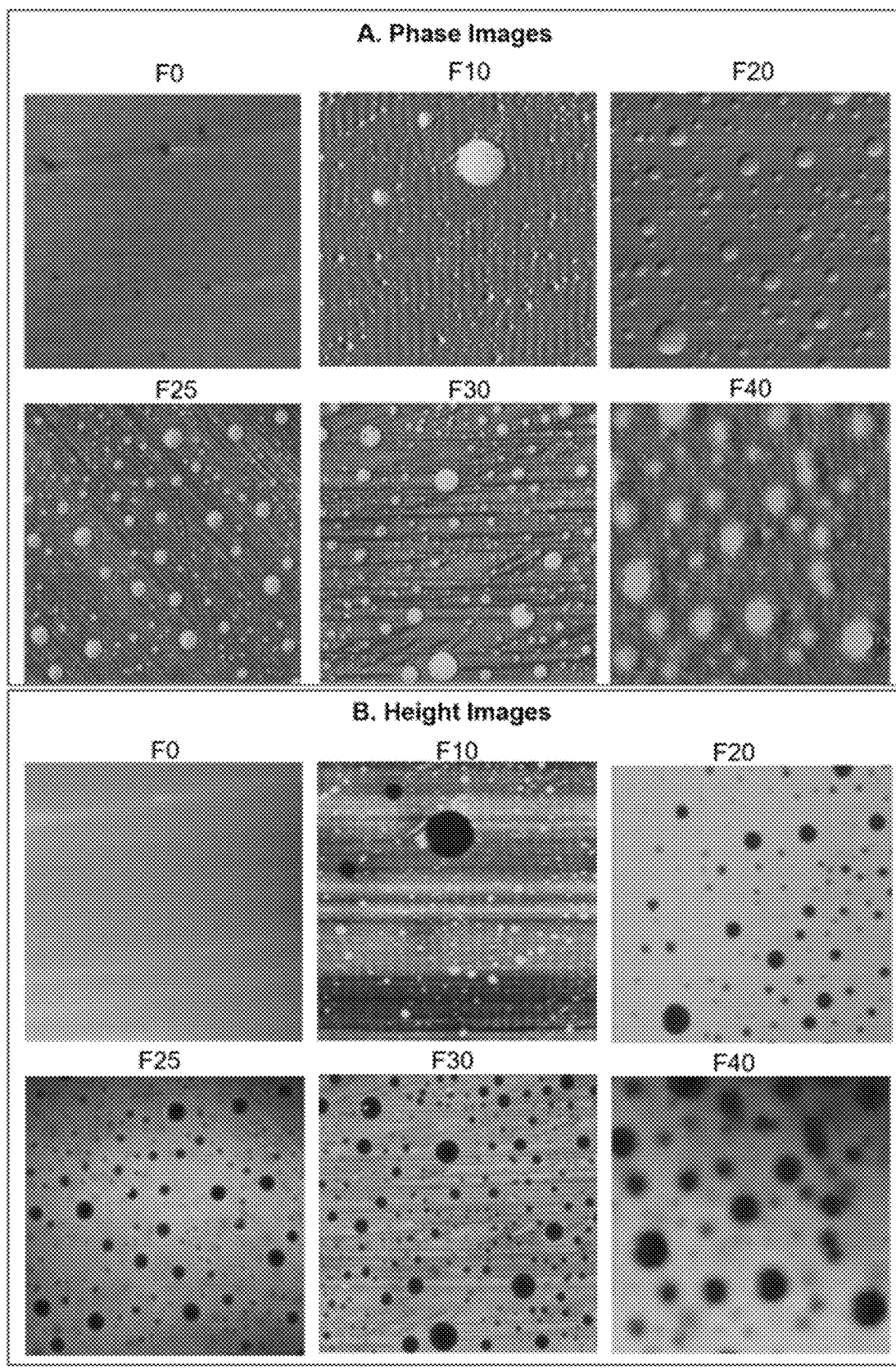
FIG. 21 shows the AFM phase images (upper box) and height images (lower box) for unmodified and modified PU coatings labelled according to coating number. Each image is for an area of 100 μm×100 μm.
Figure 22:
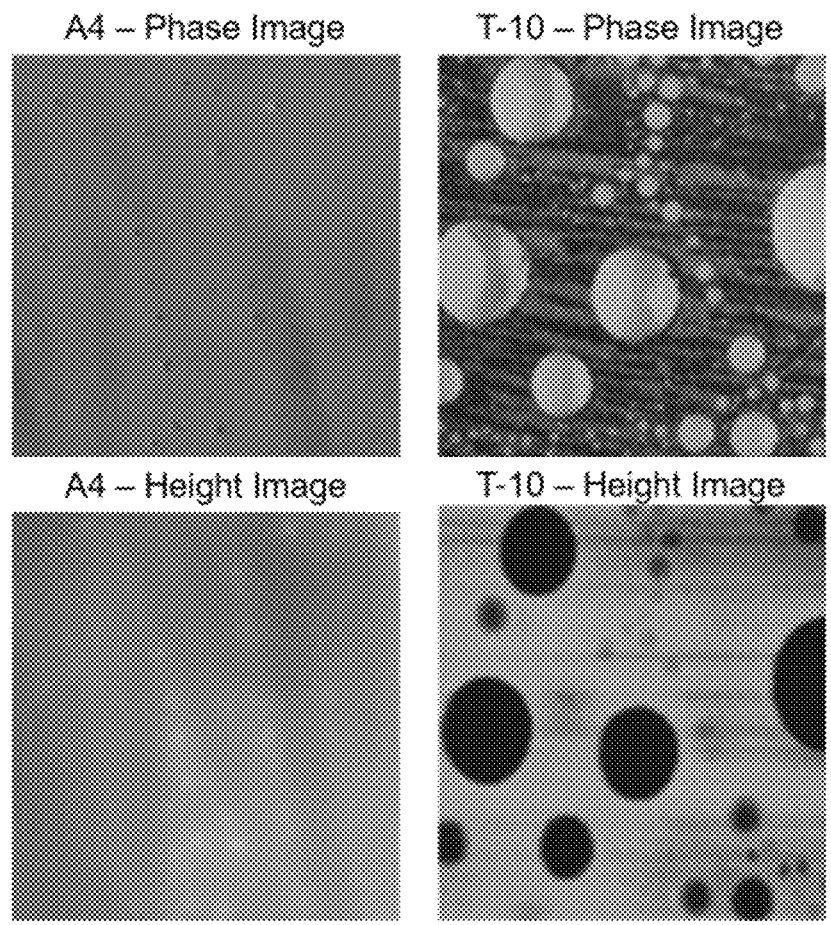
FIG. 22 shows the internal control coatings phase and height AFM images. A4 has a hydrophobic surface composed of sole PDMS. T-10 has an amphiphilic surface composed of both 750 $\overline{M}_n$ PEG and 10,000 $\overline{M}_n$ PDMS (each at 10 wt. %) crosslinked to the coating network.
Figure 23:
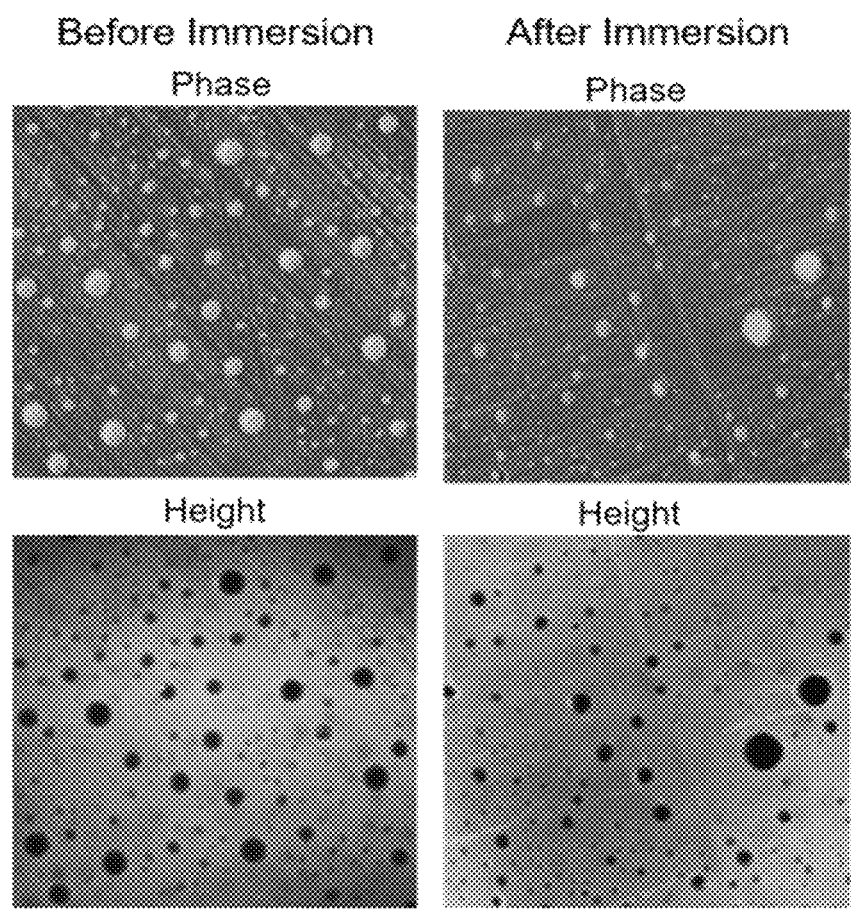
FIG. 23 shows the AFM analysis of F25 coating before and after water immersion, displaying phase images (Upper) and height images (bottom). Each image is for an area of 100 μm×100 μm.

AFM was employed to study the morphology of the developed surfaces. The general notation is that soft materials like PDMS appear lighter (high phase angles) and harder materials like PEG appear darker (low phase angles). The AmpAdd-modified PU coatings displayed heterogeneous surfaces in both height and phase AFM images that were composed of light and dark patterns, implying the formation of a complex amphiphilic morphology (FIG. 21). The unmodified PU system exhibited a uniform homogenous surface (free of patterns) that was relatively similar to the hydrophobic A4 system (since it has solely PDMS on the surface) (FIG. 22). As the AmpAdd was incorporated into the PU system, the presence of spherical micro-domains on the surface was observed. The AmpAdd-modified coatings displayed a surface that was relatable to the morphology of control T-10 amphiphilic coating (FIG. 22)—this system uses the same molecular weights of PEG (750 $\overline{M}_n$) and PDMS (10,000 $\overline{M}_n$) that are used for the synthesized AmpAdd additive, but instead the PEG and PDMS chains are covalently bound into the coating system. The area of these surface domains increased as the concentration of AmpAdd in a formulation increased from 10 wt. % (F10) to 20 wt. % (F20) and 25 wt. % (F25). The F30 formulation (containing 30 wt. % AmpAdd) exhibited a very similar morphology to F25, but many smaller domains were seen among the micro-domains. Coating F40 showed domains that were larger in comparison to F25 and F30, which may be due to the saturated surface by AmpAdd (note that capturing AFM images for the F40 coating was more challenging than other systems due to its increased slippery nature and limitations of the instrument). The AFM images support the evidence from ATR-FTIR and XPS that the AmpAdd self-stratified into the surface. Furthermore, the increasing trend of the amount of the observed heterogeneous domains is in direct correlation with the incorporated amount of AmpAdd; the higher the additive amount, the higher area coverage of domains on the surface. The AFM images for coatings were taken after water immersion. Overall, the coatings experienced a slight decrease in number of the domains on their surface. This change is noticeable in FIG. 23, exhibiting the AFM images for F25 coating after and before water immersion. The AFM images indicate that the AmpAdd rearranges on the surface as it is not crosslinked into the system, and this observation corresponds with increased water contact angle values after the water immersion period.

Biological assays were conducted to evaluate FR properties of the studied coatings using a range of marine fouling organisms. All the assessments were carried out after 28 days of water leaching to ensure that toxic impurities did not interfere with the results. The coatings were evaluated for leachate toxicity using *C. lytica*, *N. incerta*, and *U. linza* as described elsewhere (Cassé et al., *Biofouling* 2007, 23 (2), 121-130; Majumdar et al., *ACS Comb. Sci.* 2011, 13 (3), 298-309) prior to any FR experiments. All the coatings were non-toxic, opening the way for biological assessments.

*U. linza* is a known biofouling macroalga species. The algal spores produced by *U. linza* explore surfaces searching for areas that are most favorable for attachment. They respond to a number of cues including surface chemistry, wettability and roughness. In general, the spores tend to settle at lower densities on hydrophilic than on hydrophobic surfaces, but when presented with amphiphilic coatings the ambiguous nature of the surfaces can delay settlement and therefore also result in lower settlement densities. Finlay et al., *Integr. Comp. Biol.* 2002, 42 (6), 1116-1122; Callow et al., *Appl. Environ. Microbiol.* 2000, 66 (8), 3249-3254; Callow et al., *J. R. Soc. Interface* 2005, 2 (4), 319-325. Settlement across the range of additive containing coatings was broadly similar which probably reflects the narrow range of surface energies and the fact that unsettled spores were not removed from the system.

Figure 24A:
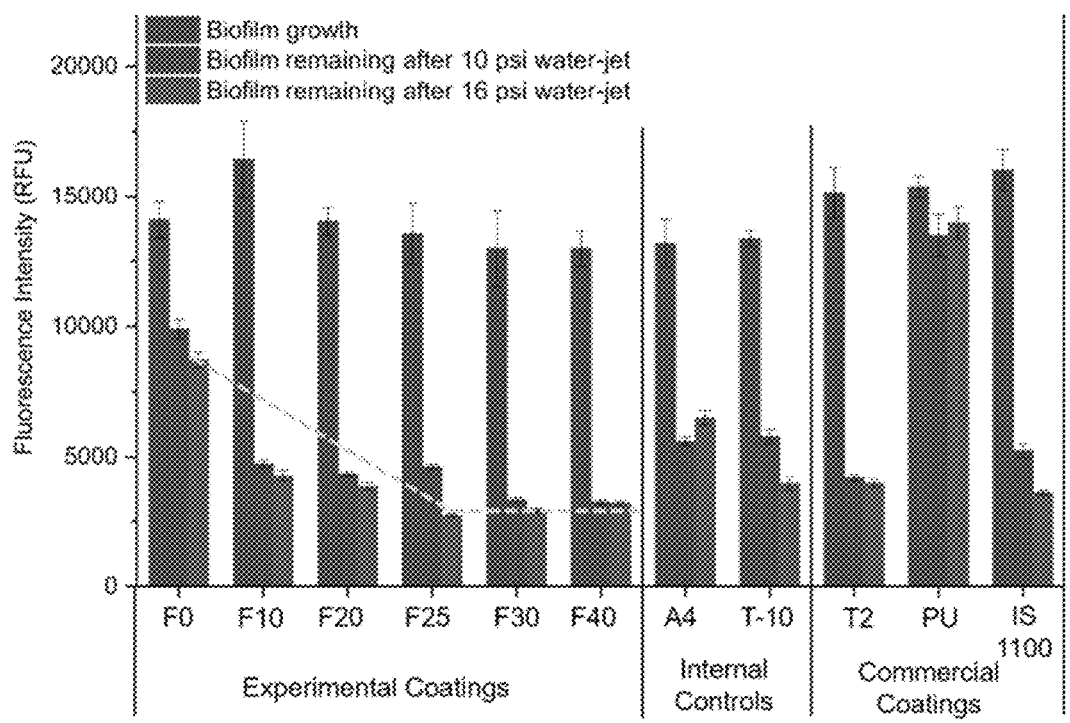
FIGS. 24A-24B show the FR data for *U. linza*.
Figure 24B:
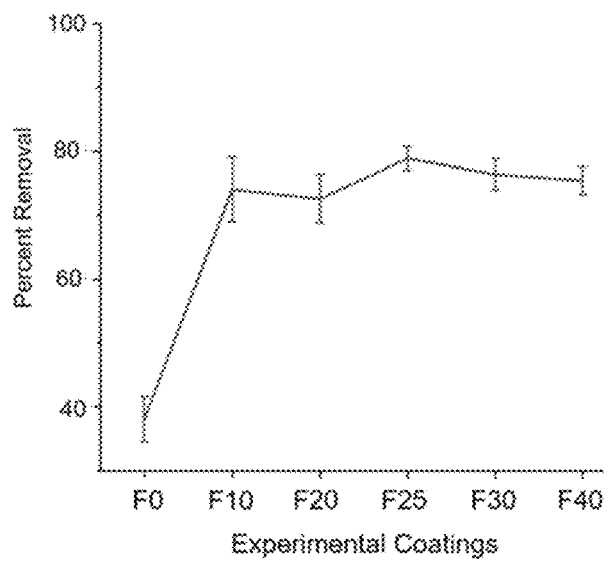

After settlement, the spores germinate and develop into sporelings (young plants) on the surfaces of the coatings. To assess FR potential the biofouled surfaces were water-jetted at two pressure levels—10 psi and 16 psi—and the biomass remaining was determined (FIG. 24A—blue bars 10 psi; green bars 16 psi). Adhesion strength is generally stronger on moderately hydrophilic surfaces, such as the polyurethane standard coating (PU) and the polyurethane base coating (F0), as can be seen in the results (FIG. 24A). For the additive containing coatings the release trend was similar at both water pressures. At 16 psi, the introduction of 10 wt. % AmpAdd (4 wt. % PEG and PDMS each) and 20 wt. % of AmpAdd (8 wt. % PDMS and PEG each) improved the release of *U. linza* almost two times that of the unmodified PU system (F0 coating) (comparison P-values<0.05, Tukey's method). The release was improved further by adding 25 wt. % (10 wt. % PEG and PDMS each) of AmpAdd, however, the addition of further amounts of AmpAdd did not result in further Ulva removal (FIG. 24B) and/or less biomass remaining (FIG. 24A). At 10 psi, the release in relation to the amount of AmpAdd followed a similar trend; however, the critical concentration of AmpAdd needed to be at 30 wt. % (12 wt. % PDMS and PEG each) to offer the optimum performance. These findings are on par with other studies where an activity threshold was also identified for FR activity against sporelings of *U. linza* in coatings containing amphiphilic diblock copolymers of PDMS and PEGylated-fluoroalkyl polystyrene blocks. Martinelli et al., *Biofouling* 2011, 27 (5), 529-541. The activity similarly increased with the weight content of the block copolymer and was related to surface segregation. Fluorine-free amphiphilic block copolymers containing PDMS and PEG also showed a marked threshold for FR activity against sporelings of *U. linza*. Sundaram et al., *Biofouling* 2011, 27 (6), 589-602. These coatings reconstructed on immersion in water bringing the PEG chains to the surface which correlated with the performance against sporelings. The AmpAdd-modified coatings F25, F30, and F40 outperformed all the internal controls and commercial standards, and the release data for *U. linza* suggests that a critical amphiphilic concentration (CAC) is required to optimize performance. This CAC for optimal release of *U. linza* was approximately 10-12 wt. % PEG and PDMS each (25-30 wt. % AmpAdd) as illustrated in FIG. 24.

Figure 25A:
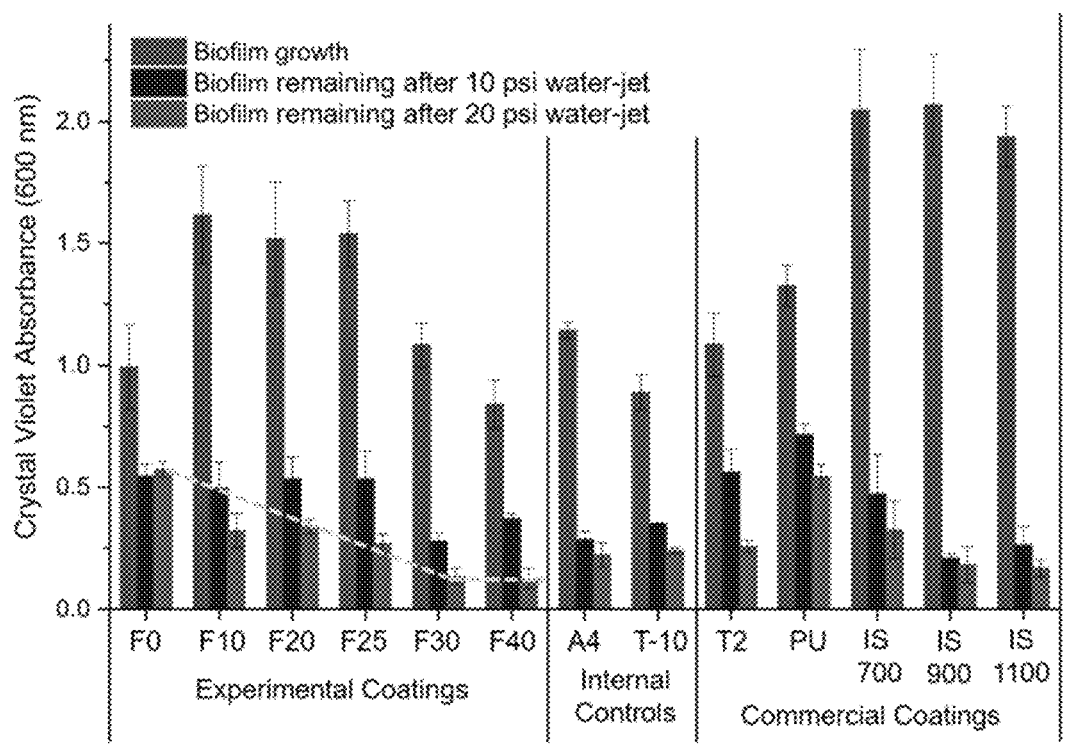
FIGS. 25A-25B show the FR data for C. lytica.
Figure 25B:
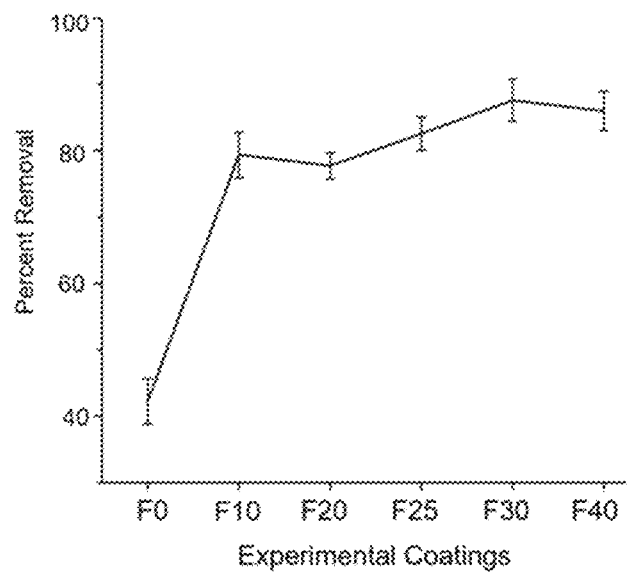

*C. lytica* is another biofouling organism that is recognized for its affinity to settle on a variety of surfaces that range from hydrophilic to hydrophobic. Lejars et al., *Chem. Rev.* 2012, 112 (8), 4347-4390 The extent of biofouling among the studied and control systems varied greatly (FIG. 25A—red bars). Overall, experimental coatings F0, F30, and F40 and control coatings A4 and T-10 showed the lowest *C. lytica* biofouling, while commercial controls such as IS 700, IS 900, and IS 1100 showed the highest amount of *C. lytica* biofouling. The FR experiments were carried out at two pressure levels and the biomass of *C. lytica* remaining was reported at 10 psi (FIG. 25A—blue bars) and 20 psi (FIG. 25A—green bars). Generally, the release of *C. lytica* film was higher at 20 psi than 10 psi resulting in a lower amount of biomass remaining on the surface, but the trends were alike between the two pressure levels (FIG. 25A). At 20 psi, an amount of AmpAdd additive between 10 wt. % to 25 wt. % resulted in improved release of *C. lytica* in contrast to the unmodified system (comparison P-values<0.05, Tukey's method), but the extent of biomass remaining was almost the same regardless of the amount of additive within this range (comparison P-values>0.05, Tukey's method). Once the amount of AmpAdd additive in a system reached 30 wt. % for F30 coating (12 wt. % PEG and PDMS each), the release of *C. lytica* significantly improved over the observed performance for the F10, F20, and F25 systems (comparison P-values<0.05, Tukey's method). However, the addition of more AmpAdd in F40 system (40 wt. %; 17 wt. % PEG and PDMS each) did not enhance the release or percent removal and showed a similar performance to F30 (FIG. 25) (comparison P-values>0.05, Tukey's method). At 10 psi, the addition of the AmpAdd additive did not result in better FR performance up to 25 wt. % of AmpAdd, thus coatings F10, F20, and F25 displayed *C. lytica* release that was comparable to the unmodified F0 system. However, once the amount of AmpAdd reached 30 wt. % and higher, it showed an improved release for the *C. lytica* film. Coatings F30 and F40 were compared with both internal controls and commercial coatings as these two demonstrated the best results among the AmpAdd-modified coatings. The data presented in FIG. 25A shows that F30 and F40 coatings outperformed both the internal and commercial systems either significantly or marginally (FIG. 25A). As for *U. linza*, the FR data of *C. lytica* suggests that a critical amphiphilic concentration (CAC) was needed to deliver the minimum biomass remaining (FIG. 25A) and/or maximum release/percent removal (FIG. 25B) until a plateaued performance was observed. This CAC for *C. lytica* was at 12 wt. % PEG and PDMS each (30 wt. % AmpAdd), being in the range of the CAC for *U. linza*.

Figure 26A:
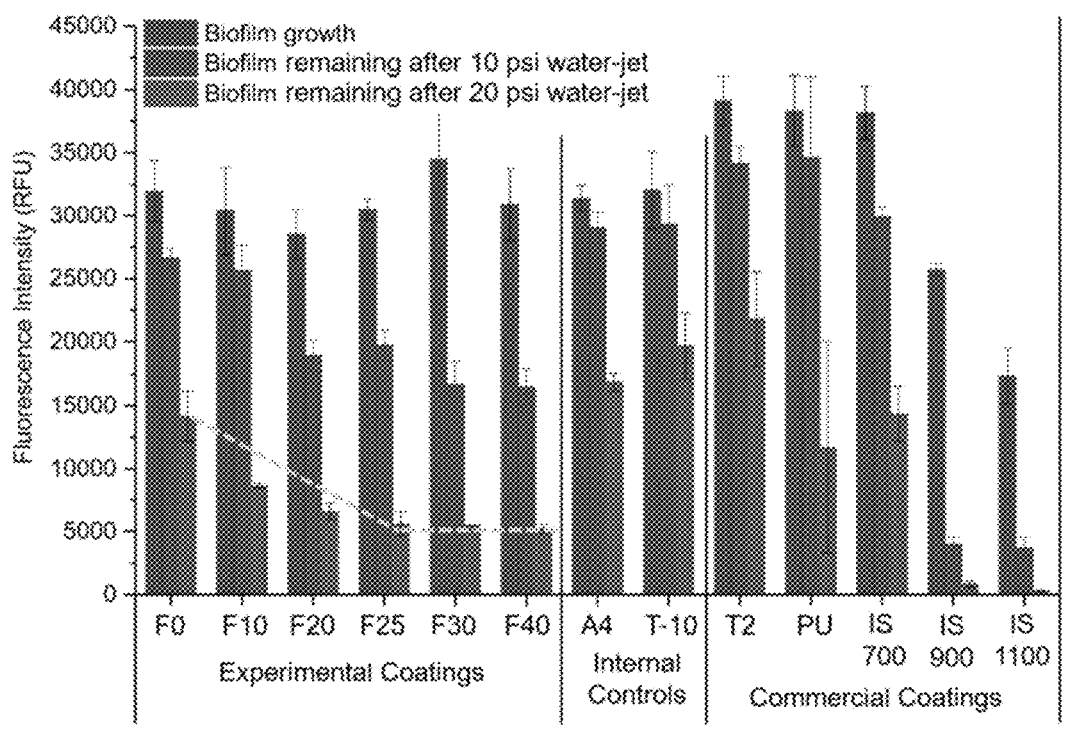
FIGS. 26A-26B show the FR data for N. incerta.
Figure 26B:
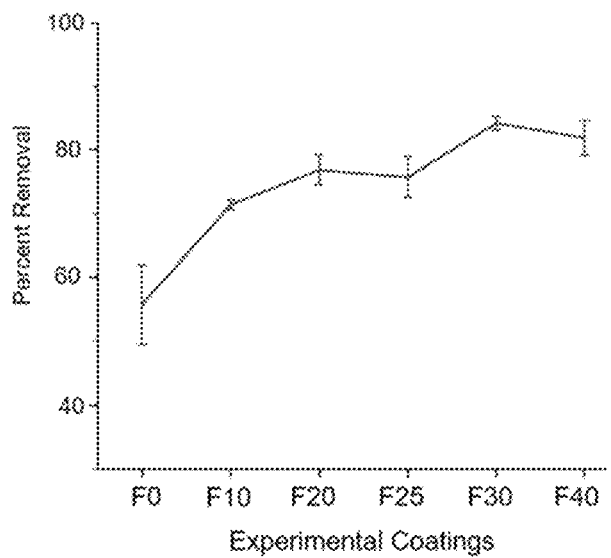

*N. incerta* is well-known as another major biofouling organism that adheres more strongly to hydrophobic surfaces. Finlay et al., *Integrative and Comparative Biology* 2002, 42 (6), 1116-1122; Callow et al., *Applied Environmental Microbiology* 2000, 66 (8), 3249-3254. The extent of *N. incerta* biofouling varied among the studied coatings, internal controls, and commercial controls (FIG. 26A—red bars). Overall, coatings T2, PU and IS 700 showed the highest biofouling; commercial IS 900 and IS 1100 SR showed the lowest amount of biofouling; and the studied additively modified PU coatings showed intermediate biofouling for *N. incerta*. The release of formed *N. incerta* biofilm was evaluated at two pressure levels and the remaining biofilm of *N. incerta* was assessed at 10 psi (FIG. 26A—blue bars) and 20 psi (FIG. 26A—green bars). The remaining biomass of the *N. incerta* films was noticeably lower at 20 psi than 10 psi. Even though the extent of release/removal was different due to the water pressure levels used, the observed trends at both levels were similar among the additively modified PU coatings. Generally, the addition of AmpAdd clearly improved release of the *N. incerta* biofilm (FIG. 26A). At 20 psi pressure level, the removal of the film improved until 25 wt. % (10 wt. % PEG and PDMS each) of the AmpAdd was added into the system, comparing F25, F20, and F10 systems with unmodified F0 formulation (FIG. 26A) (comparison P-values<0.05, Tukey's method). The further addition of additive after this point resulted in a plateau and negligible further improvement per observed performance of F30 and F40 systems where 30 wt. % and 40 wt. % of the amphiphilic additive was incorporated, respectively (comparison P-values>0.05, Tukey's method). A similar trend was noticed at the 10 psi pressure level, except the plateau point was determined to be at 30 wt. % of AmpAdd (12 wt. % PEG and PDMS each). Coating systems F25, F30 and F40 that contained 25 wt. % or more additives released the *N. incerta* films better than internal controls (A4 and T-10), indicating the effect of amphiphilic concentration at the surface on release performance (comparison P-values<0.05, Tukey's method). The only two coatings that outperformed the AmpAdd-modified PU systems were IS 900 and IS 1100. The *N. incerta* release data followed a similar trend to those obtained for *U. linza* and *C. lytica*, in that a critical CAC needs to be met for attaining the maximum FR performance in a plateaued region (FIG. 26B). This CAC for *N. incerta* was at 10-12 wt. % PEG and PDMS each (25-30 wt. % AmpAdd), on par with the CAC for *U. linza* and *C. lytica* marine organisms.

Mechanical tests were performed on the PU coatings to assess their integrity as the amount of AmpAdd increased in the system. The properties started to drop at 50 wt. % of the AmpAdd; thus, 40 wt. % concentration of AmpAdd was marked as the highest limit before properties declined (Table 10). Coatings showed desirable stability against MEK and salt water double rubs until 40 wt. % of AmpAdd. Additionally, the additive did not impact the performance of the coating in response to the rapid deformation impact test. The conical mandrel bend test showed that the additive did not affect the flexibility of the coatings. Although it was expected that the long PEG and PDMS chains would contribute to better flexibility, it did not occur because these moieties were mostly present on the surface of a coating rather than throughout the bulk due to their self-stratification. The adhesion of the coatings to the substrate remained consistent and unchanged until 40 wt. % of AmpAdd. Generally, the introduction of the AmpAdd was not detrimental to the PU system until 40 wt. %. Thus, coatings with 40 wt. % or less of AmpAdd were selected to be investigated for this study.

as the amount of the amphiphilic additive in the PU coating increased, the surface of the coating system became more amphiphilic. The FR data of the coatings against all biological assays (*C. lytica, U. linza,* and *N. incerta*) demonstrated that the systems performed best when a specific amount of amphiphilicity was present in a composition (a performance comparable or better than both internal controls and commercial coatings). The amount of amphiphilicity that resulted in the desired performance towards all marine organisms was between 10-12 wt. % PEG and PDMS each (25-30 wt. % AmpAdd), and a further amount of AmpAdd above this concentration did not boost the FR performance. Surface characterization provided further insight into these surfaces as well. ATR-FTIR showed the presence of an amphiphilic surface. Contact angle measurements indicated that the amphiphilic concentration had a direct impact on the surface considering that coatings with 25 wt. % AmpAdd or higher were more dynamic, possessed lower slip-off angles, and displayed the lowest contact angle hysteresis (difference between advancing and receding contact angles). XPS showed that the AmpAdd self-stratified onto the surfaces, and the presence of the amphiphilic moieties on the surface was directly correlated to the amount of AmpAdd in a system. XPS data indicated that for coatings containing 25 wt. % or higher AmpAdd, the additives were well distributed on the surface and extended to a higher thickness within the bulk of the coating. AFM images clearly showed the presence of heterogenous micro-sized domains after AmpAdd was introduced to the PU system, and the sum of domains increased as the amount of AmpAdd increased in a formulation. Once AmpAdd was introduced at 25 wt. % or higher

TABLE 10

Results of mechanical tests on unmodified and modified PU Coatings

| Formulation | MEK Double Rub (Number of rubs) | Water Double rubs (Number of rubs) | Forward Impact (in-lb) | Reverse Impact (in-lb) | Conical Mandrel (mm) | Crosshatch Adhesion |
|---|---|---|---|---|---|---|
| F0 | >400 | >400 | 64 | 12 | 90 | 4B |
| F10 | >400 | >400 | 68 | 16 | 100 | 5B |
| F20 | >400 | >400 | 72 | 12 | 90 | 5B |
| F25 | >400 | >400 | 68 | 12 | 100 | 4B |
| F30 | >400 | >400 | 68 | 16 | 120 | 5B |
| F40 | 380 | >400 | 76 | 20 | 130 | 5B |
| F50 | 292 | 320 | 76 | 20 | 130 | 3B |

3.3.6 Conclusions

The results showed that amphiphilic moieties are able migrate to the surface of a coating and modify it until a point of saturation, and then additional surface-active agents do not change the surface or impact the FR performance. This point of surface saturation is the critical amphiphilic concentration (CAC). This behavior shares similarities with what occurs when surfactants are added to a liquid. In this case, the surfactant reduces the surface tension until the interface is saturated and then additional surfactant does not change the surface tension, but forms micelles, with the concentration at which this occurs being known as the critical micelle concentration. Dominguez et al., *J. Chem. Educ.* 1997, 74 (10), 1227; Van Oss et al., Colloids Surf. A-Colloids and Surfaces A: Physicochem. Eng. Asp. 1993, 78, 1-49. This work explored the effect of incorporating an amphiphilic additive into a polyurethane coating system. The amphiphilic additive was made by attaching hydroxyl-terminated PEG and PDMS chains on a polyisocyanate. Amphiphilic coating systems are being widely investigated as marine coatings, but there continues to be a lack of knowledge about these recently developed systems. Thus, it was determined at what concentration of amphiphilicity a conventional PU system develops FR properties. Generally, amounts in a formulation, the surfaces were saturated by these spherical micro-domains. Mechanical integrity of the coatings was assessed too, and it was determined that the coatings maintained their integrity until 40 wt. % of AmpAdd was added. Overall, the FR data and surface characterizations go hand in hand. Both suggest that at a critical amphiphilic concentration there are noticeable changes in contact angles, surface morphology, and extent of removal of the biological films. The critical amphiphilic concentration (CAC) that resulted in the maximum FR performance was between 10-12 wt. % PEG and PDMS each (25-30 wt. % AmpAdd). This invention opens the door for an unexplored area of marine coating technology; namely, to better understand amphiphilicity to improve the design of FR coatings.

3.4 Example 4

3.4.1 Design of Experiment

A series of amphiphilic additives (AmpAdd) containing chains of PDMS and PEG were synthesized and added into an amphiphilic siloxane-polyurethane coating system, called AmpSiPU. The AmpSiPU is a system that is formulated with IPDI trimer polyisocyanate, amphiphilic PEG-PDMS-isocyanate prepolymers, and acrylic polyol. The selected AmpSiPU formulation is called R0 in this example, containing 10 wt. % of 10,000 $\overline{M}_n$ PDMS and 10 wt. % of 750 $\overline{M}_n$ PEG as self-stratifying crosslinked prepolymers; this formulation was selected as it performed the best in the results published elsewhere. Galhenage et al., *J. Coating. Tech. Res.* 2017, 14 (2), 307-322.

AmpAdds were prepared by installing PEG and PDMS chains on IPDI trimer polyisocyanate resin. The ratio of isocyanate groups to the combined OH groups of PEG and PDMS was a 1:1 molar ratio. To attain types of AmpAdds (Table 11), PEG and PDMS were used in varying molecular weights and amounts to complete the required one molar hydroxyl ratio. The molecular weights of 5,000 $\overline{M}_n$ and 10,000 $\overline{M}_n$ for PDMS, and 550 $\overline{M}_n$ and 750 $\overline{M}_n$ for PEG were chosen to synthesize amphiphilic additives in accordance with optimal chain lengths for FR performance. Galhenage et al., *J. Coating. Tech. Res.* 2017, 14 (2), 307-322; Bodkhe et al., *Prog. Org. Coat.* 2012, 75 (1-2), 38-48. Also, the amount of attached PEG and PDMS on an additive was another variable to access new AmpAdds. For example, "50:50 PDMS: PEG" for Amp1 additive means that both PEG and PDMS were added in equal weight (i.e., 2 g PEG and 2 g PDMS) to synthesize the additive. It should be noted that there was a wt. % for IPDI polyisocyanate resin as part of the additive structure too since the amphiphilic chains were grafted on its backbone. Therefore, the wt. % values of PEG and PDMS on an additive could be calculated and were used to determine the final content of PEG and PDMS moieties in a formulation (Table 11).

TABLE 11

List of prepared additives and their compositional details

| Additive | PDMS Type ($\overline{M}_n$) | PEG Type ($\overline{M}_n$) | PDMS:PEG (% ratio) | PDMS (wt. %) | PEG (wt. %) | IPDI isocyanate (wt. %) |
|---|---|---|---|---|---|---|
| Amp-1 | 5,000 | 750 | 50:50 | 42 | 42 | 16 |
| Amp-2 | 5,000 | 550 | 50:50 | 42 | 42 | 16 |
| Amp-3 | 10,000 | 750 | 50:50 | 42 | 42 | 16 |
| Amp-4 | 10,000 | 550 | 50:50 | 42 | 42 | 16 |
| Amp-5 | 10,000 | 750 | 33:66 | 15 | 61 | 23 |
| Amp-6 | 10,000 | 750 | 10:90 | 8 | 67 | 25 |

Knowing that the R0 coating of AmpSiPU contains up to 10 wt. % each PDMS and PEG, these additives were added at 15 wt. %, 10 wt. % and 20 wt. %. A total of 15 formulations were investigated: 8 experimental (Table 12) and 7 controls (both internal and commercial) (Table 13). For the experimental systems, the first four formulations (R1-R4) were designed as a $2^2$ experimental design to evaluate two factors for the designed AmpAdds including the molecular weight of PDMS (5,000 $\overline{M}_n$ and 10,000 $\overline{M}_n$) and molecular weight of PEG (550 $\overline{M}_n$ and 750 $\overline{M}_n$), while keeping the amphiphilic balance unchanged (amount of hydrophilic and hydrophobic moieties in a system). Formulations R5 and R6 were considered to evaluate the effect of shifting the amphiphilic balance towards more hydrophilicity via AmpAdds, comparing these formulations with R3 and R0. Formulations R7 and R8 were considered to evaluate the effect of the amount of an AmpAdd, comparing these formulations with R3 and R0.

The table outlines type of the added AmpAdd, amount of the added AmpAdd, wt. % of PEG and PDMS based on the added AmpAdd, and overall wt. % of PEG and PDMS in a formulation (including 10 wt. % of each PDMS and PEG in R0 base formulation).

TABLE 12

Coating Compositions

| | Added AmpAdd Details | | | | Formulation Details | |
|---|---|---|---|---|---|---|
| Formulation | Additive Type | Additive Amount (wt. %) | PDMS (wt. %) | PEG (wt. %) | PDMS (wt. %) | PEG (wt. %) |
| R0 | — | — | — | — | 10.0 | 10.0 |
| R1 | Amp-1 | 15.0 | 6.2 | 6.2 | 16.2 | 16.2 |
| R2 | Amp-2 | 15.0 | 6.2 | 6.2 | 16.2 | 16.2 |
| R3 | Amp-3 | 15.0 | 6.2 | 6.2 | 16.2 | 16.2 |
| R4 | Amp-4 | 15.0 | 6.2 | 6.2 | 16.2 | 16.2 |

TABLE 12-continued

Coating Compositions

| Formulation | Added AmpAdd Details | | | Formulation Details | |
|---|---|---|---|---|---|
| | Additive Type | Additive Amount (wt. %) | PDMS (wt. %) | PEG (wt. %) | PDMS (wt. %) | PEG (wt. %) |
| R5 | Amp-5 | 15.0 | 5.0 | 10.0 | 15.0 | 20.0 |
| R6 | Amp-6 | 15.0 | 1.5 | 13.5 | 11.5 | 23.5 |
| R7 | Amp-3 | 20.0 | 8.3 | 8.3 | 18.3 | 18.3 |
| R8 | Amp-3 | 10.0 | 4.1 | 4.1 | 14.1 | 14.1 |

3.4.2 Control and Standard Coatings

Commercial standards were prepared following the manufacturer's instructions. A4 SiPU coating, internal hydrophobic control, containing 20,000 $\overline{M}_n$ PDMS as crosslinker was prepared following directions elsewhere; this formulation was selected since it showed the best performance among the studied systems. Bodkhe et al., *J. Coating. Tech. Res.* 2012, 9 (3), 235-249. Similar to experimental coatings all control and standards were also prepared on 4"×8" primed aluminum panels and multi-well plates. Table 13 contains detailed descriptions of the control and standard coatings used for this study.

TABLE 13

List of Control Coatings

| Control Name | Control ID | Description |
|---|---|---|
| A4 SiPU | A4 | Internal Hydrophobic SiPU Control |
| Polyurethane | PU | Pure Polyurethane Standard |
| Polystyrene | PS | Pure Polystyrene Standard (used for *U. linza* test) |
| Dow T2 | T2 | Silicone Elastomer Standard |
| Intersleek ® 700 | IS 700 | Intersleek Commercial FR Standard |
| Intersleek ® 900 | IS 900 | Intersleek Commercial FR Standard |
| Intersleek ® 1100 SR | IS 1100 | Intersleek Commercial FR Standard |

3.4.3 Synthesis of Amphiphilic Additive

The AmpAdd additives were produced via reacting hydroxyl-terminated PEG and PDMS chains with the IPDI trimer polyisocyanate (Scheme 1 above). The molar ratio of NCO groups to the combined OH groups of PEG and PDMS was 1:1. The functional isocyanate groups were fully converted to urethane linkages by reacting with PEG and PDMS chains. PEG and PDMS were added in weight ratios that met the required molar ratio.

To synthesize Amp-2 (containing weight ratio of PDMS: PEG 50:50), PEG 550 $\overline{M}_n$ (8.00 g) was diluted in toluene (8.00 g) in a 50-mL flask. PDMS 5,000 $\overline{M}_n$ (8.00 g) was added to the flask and mixed robustly with vortex for 2 minutes. IPDI trimer resin (6.32 g) and DBTDAc catalyst solution (1% by wt. in MAK) (1.12 g) were then added to the flask. The reaction was carried out at 80° C. for 2 hours. The reaction could also be carried out at ambient conditions for 24 hours. The flask was equipped with a magnetic stirrer, nitrogen inlet, and temperature controller. The reflux condenser was used when the heat was applied. The synthesized Amp-2 additive contained 42.0 wt. % PEG and 42.0 wt. % PDMS (Table 11), calculated based on solid contents utilized to synthesize the additive and the final solid content. All other AmpAdds were synthesized following the same procedure.

3.4.4 Synthesis of the Curable Coating Compositions and Their Curing

A synthesized AmpAdd was added to R0 (an AmpSiPU formulation). The R0 system is an amphiphilic marine FR coating that mainly composed of acrylic polyol, IPDI trimer isocyanate resin, and amphiphilic PEG-PDMS-isocyanate prepolymers.

For example, to formulate coating R2, acrylic polyol (12.24 g; 50% solid), acetylacetone (1.74 g) (potlife extender), amphiphilic PEG-PDMS-isocyanate prepolymer (5.10 g; 70% solid), and Amp-2 additive (3.73 g; 50% solid) were added to a vial and stirred ambiently for 24 hours. IPDI polyisocyanate trimer Desmodur Z4470 BA resin (2.95 g) and DBTDAs catalyst solution (0.28 g) were added to the vial, and the mixture was stirred for another hour. Coating formulations were drawn down on primed 8'×4' aluminum panels using a wire-round drawdown bar with a film thickness of 80 µm. All coatings were cured at ambient laboratory conditions for 24 hours, followed by oven curing at 80° C. for 45 minutes. All experimental coatings were prepared following the same procedure. Coatings were cut out in circular shapes and glued to 24-well plates for biological assays test.

Furthermore, two internal model PU systems without amphiphilic prepolymers were prepared using the same materials and following the same procedure (except no PEG-PDMS-isocyanate prepolymers were added). One system was the unmodified model PU and the other one was modified model PU with Amp3 additive is its composition. These two model PU systems were used to substantiate the self-stratification of AmpAdd additives into the surface of coatings via X-ray photoelectron spectroscopy (XPS) experiments (these controls avoided interference of PDMS signals of the prepolymer in R0 and PDMS signals of an added AmpAdd).

3.4.5 Results and Discussion

Amphiphilic FR coatings have shown promising results to mitigate marine biofouling. These systems offer better performance than traditional hydrophobic FR coatings. As discussed above, when a critical amphiphilic concentration (CAC) is achieved for a system, its marine performance improves considerably. Thus, this concept was utilized to further investigate how increasing the amphiphilicity for an established amphiphilic marine coating using additives affects its surface and FR properties. Amphiphilic siloxane-polyurethane (AmpSiPU) was selected to be modified by additives in this example, specifically R0 formulation containing 10 wt. % 10,000 $\overline{M}_n$ PDMS and 10 wt. % 750 $\overline{M}_n$ PEG (a top system in another study). Galhenage et al., *J. Coating. Tech. Res.* 2017, 14 (2), 307-322. A series of amphiphilic additives were introduced to R0 to evaluate their effect on this system.

The amphiphilic additives (AmpAdds) were synthesized by attaching hydroxyl-terminated PEG and PDMS chains on IPDI isocyanate trimer resin through the facile reaction of isocyanate and alcohol. A dried toluene solvent was used to ensure water did not react with isocyanate during the reaction. The complete conversion of isocyanate groups due to the reaction was confirmed with FTIR and isocyanate titration of the additives. All FTIR spectrum displayed disappearance of isocyanate peak at 2250 cm$^{-1}$ and a broadened signal for secondary amine (from the formed urethane linkage) at 3350 cm$^{-1}$ (FIG. 27), supporting the reaction of isocyanate groups. Also, the signature peaks for Si—O—Si at 1035 cm$^{-1}$ (FIG. 27—Green highlights) and C—O—C of PEG at 1105 cm$^{-1}$ (FIG. 27—Red highlights) demonstrate the reaction of PDMS and PEG chains onto the isocyanate-based backbone, respectively. The intensity of the C—O—C peak increased, and the intensity of the Si—O—Si signal decreased as a higher amount of PEG and a lower amount of PDMS was attached to an additive, respectively (FIG. 27A; comparing from bottom to top). Also, 750 $\overline{M}_n$ PEGs appear to show stronger peaks (Amp-1 and Amp-3 additives) than 550 $\overline{M}_n$ PEGs (Amp-2 and Amp-4 additives) in comparison with their neighboring Si—O—Si signals (FIG. 27B). Overall, the FTIR data qualitatively indicates the amount of PEG and PDMS and their incorporated molecular weights (MW) results in a different additive. Isocyanate titrations were carried out on additives, and the results implied the presence of no remaining isocyanate groups.

Figure 28B:
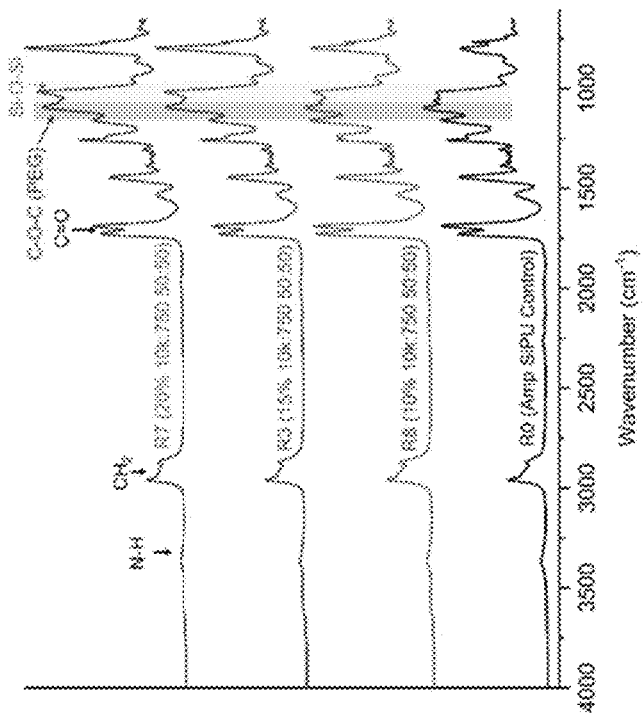
FIGS. 28A-28B show the ATR-FTIR of the unmodified and modified R0 AmpSiPU coatings.
Figure 28A:
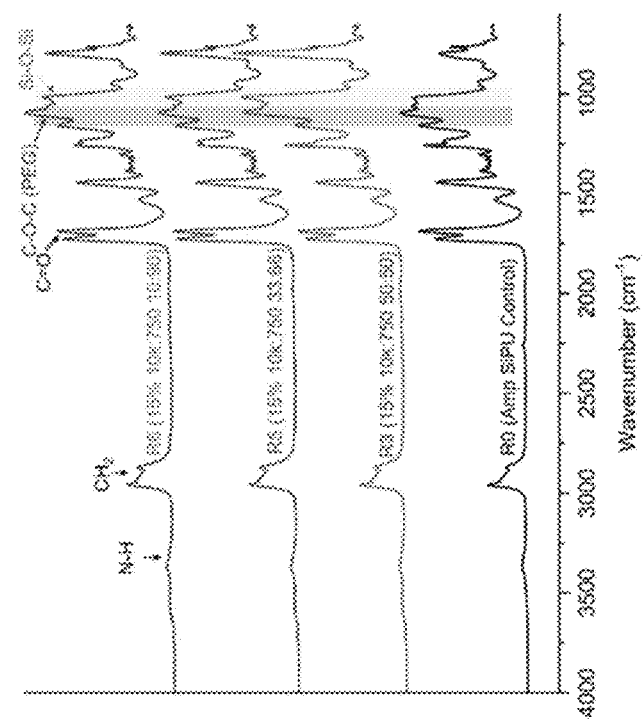

The surfaces of unmodified and modified AmpSiPU R0 coatings were analyzed with a series of techniques including ATR-FTIR, contact angle measurements, and AFM. Also, XPS was used to validate the self-stratification of amphiphilic additives into a surface for model PU coatings. ATR-FTIR of modified coatings showed the signals for both C—O—C (FIG. 28—Green highlights) and Si—O—Si (FIG. 28—Red highlights) with higher intensity than the unmodified R0 coating. Like additives of different weight ratios of PEG and PDMS, the intensity of ether and siloxane peaks for the coatings followed a similar trend; the C—O—C signal increased as an additive with higher PEG content was used (FIG. 28A; comparing from bottom to top). The intensity of PEG and PDMS peaks also gradually increased as a higher amount of amphiphilic additives was introduced (FIG. 28B; comparing from bottom to top). The ATR-FTIR data suggests amphiphilic additives self-stratified into the surface, comparing PEG and PDMS signals of modified and unmodified R0 coatings.

Figures 29A, 29B, 29C, 29D:
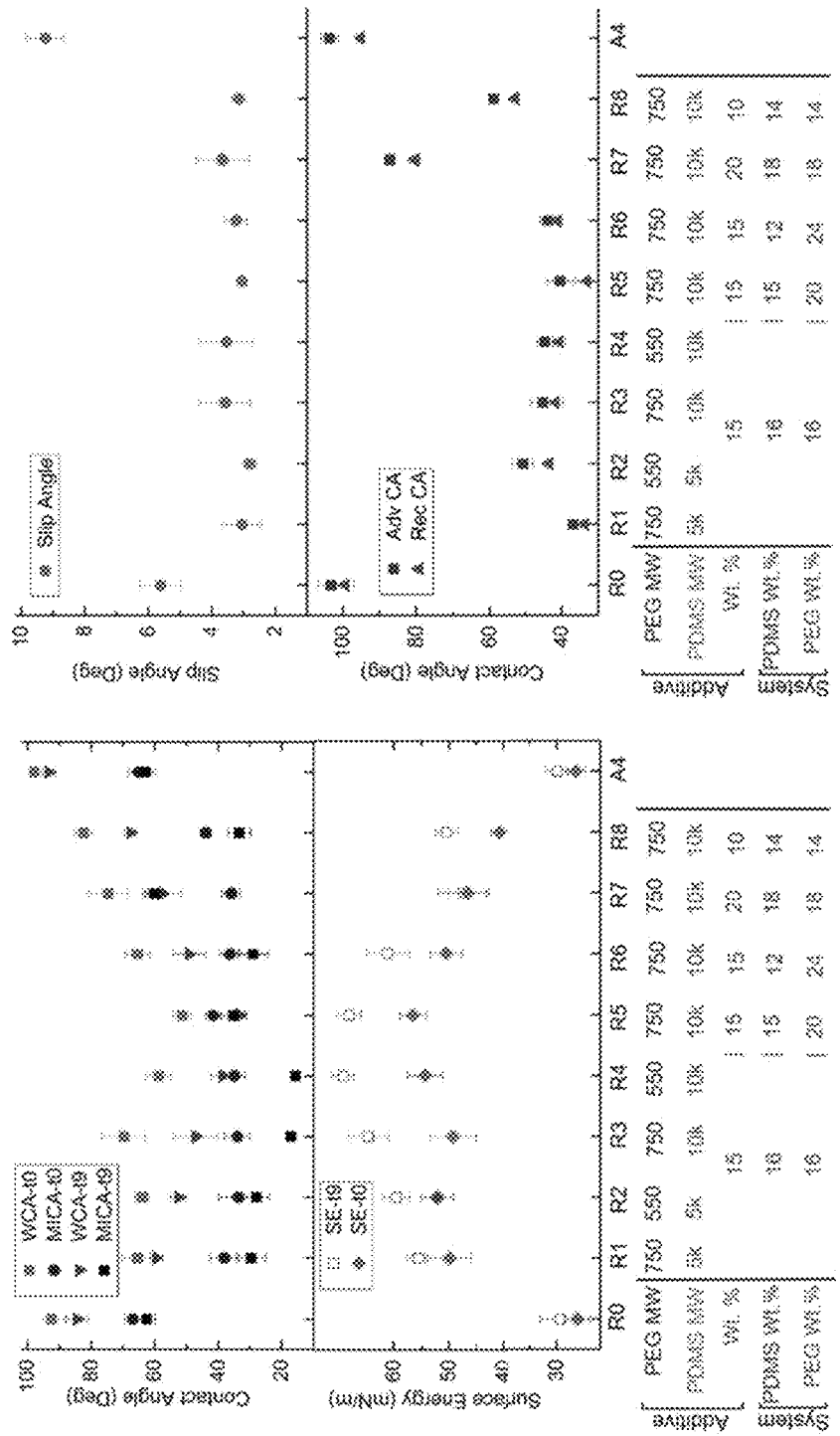
FIGS. 29A-29D show the contact angle and surface energy data for coatings.

Contact angle measurements, both static and dynamic, were conducted to assess surface properties of coatings. The static contact angles monitored water and methylene iodide droplets on a surface as a function of time up to 9 minutes (values plateaued at this point). The unmodified R0 AmpSiPU coating shows a dynamic surface, meaning the contact angle values change over time (i.e., droplets spread). In comparison to R0, the initial water contact angle (WCA) and methylene iodide contact angle (MICA) values for all AmpAdd-modified coatings decreased, and the change over time for contact angles was more noticeable than R0 (FIG. 29A). The dynamic change of contact angles (specially WCA) over time is attributed to the addition of AmpAdds, resulting in a higher density of PEG chains on the surface that facilitates spreading a water droplet. The non-dynamic behavior of hydrophobic A4 (WCA or MICA does not change) due to its PDMS rich surface further reconfirms the surfaces of R0 and its modified versions are amphiphilic. The static data indicates the degree of changes among AmpAdd-modified formulations vary slightly (FIG. 29A), suggesting the MW of PEG and PDMS or amount of additive in a system does not remarkably impact the dynamic behavior for a system. Surface energies (SE) of coatings were calculated using WCAs and MICAS values (FIG. 29B); SEs are typically higher when WCA and MICA values are lower than 90°. The data shows SE for R0 jumps significantly after the addition of amphiphilic additives, increasing from 27-30 mN/m to a 40-70 mN/m. The SE for hydrophobic A4 is similar to control R0, suggesting R0 is more hydrophobic on the surface than its modified versions.

Figure 30:
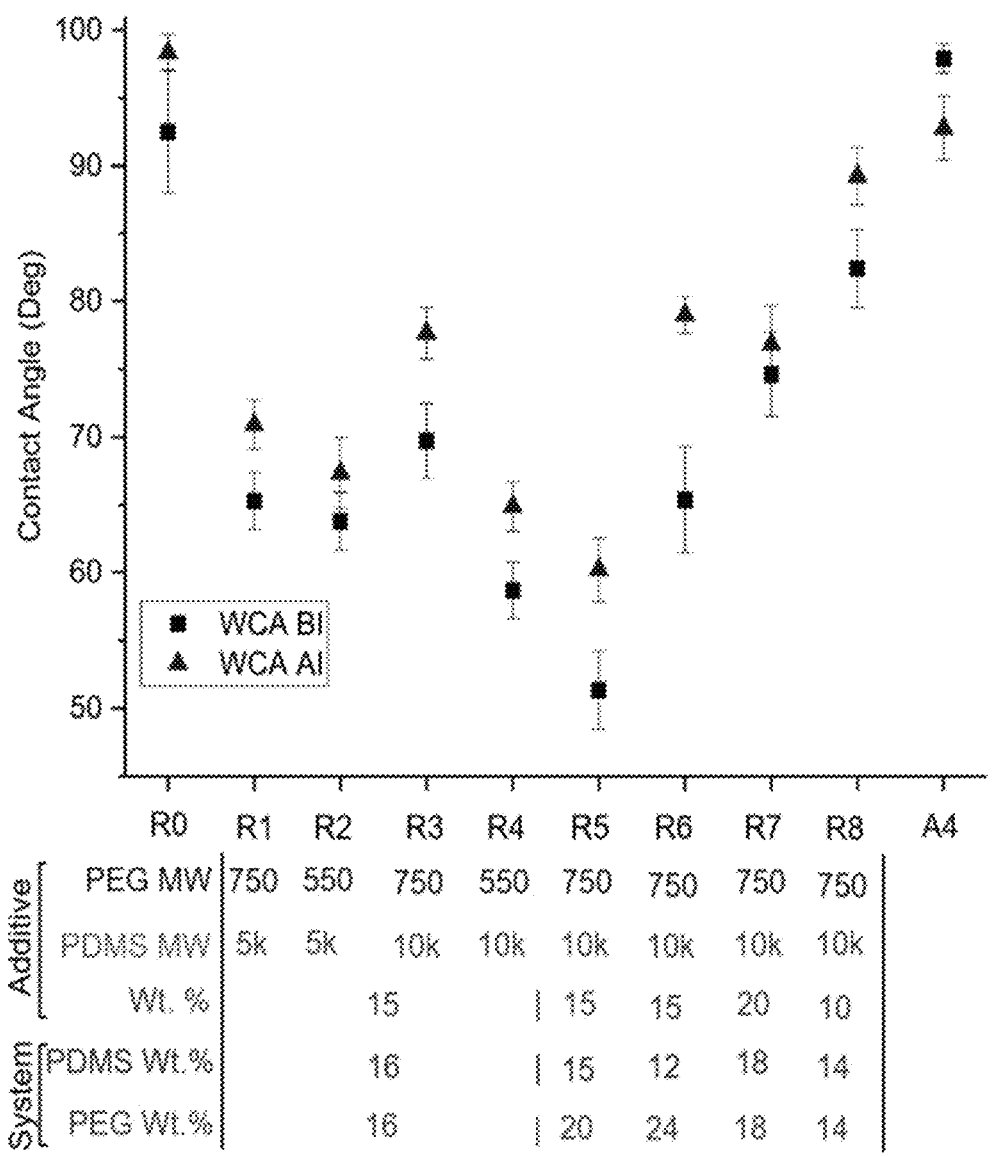
FIG. 30 shows the water contact angle data for coatings before immersion (BI) and after immersion (AI) in water for 28 days. The x-axis is labeled to reflect details about utilized additive and the overall content of PEG and PDMS in a formulation.

Dynamic contact angle experiments were carried out using a tilting stage to determine slip angle (water droplet roll-off angle) and advancing/receding contact angles. The AmpAdds decreased the slip angle of the R0 coating by almost 50%, from nearly 6° to 3°-3.5° (FIG. 29C). The decrease of the roll-off angle implies that AmpAdds contribute to the easier removal of objects from the surface of R0. There was no significant difference between roll-off angles of modified R0 coatings. In comparison, the hydrophobic A4 system had a slip angle at 9°, implying amphiphilic surfaces improved roll-off performance. Advancing contact angles (Adv CA) and receding contact angles (Rec CA) were remarkably lower for modified R0 coatings (except R7 which held relatively higher values) than both the unmodified R0 and hydrophobic A4 systems (FIG. 29D). There was no major difference between CA values due to MW of PEG and PDMS or amphiphilicity balance. The hysteresis (numerical difference between Adv CA and Rec CA) remained unchanged and less than 10° for unmodified and modified R0 coatings, demonstrating that the additives did not roughen the surface of R0 system. WCAs were recorded for coatings after water immersion, and the results indicated the modified R0 coatings were as stable as control systems including unmodified R0 and SiPU A4 (FIG. 30). Overall, WCAs slightly increased for all systems to a relatively equal extent. The changes are associated with several indicators such as rearrangement of surface domains due to interaction with water.

Figure 31:
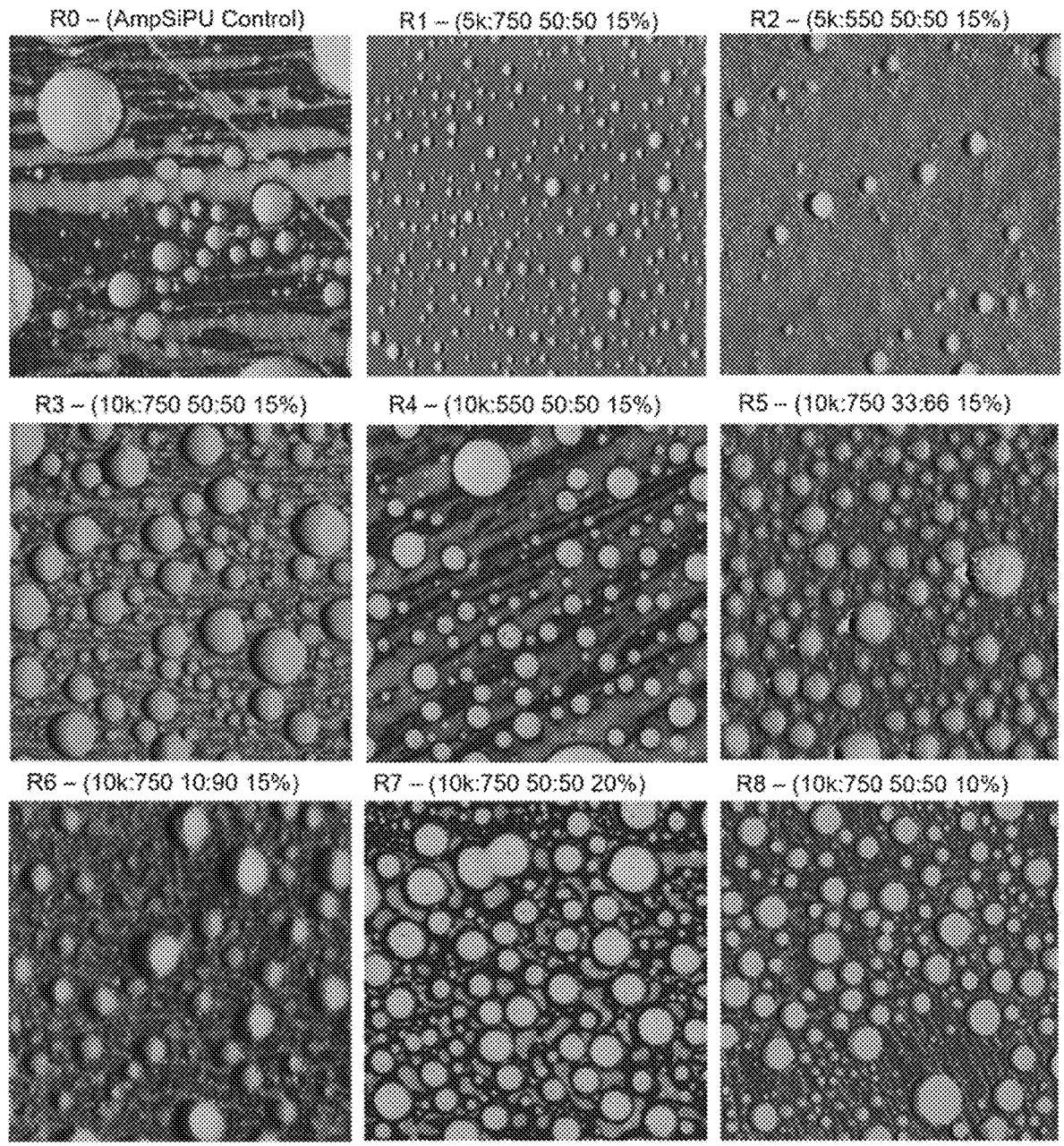
FIG. 31 shows the AFM phase images of unmodified and modified R0 AmpSiPU coatings. Each image is for an area of 100 μm×100 μm. Each label reflects the coating number.
Figure 32:
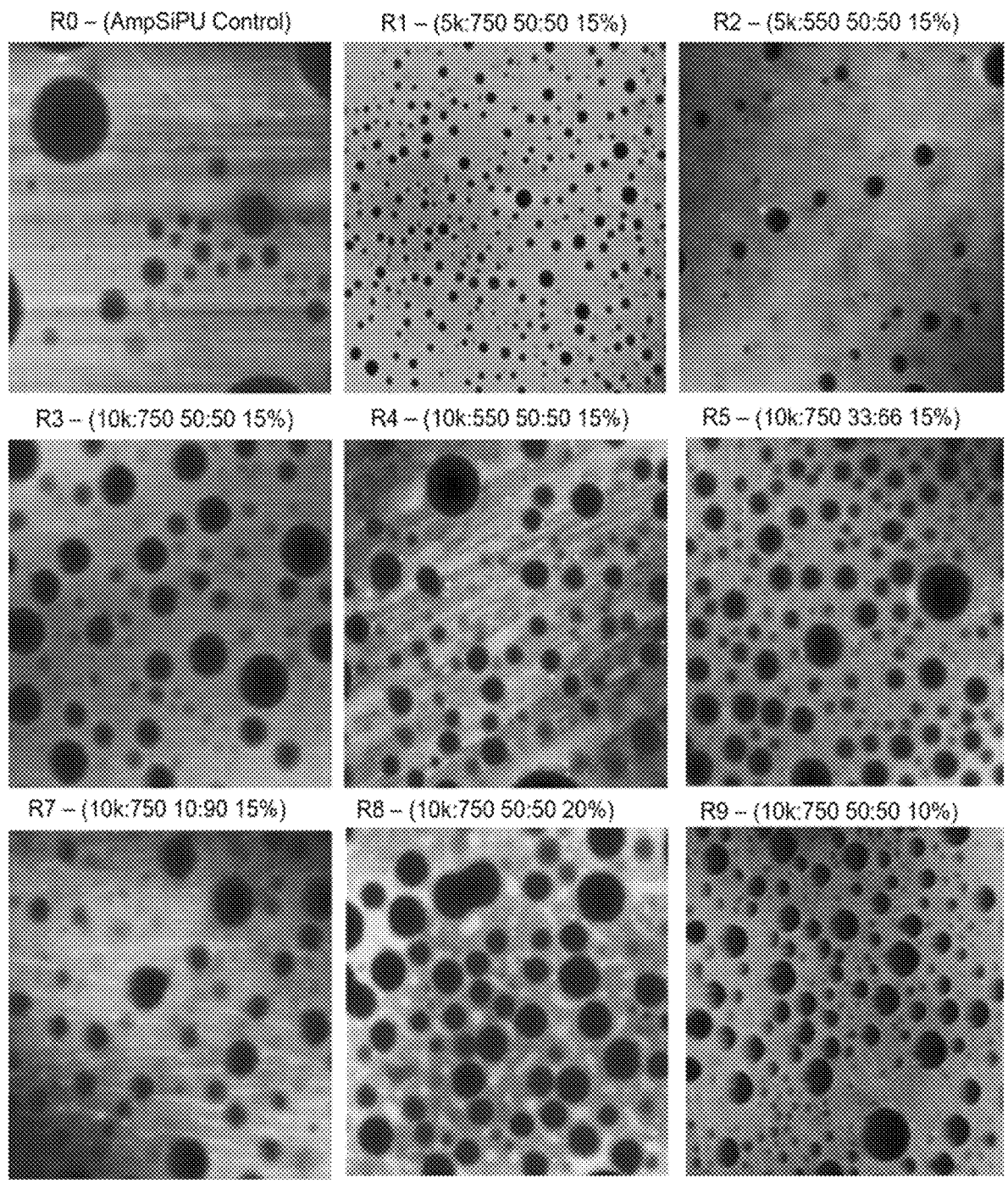
FIG. 32 shows the AFM height images of unmodified and modified R0 AmpSiPU coatings. These images are in correlation with phase images in FIG. 31. Each image is for an area of 100 μm×100 μm. Each label reflects the coating number.
Figure 33:
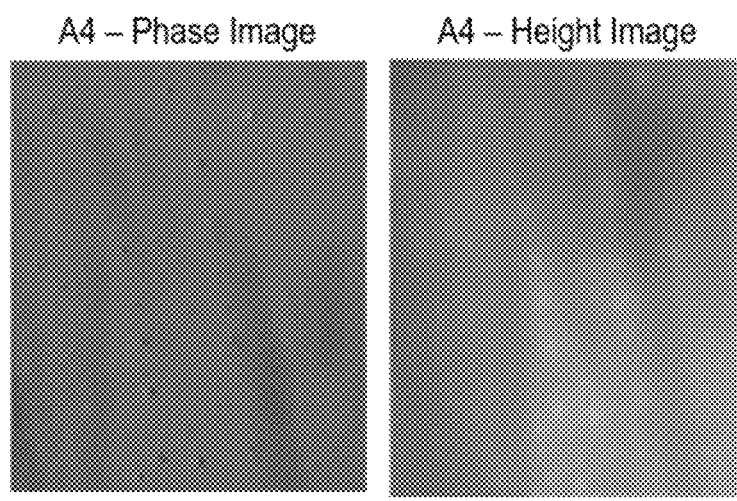
FIG. 33 shows the AFM images of hydrophobic A4 SiPU system.
Figure 34:
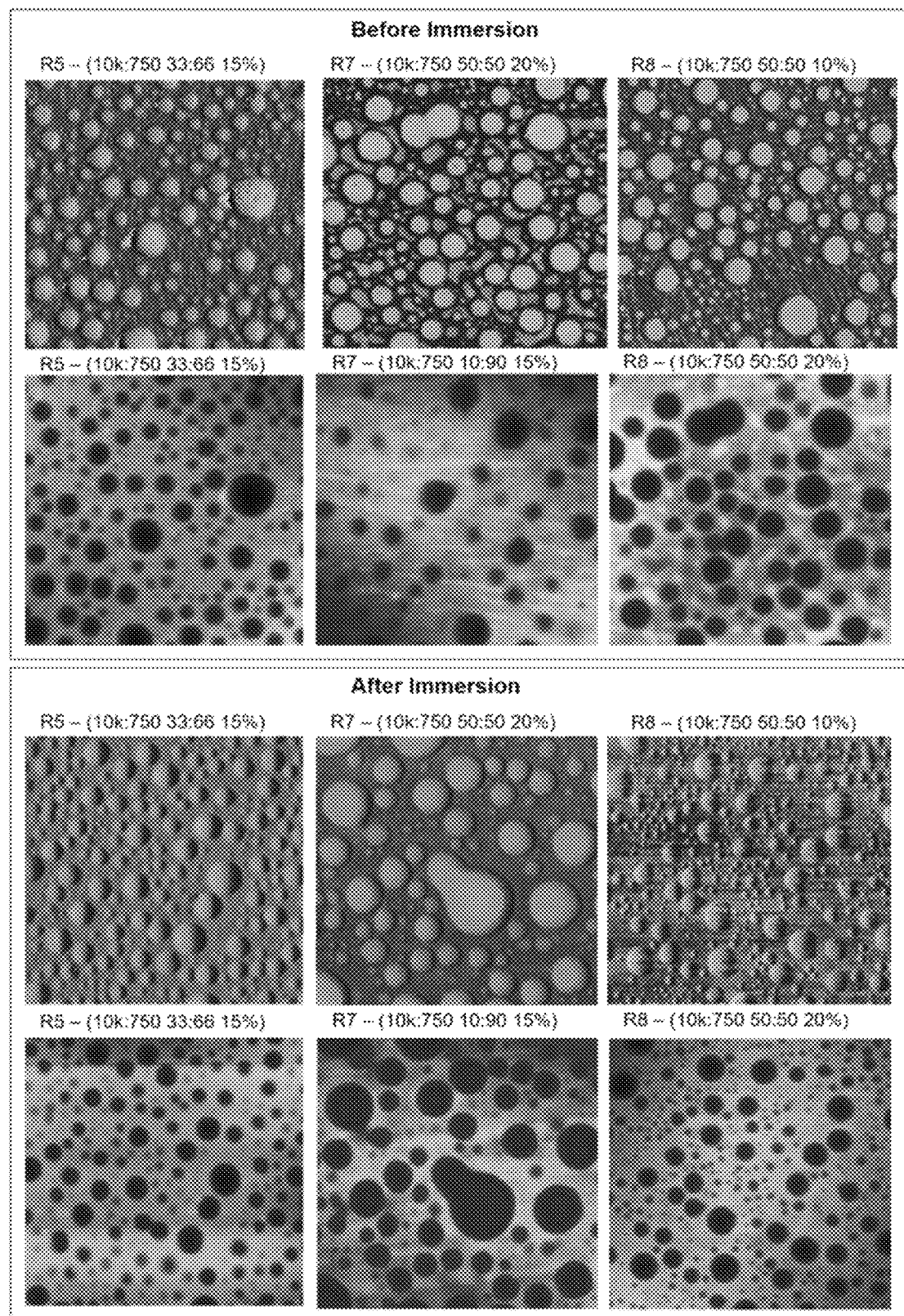
FIG. 34 shows the AFM analysis of R5, R7, and R8 coatings before and after water immersion, displaying phase images (Upper) and height images (bottom) under each section. Each image is for an area of 100 μm×100 μm.

AFM was used to characterize the surface morphologies of the studied coatings. AFM phase images typically show lighter appearance (high phase angle) for soft materials like PDMS while dark appearance (low phase angle) for harder materials like PEG. AFM images for R0 AmpSiPU (FIG. 31—R0; FIG. 32—R0) and A4 SiPU (FIG. 33) control systems display a microdomain-containing heterogeneous surface and a microdomain-free homogenous surface, respectively, indicating the amphiphilic R0 system possesses a patterned surface (due to its PEG-PDMS prepolymers). Galhenage et al., *J. Coating. Tech. Res.* 2017, 14 (2), 307-322. The addition of AmpAdds into R0 further modified its heterogenous surface. The data indicates that the MW of PDMS impacts the surface morphology of R0, while MW of PEG does not affect it necessarily—systems with 5k $\overline{M}_n$ PDMS (R1 and R2) contain smaller domains than systems with 10 k $\overline{M}_n$ PDMS (R3 and R4). The introduction of AmpAdds with higher contents of PEG (Amp-5 and Amp-6) retained a comparable morphology to R3 and R4 coatings, indicating no major changes (except the images were harder to capture). The amount of additive did alter the morphology of R0, comparing Amp-3 at 10 wt. % (R8), 15 wt. % (R3), and 20 wt. % (R7). The comparison implies surface of R7 was highly saturated where domains were merged and very near to each other, while R3 and R8 showed fewer domains on their surfaces in the order mentioned. As a sum, AmpAdds appeared to result in the surface domains being more organized and more narrowly dispersed in size. Additionally, AFM images were recorded for coatings after 28-days of water immersion (FIG. 34). The comparison of images before and after water-immersion demonstrated the surface domains were stable, slight rearrangements occurred, and no major depletion/leaching of domains was observed. The post-immersion rearrangement of domains may be the reason that contact angle data slightly changed as well (FIG. 32). Overall, the AFM images demonstrated that amphiphilic additives modified the surfaces and several factors influence the change such as the MW of moieties or the amount of additive. The AFM images correlate with ATR-FTIR and contact angle data that AmpAdds self-stratified into surfaces and caused a dynamic interaction with assessed droplets.

Figure 35A:
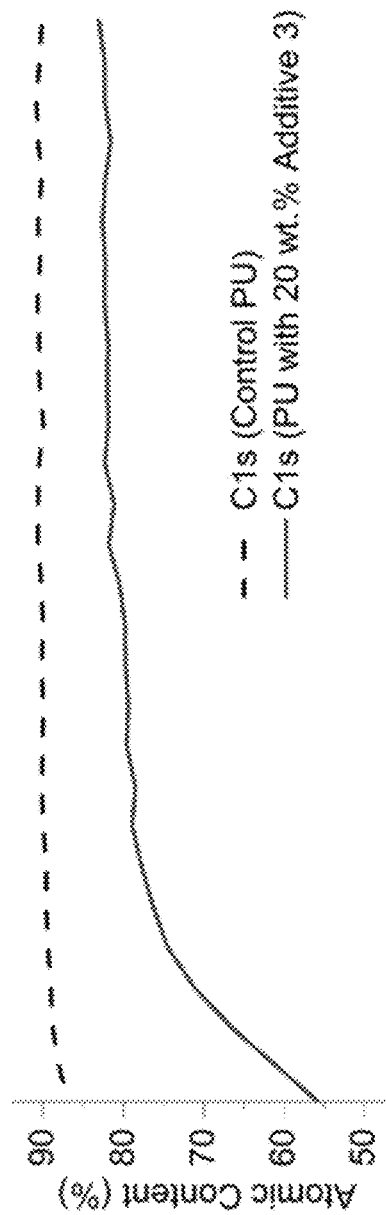
FIGS. 35A-35B show the XPS depth profiling data.
Figure 35B:
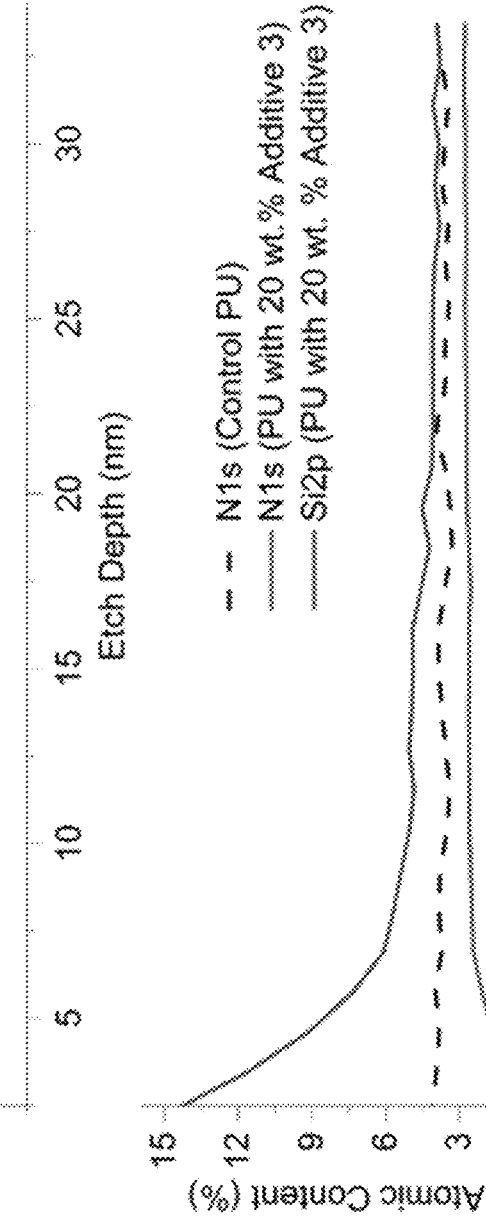

XPS was utilized to confirm the self-stratification of the amphiphilic additives into the surface of R0. XPS depth analysis was initially conducted on modified and unmodified R0 coatings as a function of coating thickness up to 30 nm, but the data was not conclusive due to difficulties in differentiating between PEG and PDMS of R0 itself and incorporated additives. Therefore, an internal model PU system was used to validate the self-stratification of AmpAdds. The model PU system was similar to the R0 AmpSiPU system but without amphiphilic PEG-PDMS-based prepolymers, and for confirmation purposes, Amp-3 was added to the model PU system at 20 wt. %. XPS depth analysis of unmodified model PU and AmpAdd-modified model PU supported the theory that amphiphilic additives self-stratify into a surface (FIG. 35). The unmodified model PU showed a constant concentration of carbon (FIG. 35A) and nitrogen (FIG. 35B) throughout the evaluated 30 nm depth, indicating a relatively homogenous network by composition. Comparatively, the modified model PU system showed the surface contained silicon which its concentration gradually decreased as a function of depth (FIG. 35B) while the concentration of nitrogen and carbon atoms increased (FIG. 35). The depth-dependent concentrations of Si, C, and N supported the self-stratification of amphiphilic additives to the surface, correlating with data from ATR-FTIR, contact angle analysis, and AFM.

To assess the FR performance of the coatings, biological assays using four representative marine fouling organisms were carried out with *U. linza*, *C. lytica*, *N. incerta*, and barnacles. All assessments were carried out after 28 days of water aging. All coatings were non-toxic as they were tested through leachate toxicity of *C. lytica*, *N. incerta*, and *U. linza*, following the procedure described elsewhere. Casse et al., *Biofouling* 2007, 23 (2), 121-130; Majumdar et al., *ACS Comb. Sci.* 2011, 13 (3), 298-309.

Figure 36:
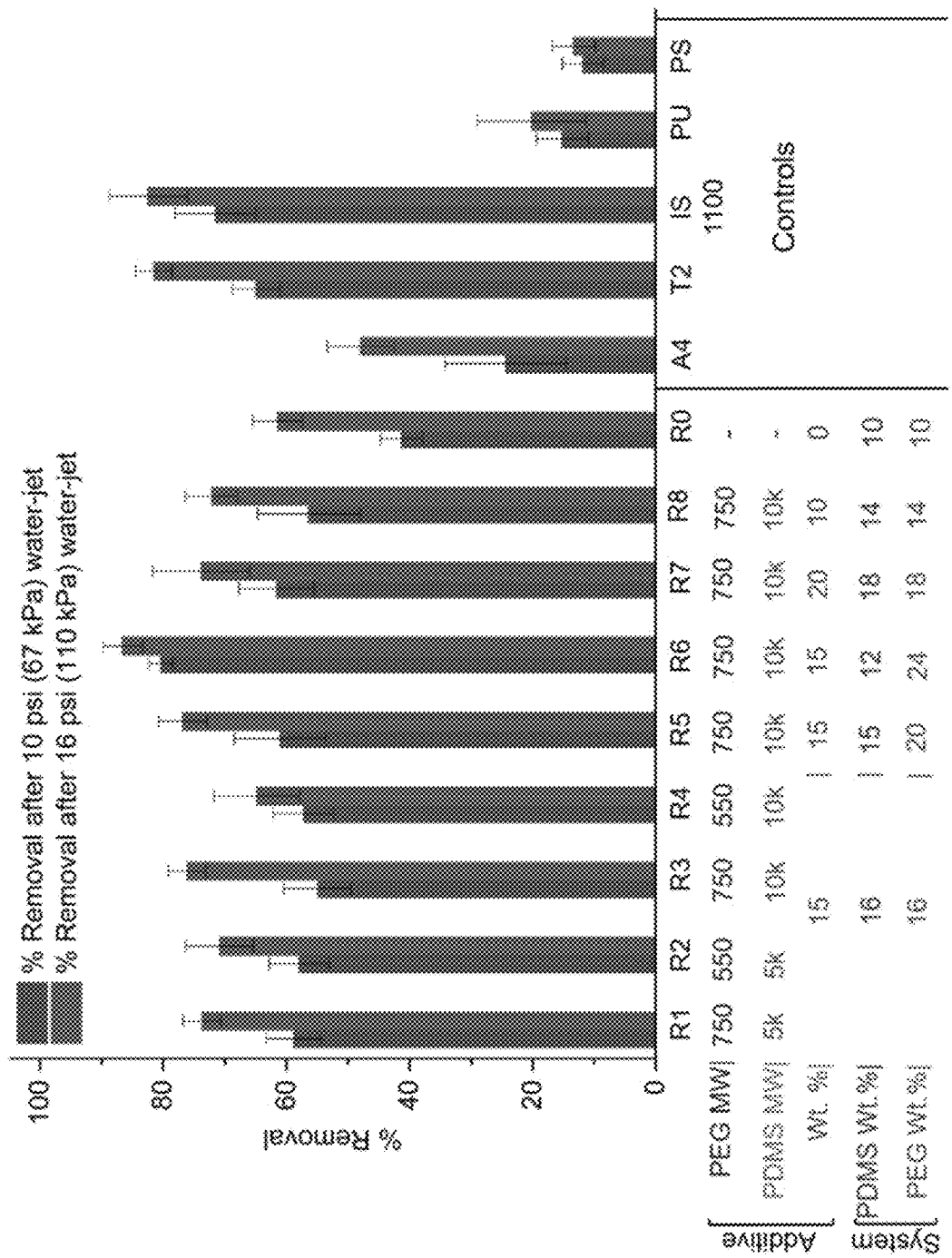
FIG. 36 shows the U. linza FR data, displaying percent removal/release after water jetting at 10 psi (blue bar) and 20 psi (green bar). The x-axis is labeled to reflect details about the utilized additive and the overall content of PEG and PDMS in a formulation. Each category of assessed coatings is separated with lines.

*U. linza* is a macroalgae that prefers hydrophobic surfaces for settlement more than hydrophilic surfaces. Finlay et al., *Integr. Comp. Biol.* 2002, 42 (6), 1116-1122; Callow et al., *Appl. Environ. Microbiol.* 2000, 66 (8), 3249-3254; Callow et al., *J. R. Soc. Interface* 2005, 2 (4), 319-325. The extent of biofouling among all coatings (both exemplified and control) was almost equal, and no significant difference was observed. The biofouled surfaces were water-jetted at 10 psi and 16 psi to assess their FR performance under hydrodynamic pressure. The extent of *U. linza* removal (percent removal) was higher at 16 psi (FIG. 36—Green bars) than 10 psi (FIG. 36—Blue bars), but the overall trend of removal was similar at both pressure levels. Among coatings R1-R4, the MW of PDMS and PEG caused negligible differences in FR performance—Amp-3 composed of 10 k $\overline{M}_n$ PDMS and 750 $\overline{M}_n$ PEG was relatively the best-performing additive. Comparing R3, R7, and R8 systems, it is suggested that the amount of added AmpAdd did not have a major impact on FR properties (though Amp-3 at 15 wt. % showed the relative best performance). Alternatively, the data implied that the degree of additive hydrophilicity influenced the FR performance, where system R6 with the most hydrophilic additive (Amp-6) outperformed R5 and R3 with Amp-5 and Amp-3 additives, respectively. Not only did the AmpAdds improve performance of the R0 coating in respect to the A4 system, some of AmpAdds such as Amp-3, Amp-5, and Amp-6 also pushed FR of R0 system to be on par with well-performing materials such as T2 and IS 1100. Conclusively, the amphiphilic additives improved FR performance of R0 against *U. linza* as the comparison between unmodified and modified R0 systems demonstrated. The FR results of *U. linza* are in correlation with literature that the hydrophilic surfaces weaken the adhesion of this organism.

Figure 37:
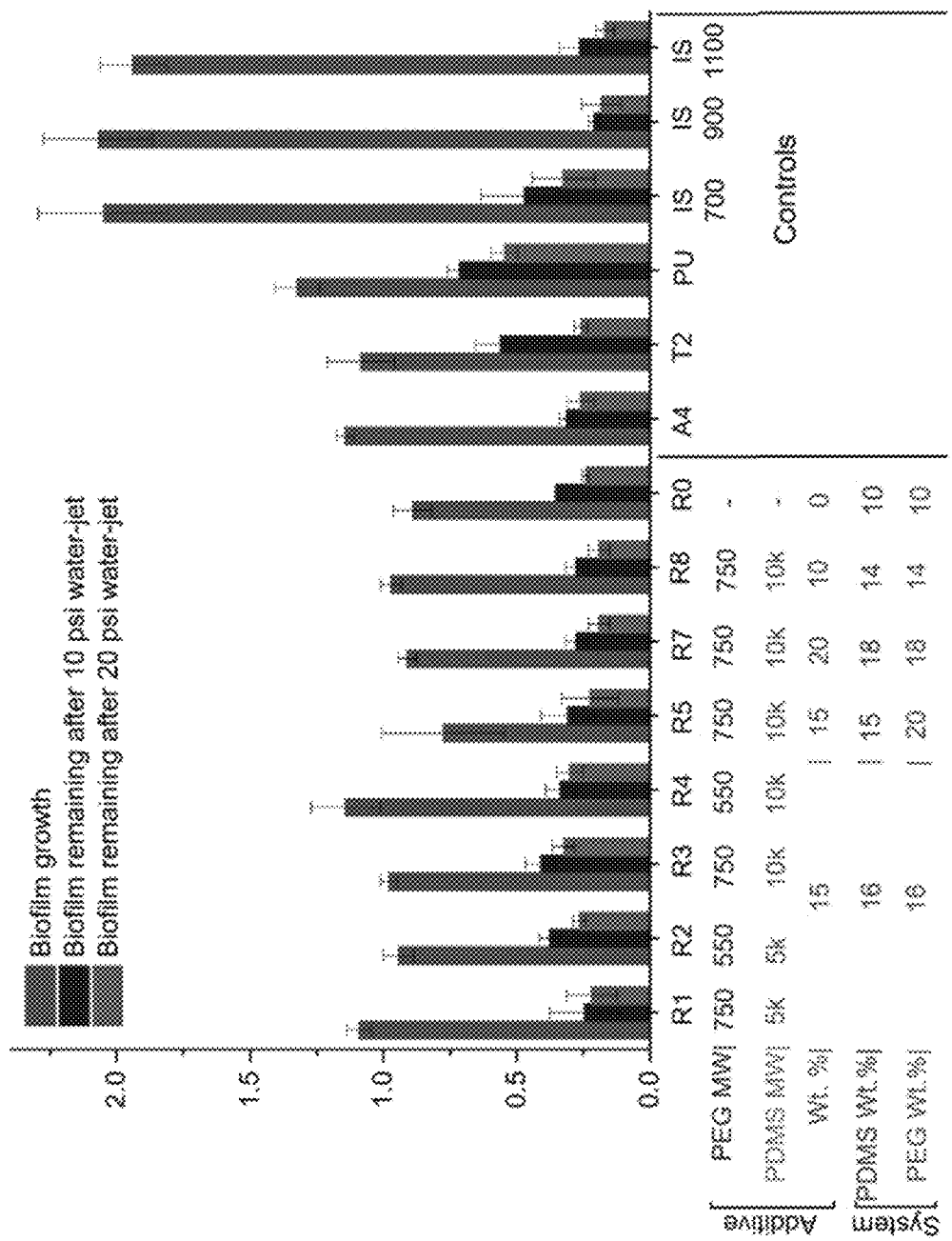
FIG. 37 shows the C. lytica FR data, showing biomass remaining after 10 psi waterjet (blue bar) and 20 psi waterjet (green bar). The x-axis is labeled to reflect details about the utilized additive and the overall content of PEG and PDMS in a formulation. Each category of assessed coatings is separated with lines.

*C. lytica* is a micro-biofouling bacterium that can settle on both hydrophobic and hydrophilic surfaces, challenging the traditional hydrophobic FR surfaces. Thus, amphiphilic surfaces are considered as a feasible solution to fight against biofouling of *C. lytica*. Lejars et al., *Chem. Rev.* 2012, 112 (8), 4347-4390; Galhenage et al., *J. Coating. Tech. Res.* 2017, 14 (2), 307-322. The extent of biofouling among all coatings were relatively similar except for IS 700, IS 900, and IS 1100 that showed almost twice *C. lytica* biofouling, and it was observed AmpAdds did not result in an increased initial film formation. The FR performance of surfaces was evaluated at two water pressure levels, 10 psi and 20 psi. The biomass remaining of *C. lytica* after 10 psi (FIG. 37—Blue bars) and 20 psi (FIG. 37—Green bars) water jetting showed that 10 psi water pressure level released less *C. lytica* than the 20 psi but the overall trend for both pressures was similar. Coatings R1 with Amp-1 and R7 and R8 with Amp-3 (at 20 wt. % and 10 wt. %, respectively) displayed better FR performance than unmodified R0 and control A4 systems, while the remaining modified counterparts were comparable to R0 and A4. Additionally, the three systems (R1, R7, and R8) pushed the performance of R0 to be on par with IS 900 and IS 1100, allowing for the least amount of *C. lytica* to remain settled on their surfaces after water jetting. While the removal is greater for IS 900 and IS 1100 systems due to their very high initial biofouling, it should be noted the AmpAdd-modified R0 coatings experienced less initial biofouling. Coating R6 delaminated and could not be tested, which was attributed to its most hydrophilic matrix swollen under water. Overall, AmpAdds did not have a detrimental effect on FR performance of R0; the additives either improved the FR performance or did not alter it.

Figure 38:
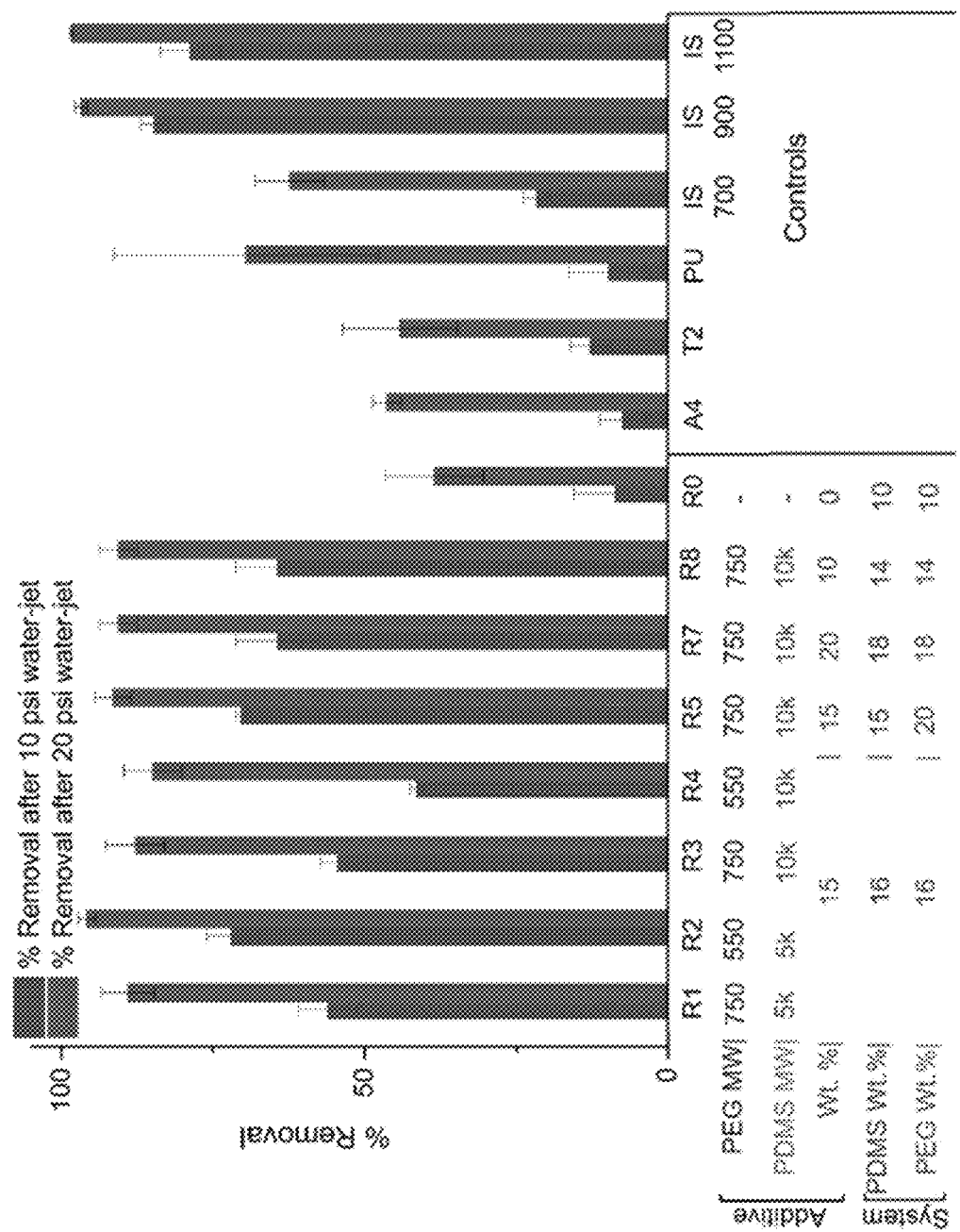
FIG. 38 shows the N. incerta FR data, displaying percent removal/release after waterjetting at 10 psi (blue bar) and 20 psi (green bar). The x-axis is labeled to reflect details about the utilized additive and the overall content of PEG and PDMS in a formulation. Each category of assessed coatings is separated with lines.

*N. incerta* is a micro-biofoulant that settles preferably on hydrophobic surfaces. Finlay et al., *Integr. Comp. Biol.* 2002, 42 (6), 1116-1122; Callow et al., *Appl. Environ. Microbiol.* 2000, 66 (8), 3249-3254. The extent of biofouling settlement was alike among all studied and control coatings, and no remarkable change was noticed due to the addition of AmpAdds. Biofouled surfaces with *N. incerta* were water-jetted at 10 psi and 20 psi pressured levels. The higher water pressure level released more organisms (FIG. 38—Green bars) than the lower pressure level (FIG. 38—Blue bars), while the overall trends remained alike. The FR data indicates that AmpAdds improved the performance of the R0 base system by almost 60% at both pressure levels. However, the release performance was very similar among the modified R0 coatings, resulting in no substantial conclusion regarding the effect of MW of PEG and PDMS, the extent of additive hydrophilicity, and the amount of additive in a system. All the AmpAdd-modified R0 systems remarkably outperformed several internal and commercial controls including A4, PU, and IS 700. Additionally, several systems including R2, R5, R7, and R8 showed matching performance in respect to the top-performing commercial systems such as IS 900 and 1100 SR. Coating R6 delaminated and could not be tested, which was attributed to its highly hydrophilic matrix swollen underwater (this was the most hydrophilic formulation). The FR data of *N. incerta* suggests that the designed AmpAdds impart better performance to the base AmpSiPU R0 coating, indicating that a higher degree of amphiphilicity for this system is beneficial; however, it could not be concluded which particular AmpAdd was better over another.

Figure 39:
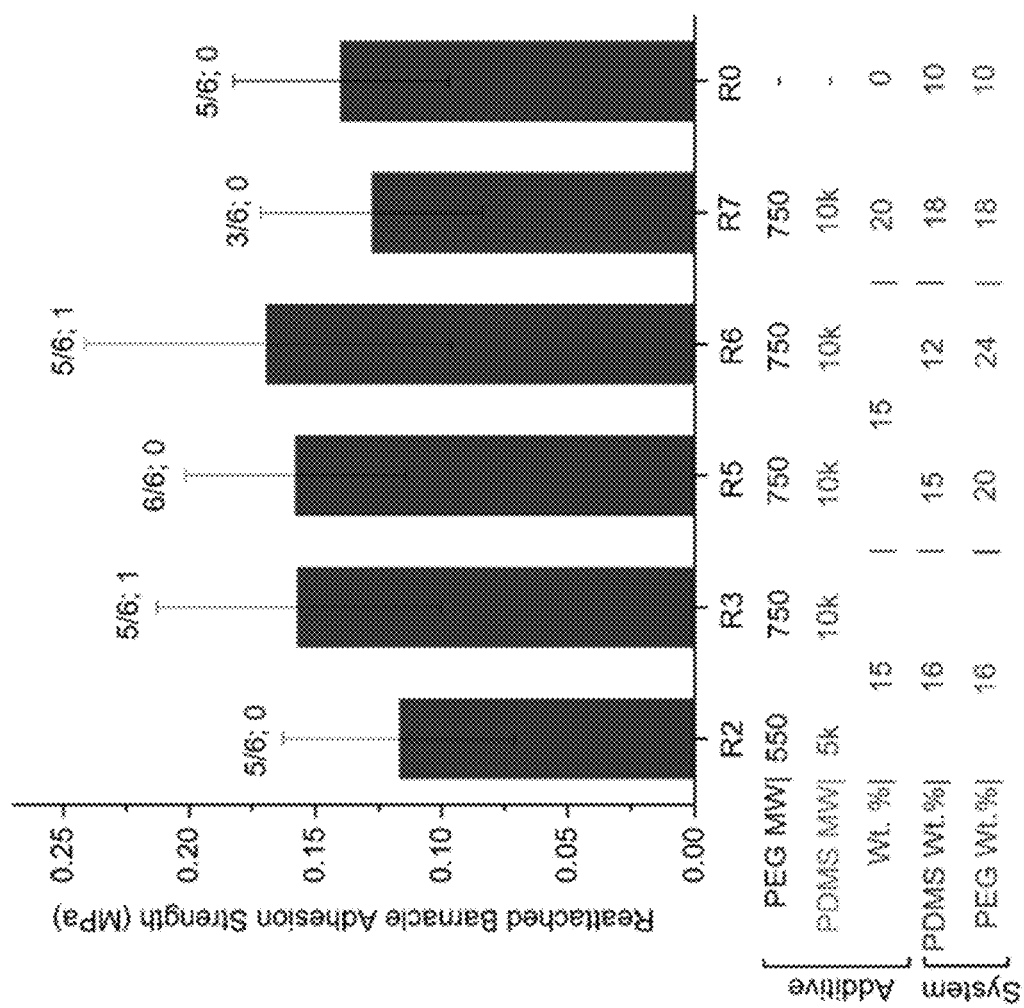
FIG. 39 shows the reattached barnacle (A. Amphitrite) adhesion strength. Six barnacles were used for each reattachment study. The number of reattached barnacles out of six is labeled for each system as a ratio. The blue number shows the number of broken barnacles out of the reattached ones during the push-off experiment. Each bar shows the average adhesion strength based on the number of successfully reattached barnacles. The x-axis is labeled to reflect details about the utilized additive and the overall content of PEG and PDMS in a formulation. Each category of assessed coatings is separated with lines.

Barnacles, a macrofoulant, is another known marine organism that is infamous for its detrimental biofouling effects. Callow et al., Biologist 2002, 49 (1), 10-14; Aldred et al., *Biofouling* 2010, 26 (6), 673-683. Different species of barnacle settle on different surfaces, for example, *Amphibalanus amphitrite* settles both hydrophilic and hydrophobic surfaces. Stafslien et al., *J. Coating. Tech. Res.* 2012, 9 (6), 651-665; Rittschof et al., *Biofouling* 2008, 24 (1), 1-9; Huggett et al., *Biofouling* 2009, 25 (5), 387-399; Rittschof et al., *Sci. Mar.* 1989, 53 (2), 411-416. Consequently, it is challenging to propose a universal rule predicting their behavior. Lejars et al., *Chem. Rev.* 2012, 112 (8), 4347-4390; Petrone et al., *Biofouling* 2011, 27 (9), 1043-1055; Di Fino et al., *Biofouling* 2014, 30 (2), 143-152; Gatley-Montross et al., *Biointerphases* 2017, 12 (5), 051003; Aldred et al., *Biofouling* 2019, 35 (2), 159-172. AmpAdds resulted in both beneficial and detrimental effects in terms of the adhesion strength of the reattached barnacles (FIG. 39). For example, in respect to the unmodified R0 system, Amp-2 at 15 wt. % (R2 formulation) and Amp-3 at 20 wt. % (R7 formulation) reduced the adhesion strength of barnacles, while Amp-3 at 15 wt. % (R3 formulation) increased the adhesion strength of the barnacles. These two additives (Amp-3 and Amp-3) increased the overall amphiphilicity balance of the R0 system equally, meaning the wt. % of PEG and PDMS in solid contents were same. However, when AmpAdds with varying hydrophilic-hydrophobic balance shifted the systems to be more hydrophilic (increasing from R0 to R5 to R6), the adhesion strength of barnacles slightly increased, which may be due to affinity of *A. Amphitrite* to more hydrophilic surfaces in this case. Overall, this data suggested the amount of an additive or its design parameters influences the performance of a system, which can be either favorable or unfavorable.

3.4.6 Conclusions

A novel series of amphiphilic additives by attaching PEG and PDMS chains on a polyisocyanate resin via the facile isocyanate and alcohol reaction, allowing for the easy synthesis of amphiphilic additives having varied molecular weights of amphiphilic chains and tunable hydrophilic-hydrophobic balance, are described herein. The introduction of amphiphilic additives to an amphiphilic marine coating system, known as the amphiphilic siloxane-polyurethane (AmpSiPU), was beneficial overall, boosting the performance of this system to tackle marine biofoulants better. The surface characterizations confirmed that the amphiphilic additives modified the surface of the control amphiphilic coatings. Contact angle measurements displayed modified AmpSiPU systems were more dynamic in their interaction with water and methylene iodide droplets in respect to the control AmpSiPU coating. ATR-FTIR confirmed the presence of PEG and PDMS moieties on the surfaces that were attributed to amphiphilic additives. In respect to the base AmpSiPU system, modified surfaces exhibited highly saturated surfaces containing heterogenous microdomains under AFM. Additionally, the XPS experiment on model PU systems confirmed that the additives self-stratified to the surfaces. Biological assays demonstrated that amphiphilic additives improved the FR performance of the base AmpSiPU system. Overall, the PEG-PDMS additives boosted the performance of AmpSiPU system against *U. linza* and *N. incerta* and advanced it slightly against *C. lytica*, while they presented both advantageous and hampering effects against barnacles. The results indicated systems where the hydrophilic balance was slightly more than hydrophobic offered a more desirable performance against some organisms such as *U. linza* and *N. incerta*.

The claimed invention is:

1. A curable coating composition, comprising:
   a) at least one amphiphilic additive, comprising the reaction product of:
      a1) at least one polyisocyanate;
      a2) at least one monocarbinol-terminated poly(dimethylsiloxane) (PDMS); and
      a3) at least one poly(ethylene glycol) methyl ether (mPEG);
   b) at least one polyisocyanate;
   c) at least one polyol; and
   d) at least one amphiphilic PEG-PDMS isocyanate prepolymer, comprising the reaction product of:
      d1) at least one polyisocyanate;
      d2) at least one monocarbinol-terminated PDMS; and
      d3) at least one mPEG,
   wherein, in the amphiphilic additive, a), the at least one polyisocyanate, a1), the monocarbinol-terminated PDMS, a2), and mPEG, a3) are reacted in a 1:1 equivalent ratio of NCO:OH.

2. The curable coating composition of claim 1, wherein the isocyanate to total hydroxyl equivalent ratio in the at least one amphiphilic PEG-PDMS isocyanate prepolymer, d), ranges from 1.5:1 to 1.1:1.

3. The curable coating composition of claim 1, wherein the polyisocyanate, a1), b), and d1), are, independent of one another, selected from the group consisting of an aliphatic polyisocyanate, a cycloaliphatic polyisocyanate, an araliphatic polyisocyanate, an aromatic polyisocyanate, and mixtures thereof.

4. The curable coating composition of claim 3, wherein the polyisocyanate, a1), b), and d1), are, independent of one another, selected from the group consisting of:

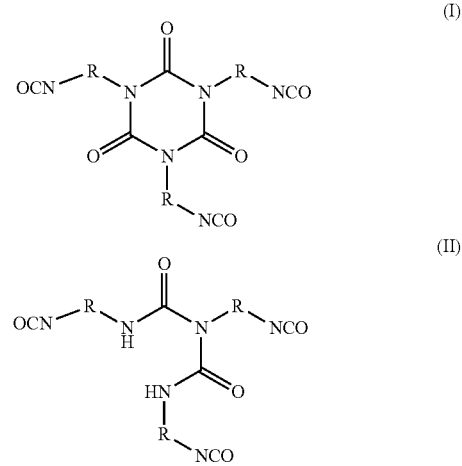

wherein R is independently an optionally substituted, divalent $C_1$-$C_{15}$ alkyl, an optionally substituted $C_3$-$C_{15}$ cycloalkyl, or a group selected from:

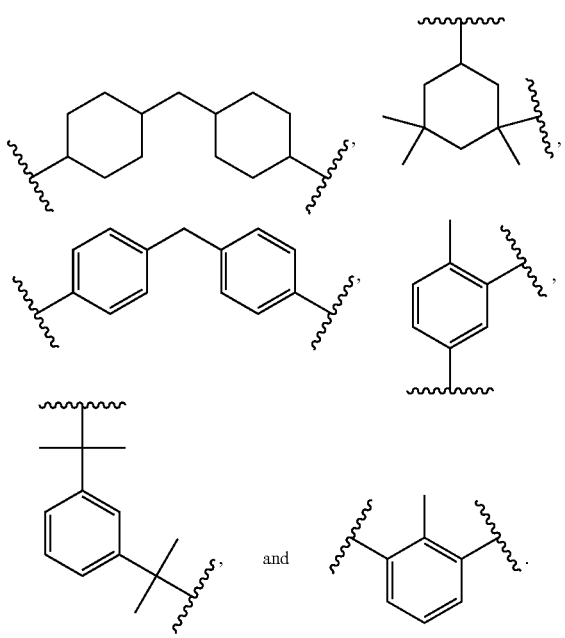

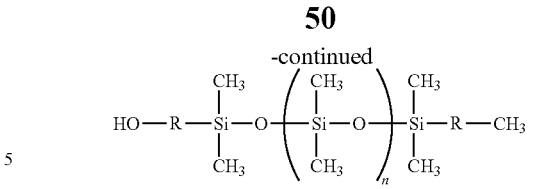

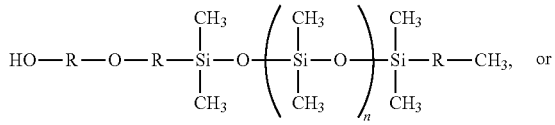

5. The curable coating composition of claim 4, wherein R is a $C_2$-$C_{10}$ straight chain or branched alkyl.

6. The curable coating composition of claim 3, wherein the polyisocyanate, a1), b), and d1), are, independent of one another, selected the group consisting of methylene diphenyl diisocyanate and trimers thereof, hexamethylene diisocyanate and trimers thereof, isophorone diisocyanate and trimers thereof, and mixtures thereof.

7. The curable coating composition of claim 6, wherein the polyisocyanate, a1), b), and d1), are isophorone diisocyanate and trimers thereof.

8. The curable coating composition of claim 1, wherein the polyisocyanate, a1), is present in an amount ranging from about 0.01 to 50 wt. %, based on the solid content of the amphiphilic additive, a).

9. The curable coating composition of claim 8, wherein the polyisocyanate, a1), is present in an amount ranging from about 15 to 25 wt. %, based on the solid content of the amphiphilic additive, a).

10. The curable coating composition of claim 1, wherein the monocarbinol-terminated PDMS, a2) and d2), have, independent of one another, a molecular weight ranging from about 400 $\overline{M}_n$ to 50,000 $\overline{M}_n$.

11. The curable coating composition of claim 10, wherein the monocarbinol-terminated PDMS, a2) and d2), have, independent of one another, a molecular weight ranging from about 5000 $\overline{M}_n$ to 10,000 $\overline{M}_n$.

12. The curable coating composition of claim 1, wherein the monocarbinol-terminated PDMS, a2) and d2), have, independent of one another, the following structure:

wherein R, independent of one another, is a $C_3$-$C_{12}$ straight chain alkyl or an alkylene ether;
wherein n ranges from 0 to about 270.

13. The curable coating composition of claim 1, wherein the monocarbinol-terminated PDMS, a2), is present in an amount ranging from about 0.01 to 50 wt. %, based on the solid content of the amphiphilic additive, a).

14. The curable coating composition of claim 13, wherein the monocarbinol-terminated PDMS, a2), is present in an amount ranging from about 5 to 45 wt. %, based on the solid content of the amphiphilic additive, a).

15. The curable coating composition of claim 1, wherein the mPEG, a3) and d3), have, independent of one another, a molecular weight ranging from about 350 $\overline{M}_n$ to 20,000 $\overline{M}_n$.

16. The curable coating composition of claim 15, wherein the mPEG, a3) and d3), have, independent of one another, a molecular weight ranging from about 550 $\overline{M}_n$ to 750 $\overline{M}_n$.

17. The curable coating composition of claim 1, wherein the mPEG, a3), is present in an amount ranging from about 0.01 to 75 wt. %, based on the solid content of the amphiphilic additive, a).

18. The curable coating composition of claim 17, wherein the mPEG, a3), is present in an amount ranging from about 20 to 65 wt. %, based on the solid content of the amphiphilic additive, a).

19. The curable coating composition of claim 1, wherein the amphiphilic additive, a), is present in an amount ranging from about 0.1 to 40 wt. %, based on the solid content of the curable coating composition.

20. The curable coating composition of claim 1, wherein the % ratio of monocarbinol-terminated PDMS, a2): mPEG, a3), in the amphiphilic additive, a), ranges from about 10:about 90.

21. The curable coating composition of claim 1, wherein the % ratio of monocarbinol-terminated PDMS, a2): mPEG, a3), in the amphiphilic additive, a), ranges from about 33:about 66.

22. The curable coating composition of claim 1, wherein the % ratio of monocarbinol-terminated PDMS, a2): mPEG, a3), in the amphiphilic additive, a), ranges from about 50:about 50.

23. The curable coating composition of claim 1, wherein the polyol, c), is selected from the group consisting of a polyester polyol, a polyether polyol, a polycarbonate polyol, an acrylic polyol, and mixtures thereof.

24. The curable coating composition of claim 23, wherein the polyol, c), is selected from an acrylic polyol.

25. The curable coating composition of claim 24, wherein the acrylic polyol is synthesized from a mixture of at least one hydroxy-functional monomer and at least one non-functional monomer.

26. The curable coating composition of claim 25, wherein the at least one hydroxy-functional monomer is selected from the group consisting of hydroxyethyl acrylate, hydroxyethyl methacrylate, hydroxypropyl acrylate, and hydroxypropyl methacrylate.

27. The curable coating composition of claim 25, wherein the at least one non-functional monomer is selected from the group consisting of styrene, methyl methacrylate, methyl acrylate, butyl methacrylate, butyl acrylate, lauryl methacrylate, lauryl acrylate, 2-ethylhexyl acrylate, and 2-ethyl hexyl methacrylate.

28. A cured coating composition of claim 1.

29. An object coated with the curable coating composition of claim 1.

30. The object of claim 29, wherein the object is a boat hull.

31. A method for reducing or preventing biofouling of a surface exposed to an aqueous environment comprising the steps of:
   coating the surface with a curable coating composition of claim 1 to form a coated surface, and curing the coating composition on the coated surface.

32. A marine fouling-release coating comprising the curable coating composition of claim 1.

* * * * *